US011254773B2

(12) United States Patent
Helgeson et al.

(10) Patent No.: US 11,254,773 B2
(45) Date of Patent: Feb. 22, 2022

(54) NANOSCALE MULTIPLE EMULSIONS AND NANOPARTICLES

(71) Applicant: The Regents of the University of California, Oakland, CA (US)

(72) Inventors: Matthew E. Helgeson, Santa Barbara, CA (US); Samir Mitragotri, Cambridge, MA (US); Mengwen Zhang, Santa Barbara, CA (US); Maksymilian Nowak, Santa Barbara, CA (US); Paula Malo de Molina, Bizkaia (ES)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 45 days.

(21) Appl. No.: 16/612,982

(22) PCT Filed: May 11, 2018

(86) PCT No.: PCT/US2018/032410
§ 371 (c)(1),
(2) Date: Nov. 12, 2019

(87) PCT Pub. No.: WO2018/209293
PCT Pub. Date: Nov. 15, 2018

(65) Prior Publication Data
US 2020/0385503 A1    Dec. 10, 2020

Related U.S. Application Data

(60) Provisional application No. 62/504,829, filed on May 11, 2017.

(51) Int. Cl.
*C08F 222/10* (2006.01)

(52) U.S. Cl.
CPC .................. *C08F 222/102* (2020.02)

(58) Field of Classification Search
CPC ......... C08F 222/102; C08F 2/24; C08F 22/10
USPC ........................................................ 523/100
See application file for complete search history.

(56) References Cited

U.S. PATENT DOCUMENTS

| | | | |
|---|---|---|---|
| 5,332,595 A | 7/1994 | Gaonkar | |
| 5,985,177 A | 11/1999 | Yoshida | |
| 6,143,211 A | 11/2000 | Mathiowitz | |
| 6,150,425 A | 11/2000 | Sekine | |
| 6,288,072 B1 | 9/2001 | Wall | |
| 7,232,470 B2 | 6/2007 | Varadaraj | |
| 7,652,074 B2 | 1/2010 | Varadaraj | |
| 7,722,891 B2 | 5/2010 | Barthel | |
| 7,776,812 B2 | 8/2010 | Lang | |
| 7,811,594 B2 * | 10/2010 | Schreiber | A61K 8/062 424/401 |
| 8,075,917 B2 | 12/2011 | Chung | |
| 8,546,509 B2 * | 10/2013 | Kulke | C08G 18/8064 528/45 |
| 8,651,230 B2 | 2/2014 | Peshkovsky | |
| 9,238,206 B2 | 1/2016 | Rotem | |
| 9,437,007 B2 | 9/2016 | Okumura | |
| 9,878,036 B2 * | 1/2018 | Coulter | A61P 31/00 |
| 2006/0292095 A1 * | 12/2006 | Biatry | A61K 8/8117 424/59 |
| 2016/0143989 A1 * | 5/2016 | Coulter | A61K 9/107 424/452 |

FOREIGN PATENT DOCUMENTS

| | | | |
|---|---|---|---|
| WO | 2011018504 | 2/2011 | |
| WO | WO-2011018504 A2 * | 2/2011 | ............. A61K 39/39 |

OTHER PUBLICATIONS

Abate, et al., "High-Order Multiple Emulsions Formed in Poly(dimethylsiloxane) Microfluidics", Small, 5:2030-2032 (2009).
Abbasalipourkabir, et al., "Cytotoxicity Effect of Solid Lipid Nanoparticles on Human Breast Cancer Cell Lines", Biotechnology, 10:528-533 (2011).
An, et al., "Nanoemulsion Composite Microgels for Orthogonal Encapsulation and Release", Adv. Mater., 24:3838-3844, 3895 (2012).
An, et al., "Synthesis of Biomimetic Oxygen-Carrying Compartmentalized Microparticles Using Flow Lithography", Lab Chip, 13:4765-4774 (2013).
Anselmo, et al., "Elasticity of Nanoparticles Influences Their Blood Circulation, Phagocytosis, Endocytosis, and Targeting", ACS Nano, 9:3169-3177 (2015).
Arriaga, et al., "Scalable Single-Step Microfluidic Production of Single-Core Double Emulsions with Ultra-Thin Shells", Lab Chip, 15:3335-3340 (2015).
Arriaga, et al., "Ultrathin Shell Double Emulsion Templated Giant Unilamellar Lipid Vesicles with Controlled Microdomain Formation", Small, 10:950-956 (2014).

(Continued)

Primary Examiner — Michael M. Bernshteyn
(74) Attorney, Agent, or Firm — Pabst Patent Group LLP

(57) ABSTRACT

Nanoscale multiple emulsions, nanoparticles resulting therefrom and methods of making and using thereof are described. The nanoscale multiple emulsions are typically double nanoemulsions, such as oil-in-water-in-oil (O1/W/O2) nanoemulsions, in which nanodroplets of the first oil (O1) phase are suspended in the aqueous (W) phase and together are dispersed in the second oil (O2) phase. The double nanoemulsions are stable with high encapsulation efficiency allowing templating to form multiphase nanoparticles. The multiphase nanoparticles include nanodroplets of O1 phase dispersed in a continuous matrix that can be a liquid, a gel, or a solid at room temperature and pressure. Methods of making the double nanoemulsions include high-energy forces and serial nanoemulsifications.

22 Claims, 9 Drawing Sheets

(56) References Cited

OTHER PUBLICATIONS

Baum, et al., "THERANOSTICS: From Molecular Imaging Using Ga-68 Labeled Tracers and PET/CT to Personalized Radionuclide Therapy—The Bad Berka Experience", Theranostics, 2(5)437-447 (2012).
Besnard, et al., "Multiple Emulsions Controlled by Stimuli-Responsive Polymers", Adv. Mater., 2013, 25, 25:2844-2848 (2013).
Chacko, et al., "A Versatile Nanoscopic Drug Delivery Platform", Adv. Drug Deliv. Rev., 64:836-851 (2012).
Chakraborty, et al., "Emulsion Liquid Membranes: Role of Internal Droplet Size Distribution on Toluene/n-Heptane Separation", Colloids Surfaces A Physicochem. Eng. Asp., 272:15-21 (2006).
Clegg, et al., "One-Step Production of Multiple Emulsions: Microfluidic, Polymer-Stabilized and Particle-Stabilized Approaches", Soft Matter, 12:998-1008 (2016).
Davies, "A Quantitative Kinetic Theory Emulsion Type. 1. Physical Chemistry of the Emulsifying Agent", Gas/Liquid and Liquid/Liquid Interfaces. Proceedings of 2nd International Congress Surface Activity, 426-438 (1957).
Ficheux, et al., "Some Stability Criteria for Double Emulsions", Langmuir, 14:2702-2706 (1998).
Gawande, et al., "Core-Shell Nanoparticles: Synthesis and Applications in Catalysis and Electrocatalysis", Chem. Soc. Rev., 44:7540-7590 (2015).
Grabowski, et al., "Toxicity of Surface-Modified PLGA Nanoparticles toward Lung Alveolar Epithelial Cells", Int. J. Pharm., 454:686-694 (2013).
Griffin, "Calculation of HLB Values of Non-Ionic Surfactants", Journal of the Society of Cosmetic Chemists, 249-256 (1954).
Griffin, "Classification of Surface-Active Agents γ HLB", J. Soc. Cosmetic Chemists, 311-326 (1949).
Gupta, "Nanoemulsions: Formation, Properties and Applications", Soft Matter, 12:2826-2841 (2016).
Gupta, et al., "Removal of Mercury by Emulsion Liquid Membranes: Studies on Emulsion Stability and Scale Up", J. Dispers. Sci. Technol., 34:1733-1741 (2013).
Hamidi, et al., "Hydrogel Nanoparticles in Drug Delivery", Adv. Drug Deliv. Rev., 60:1638-1649 (2008).
Hashimoto, et al., "Interfacial Instabilities in a Microfluidic Hele-Shaw Cell", Soft Matter, 4:1403 (2008).
Helgeson, "Colloidal Behavior of Nanoemulsions: Interactions, Structure and Rheology", Curr. Opin. Colloid Interface Sci., 25:39-50 (2016).
Helgeson, et al., "Mesoporous Organohydrogels from Thermogelling Photocrosslinkable Nanoemulsions", Nat. Mater., 11:344-352 (2012).
Hoare, et al., "Hydrogels in Drug Delivery: Progress and Challenges", Polymer (Guildf)., 49:1993-2007 (2008).
Hong, et al., "One-Step Formation of W/O/W Multiple Emulsions Stabilized by Single Amphiphilic Block Copolymers", (2012).
Kawasaki, et al., "Mechanical Entrainment in W/O/W Emulsion Liquid Membrane", Sep. Sci. Technol., 44:151-168 (2009).
Khuphe, et al., "A Vegetable Oil-Based Organogel for Use in pH-Mediated Drug Delivery", Soft Matter, 11:9160-9167 (2015).
Kim, et al., "Formation of Polymersomes with Double Bilayers Templated by Quadruple Emulsions", Lab Chip, 13:1351-1356 (2013).
Laugel, et al., "Oil-Water-Oil Multiple Emulsions for Prolonged Delivery of Hydrocortisone after Topical Application: Comparison with Simple Emulsions", Int. J. Pharm., 160:109-117 (1998).
Lee, et al., "Cryogenic Electron Microscopy Study of Nanoemulsion Formation from Microemulsions", (2014).
Lee, et al., "Cryogenic Transmission Electron Microscopy Study: Preparation of Vesicular Dispersions by Quenching Microemulsions", J. Microsc., 0:1-7 (2016).
Lee, et al., "The Stabilization of L-Ascorbic Acid in Aqueous Solution and Water-in-Oil-in-Water Double Emulsion by Controlling pH and Electrolyte Concentration", J. Cosmet. Sci., 55:1-12 (2004).
Lindenstruth, et al., "W/O/W Multiple Emulsions with Diclofenac Sodium", Eur. J. Pharm. Biopharm., 58:621-627 (2004).
Malo De Molina, et al., "Oil-in-Water-in-Oil Multi-Nanoemulsions for Templating Complex Nanoparticle", Nano Lett., (2016).
Malo De Molina, et al., "Heterogeneity and Its Influence on the Properties of Difunctional Poly(ethylene Glycol) Hydrogels: Structure and Mechanics", Macromolecules, 48:5402-5411 (2015).
Massi, et al., "Cannabidiol as potential anticancer drug", British J. of Clin. Pharmacol., 75(2):303-312 (2012).
Matalanis, et al., "Structured Biopolymer-Based Delivery Systems for Encapsulation, Protection, and Release of Lipophilic Compounds", Food Hydrocoll., 25:1865-1880 (2011).
Mcclements, "Edible Nanoemulsions: Fabrication, Properties, and Functional Performance", Soft Matter, 7:2297 (2011).
Mezzenga, et al., "Design of Double Emulsions by Osmotic Pressure Tailoring", 3574-3582 (2004).
Mishra, et al., "Prolonged Release of Pentazocine from Multiple O/W/O Emulsions", Drug Dev. Ind. Pharm., 15:1217-1230 (1989).
Miyazawa, et al., "Preparation of a New Soft Capsule for Cosmetics", J. Cosmet. Sci., 51:239-252 (2000).
Muschiolik, "Multiple Emulsions for Food Use", Curr. Opin. Colloid Interface Sci., 12:213-220 (2007).
Nagarajan, et al., "Molecular Packing Parameter and Surfactant Self-Assembly: The Neglected role of the Surfactant Tail", Langmuir, 18:31-38 (2001).
Nollet, et al., "Water Fluxes and Encapsulation Efficiency in Double Emulsions: Impact of Emulsification and Osmotic Pressure Unbalance", Soft Matter, 12:3412-3424 (2016).
Okochi, et al., "Preparation and Evaluation of W/o/w Type Emulsions Containing Vancomycin", Advanced Drug Delivery Reviews, 45:5-26 (2000).
Onuki, et al., "Formulation Optimization of Water-in-Oil-Water Multiple Emulsion for Intestinal Insulin Delivery", J. Control. Release, 97:91-99 (2004).
Pal, "Techniques for measuring the composition (oil and water content) of emulsions—a state of the art review", Colloids Surfaces A Physiochem. Eng. Asp. 84(2-3): 141-193 (1994).
Pays, et al., "Coalescence in Surfactant-Stabilized Double Emulsions", Langmuir, 17:7758-7769 (2001).
Pays, et al., "Double Emulsions: How Does Release Occur", J. Control. Release, 79:193-205 (2002).
Peshkovsky, et al., "Continuous-Flow Production of a Pharmaceutical Nanoemulsion by High-Amplitude Ultrasound: Process Scale-Up", Chem. Eng. Process. Process Intensif., 82:132-136 (2014).
Porras, et al., "Studies of Formation of W/O Nano-Emulsions", Colloids Surfaces A Physicochem. Eng. Asp., 249:115-118 (2004).
Pradhan, et al., "A One-Step Process for Oil-in-Water-in-Oil Double Emulsion Formation Using a Single Surfactant", J. Colloid Interface Sci., 386:398-404 (2012).
Sapei, et al., "Stability and Release Properties of Double Emulsions for Food Applications", Food Hydrocoll., 27:316-323 (2012).
Sawhney, et al., "Bioerodible hydrogels based on photopolymerized poly (ethylene glycol)-co-poly (.alpha.-hydroxy acid) diacrylate macromers", Macromolecules, 26:581-87 (1993).
Shakeel, et al., "Double W/o/w Nanoemulsion of 5-Fluorouracil for Self-Nanoemulsifying Drug Delivery System", J. Mol. Liq., 200:193-190. (2014).
Silva, et al., "Recent Advances in Multiple Emulsions and Their Application as Templates", Curr. Opin. Colloid Interface Sci., 25:98-108 (2016).
Singh, et al., "Nanoparticle-Based Targeted Drug Delivery", Exp. Mol. Pathol., 86:215-223 (2009).
Singh, et al., "Vegetable Oil-Based Formulations for Controlled Drug Delivery", Handbook of Encapsulation and Controlled Release; CRC Press, 1381-1411 (2015).
Son, et al., "Designed Synthesis of SiO$_2$/TiO$_2$ Core/Shell Structure As Light Scattering Material for Highly Efficient Dye-Sensitized Solar Cells", ACS Appl. Mater. Interfaces, 5:4815-4820 (2013).
Thompson, et al., "Preparation of Pickering Double Emulsions Using Block Copolymer Worms", Langmuir, 31:4137-4144 (2015).
Utada, et al., "Monodisperse Double Emulsions Generated from a Microcapillary Device", Science, 308(5721):537-541 (2005).

(56) References Cited

OTHER PUBLICATIONS

Van Der Graaf, et al., "Preparation of Double Emulsions by Membrane Emulsification—A Review", J. Memb. Sci., 251:7-15 (2005).
Wooster, et al., "Impact of Oil Type on Nanoemulsion Formation and Ostwald Ripening Stability", Langmuir, 24:12758-12765 (2008).
Yu, et al., "Effect of Camphor/cyclodextrin Complexation on the Stability of O/W/O Multiple Emulsions" Int. J. Pharm., 261:1-8 (2003).
Zatz, et al., "Assessment of Stability in Water-in-Oil-in-Water Multiple Emulsions", J. Soc. Cosmet. Chem., 39:211-222 (1988).
Zeeb, et al., "Retention and Release of Oil-in-Water Emulsions from Filled Hydrogel Beads Composed of Calcium Alginate: Impact of Emulsifier Type and pH", Soft Matter, 11:2228-2236 (2015).
Zhao, et al., "Water-in-Oil-in-Water Double Nanoemulsion Induced by CO(2)", Phys. Chem. Chem. Phys., 13:684-689 (2011).
International Search Report for corresponding PCT application PCT/US2018/032410 dated Mar. 4, 2019.

\* cited by examiner

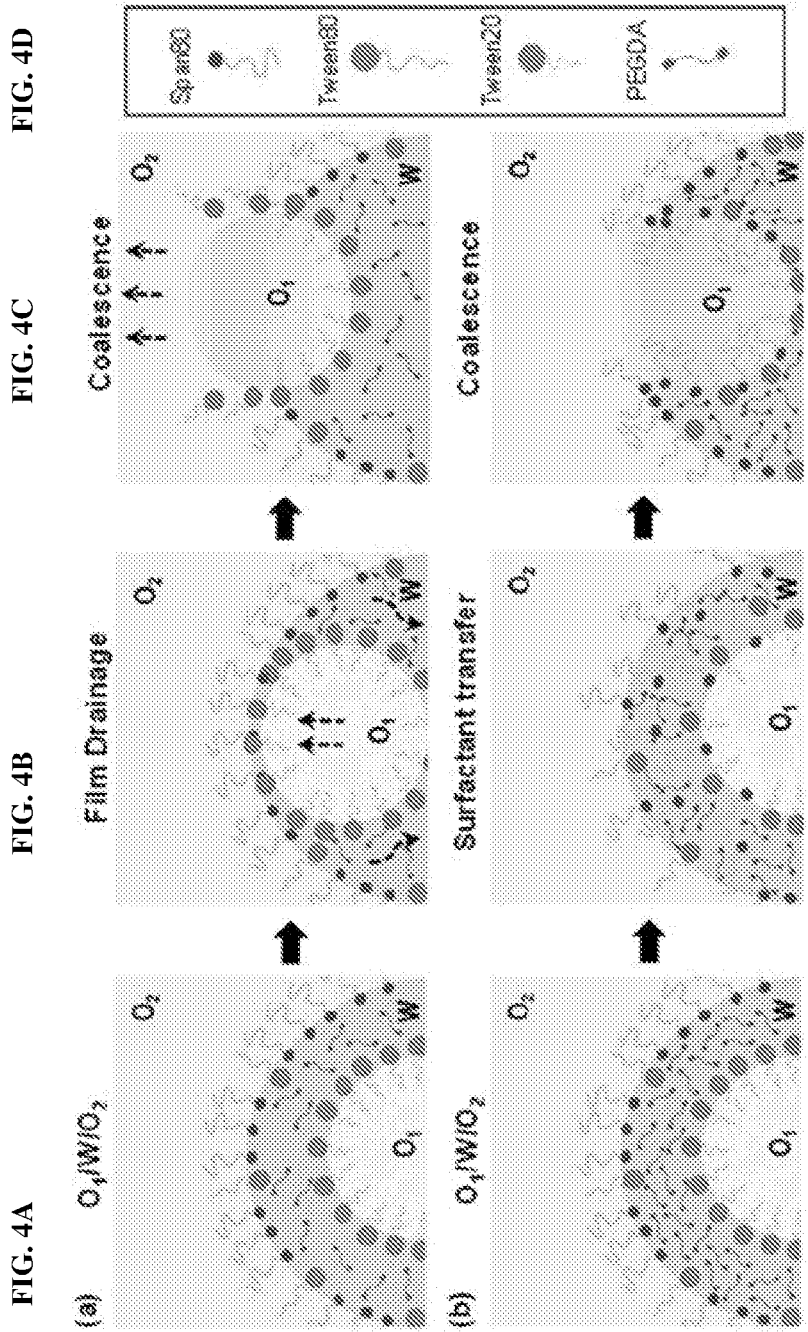

NANOSCALE MULTIPLE EMULSIONS AND NANOPARTICLES

CROSS REFERENCE TO RELATED APPLICATIONS

This application is a National Phase application under 35 U.S.C. 371 of PCT/US2018/032410, filed on May 11, 2018, which claims the benefit of and priority to U.S. Ser. No. 62/504,829, filed May 11, 2017, and where permissible is hereby incorporated by reference in its entirety.

FIELD OF THE INVENTION

The invention is generally directed to nanoparticles, nanoemulsions and methods of making and using thereof.

BACKGROUND OF THE INVENTION

Methods for preparing emulsions include microfluidic or microcapillary-based approaches and bulk emulsification methods. However, these methods have not been successfully scaled down to form multiphase nanoparticles and nanoscale multiple emulsions.

For example, bulk emulsification, used to form nanoscale multiple emulsions, is difficult to control, typically resulting in a large dispersity of both size and morphology. This hinders templating efforts to form nanoparticles from the nanoscale multiple emulsions.

Making nanoscale complex emulsions has proven to be a challenge, and using them to template particles consequently more difficult.

There remains a need for improved nanoscale multiple emulsions. There remains a need for improved methods of making nanoparticles that can be scaled for industrial-scale production.

It is an object of the invention to provide nanoscale multiple emulsions.

It is an object of the invention to provide methods that can be used for production of nanoscale multiple emulsions or nanoparticles.

It is an object of the invention to provide multiphase nanoparticles, particularly on an industrial scale.

SUMMARY OF THE INVENTION

Multiphase nanoparticles and nanoscale multiple emulsions and methods for making and using these nanoparticles and nanoemulsions are described herein. The nanoparticles are generally stable and typically have high encapsulation efficiency. The nanoemulsions are relatively stable and typically have high encapsulation efficiency.

The nanoscale multiple emulsions typically include a plurality of oil nanodroplets dispersed within a continuous aqueous phase dispersed within a second oil phase. The continuous aqueous phase typically contains one or more polymerizable monomers or macromers.

The multiphase nanoparticles typically include a plurality of oil nanodroplets dispersed within a continuous matrix. The continuous matrix may include a polymer. The polymer is typically formed by polymerization of the one or more polymerizable monomers or macromers in the continuous aqueous phase of the nanoemulsions. Following polymerization, the plurality of oil nanodroplets remain dispersed within the continuous matrix. The polymeric nanoparticles may be nanogels at room temperature and pressure (20° C., 1 atm).

Typically, the nanoscale multiple emulsions are oil-in-water-in-oil ($O_1/W/O_2$ or $O_1/W/O_1$) double nanoemulsions. The inner (first) oil phase, in the form of nanodroplets, is suspended in the aqueous phase, which is dispersed in the outer (second) oil phase. The first and second oil phases can be the same or different. The aqueous phase can be in the form of a liquid or a gel at room temperature and pressure. The aqueous phase typically includes a polymerizable monomer or macromer at a suitable volume fraction to form the nanodroplets, and a surfactant. Suitable volume fractions for the polymerizable monomer or macromer in the aqueous phase include between 0.1 and 0.6, such as between 0.1 and 0.43.

The oil nanodroplets in the nanoemulsions or nanoparticles typically have diameters between 1 nm and 100 nm. The nanoparticles typically have a diameter between 150 nm and less than 1000 nm.

During formation of the emulsion, typically the encapsulation efficiency of the oil nanodroplets is between 0.2 and 1. Preferably, the encapsulation efficiency is between 0.4 and 1. The volume of the oil that remains encapsulated in the nanoparticles is typically the same as the amount that is encapsulated during formation of the double nanoemulsions.

The nanoparticles are generally stable at room temperature and pressure. The nanodroplets remain dispersed within the continuous matrix of the nanoparticles for a period of time of at least 30 days, at least two months, optionally from 30 days to six months, or one year at room temperature and pressure.

The double nanoemulsions are sufficiently stable at room temperature and pressure to allow for templating and nanoparticle formation. The double nanoemulsion is typically stable for at least two hours, at least six hours, and optionally stable for up to six months at room temperature and pressure.

The nanoparticles and nanoemulsions can contain one or more chemical, agricultural, cosmetic, food, and/or pharmaceutical agents. The multiphase nanoparticles and nanoemulsions can be used on their own or combined with excipients/carriers. The nanoparticles or nanoemulsions may be used in agriculture, chemical industries, the construction industry, food industry, consumer goods, or medicine.

Methods of making the multiphase nanoparticles and nanoemulsions are also described. The methods of forming nanoemulsions typically include dispersing a first oil phase into a continuous aqueous phase using high-energy viscous forces to form a first nanoemulsion; and dispersing the first nanoemulsion in a second oil phase using high-energy viscous forces to form a second nanoemulsion. Typically, the aqueous phase includes a polymerizable monomer or macromer and a first surfactant. Typically, the second oil phase includes a second surfactant, which is different from the first surfactant.

Optionally, a polymerization initiator is included in the first nanoemulsion, in the second nanoemulsion, or in both the first and the second nanoemulsions. Following initiation of polymerization of the polymerizable monomer or macromer, multiphase nanoparticles are formed. The multiphase nanoparticles may be washed and/or purified for use in any suitable application.

BRIEF DESCRIPTION OF THE DRAWINGS

FIG. 1A is a schematic showing a method for forming a single nanoemulsion. FIG. 1B is a schematic showing a method for forming a double nanoemulsion, followed by UV curing and formation of nanoparticles, e.g. nanogels.

FIG. 3A is a graph showing an increase in initial inner oil content (Input Oil Content, $V_I$ (vol %)) leads to an increase in size (Nanogel Diameter, $D_N$ (nm)) and polydispersity of nanogels, as well as a linear increase in final oil content (Measured Oil Content $V_M$ (vol %)); (solid, dashed lines indicate oil content assuming zero oil loss and a linear fit to the measured data). FIG. 3B is a graph showing that increases in ultrasonication time (Processing Time, $t_p$ (s)) decreases the oil encapsulation efficiency ($\varepsilon$) for $\Phi^{O_1}$=0.04 (4 vol %, filled circles) and $\Phi^{O_1}$=0.10 (10 vol %, filled triangles) and nanogel diameter ($D_N$ (nm)) for $\Phi^{O_1}$=0.04 (4 vol %, open circles) and $\Phi^{O_1}$=0.10 (10 vol %, open triangles). FIG. 3C is a graph showing the encapsulation efficiency ($\varepsilon$, filled squares) and nanogel diameter ($D_N$ (nm), open squares) for nanogels with $\Phi^{O_1}$=0.04 remain consistent for samples with varying wait time (t (hr)) after the $O_1$/W/$O_2$ emulsification. FIG. 3D is a graph showing an increase in PEGDA volume fraction ($\varphi^W_{PEGDA}$) decreases the encapsulation efficiency ($\varepsilon$, filled squares) but not the diameter ($D_N$ (nm), open squares) of nanogels. In FIGS. 3A and 3B, bimodal size distributions are indicated by the modal size of the smaller and larger populations (up and down triangles, respectively). The average PDI is between 0.15 to 0.25 for all samples; error bars indicate standard deviation ($\sigma$) of the droplet size distribution, where PDI=$(\sigma/D)^2$.

FIGS. 4A, 4B and 4C are schematics illustrating ultrasonication-induced inner droplet streaming which can lead to oil loss. FIGS. 4E, 4F, and 4G are schematics illustrating how an increase in polymer content can lead to reversal of film curvature and to oil loss. FIG. 4D is a key for the schematics depicted in FIGS. 4A-4C and 4E-4G.

DETAILED DESCRIPTION OF THE INVENTION

I. Nanoscale Multiple Emulsions

Figure 1A:
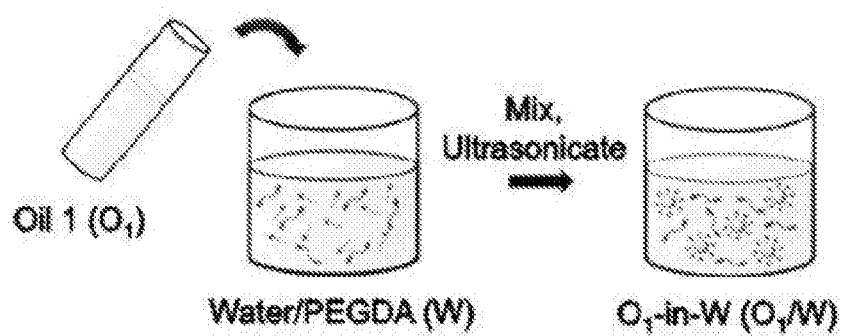
FIGS. 1A and 1B are schematics showing the synthesis of nanoparticles using an $O_1/W/O_2$ double nanoemulsion.

Described herein are nanoscale multiple nanoemulsions, such as double, triple or more complex nanoemulsions. The nanoemulsions may be double nanoemulsions of oil-in-water-in-oil (O/W/O). The first oil phases in the O/W/O nanoemulsions may be the same as the second oil phase ($O_1$/W/$O_1$), or different ($O_1$/W/$O_2$).

In the nanoemulsions, the oil and aqueous phases are typically liquids at room temperature and pressure.

The double nanoemulsions typically include a first nanoemulsion of a first oil phase dispersed in an aqueous phase (O/W), which is suspended in a second oil phase forming a second nanoemulsion. The double nanoemulsions may include a first surfactant, a second surfactant, a polymerizable monomer or macromer, a cargo, an initiator/activator, or any combination thereof.

The nanoemulsions are sufficiently stable to allow for templating and nanoparticle formation. For example, the double nanoemulsions are stable for at least two hours, at least six hours, and optionally are stable for up to six months at room temperature and pressure.

A. First Nanoemulsion

The first nanoemulsion includes a first oil phase dispersed in the aqueous phase in a form of plurality of nanodroplets.

1. First Oil Phase and Nanodroplets

A first oil phase, in the form of a plurality of nanodroplets, may be formed from any suitable oil compound. Typically, the nanodroplets have diameter between 1 nm and 100 nm. The nanodroplets may be randomly dispersed in the aqueous phase. The volume fraction of the plurality of nanodroplets in the aqueous phase of the first nanoemulsion may be between 0.001 and 0.2, between 0.01 and 0.2, between 0.01 and 0.1, or between 0.05 and 0.1.

The first oil phase may be formed from any hydrophobic molecule. A hydrophobic molecule can be characterized by its greater affinity for, and thus solubility in and miscibility with, organic solvents as compared to water. The hydrophobicity of a compound can be quantified by measuring its partition coefficient between water (or a buffered aqueous solution) and a water-immiscible organic solvent, such as octanol, ethyl acetate, methylene chloride, or methyl tert-butyl ether. If after equilibration a greater concentration of the compound is present in the organic solvent than in the water, then the compound is considered hydrophobic.

Typically, the oil phase is any material which is or can be kept separate from the aqueous phase.

Generally less than 50% by weight, optionally less than 10% by weight, typically less than 5% by weight, such as less than 4%, less than 3%, less than 2%, or less than 1% by weight of an oil phase is soluble in an aqueous phase.

Examples of suitable materials for the oil phase include, but are not limited to, silicone oils, paraffin oils, triglycerides, fatty alcohols and ester oils. For the oil phase many animal fats and oils, vegetable fats and oils, mineral oils and waxes can be used. These include, but are not limited to, fatty acids (saturated or unsaturated), glycerols, glycerides and their respective derivatives, phospholipids and their respective derivatives, glycolipids, phytosterol and/or sterol esters (e.g. cholesterol esters, phytosterol esters and derivatives thereof).

a. Fatty Acids, Oils, and Waxes

Examples of saturated fatty acids include palmitic acid, stearic acid and behenic acid.

The oil phase may include oils, lipids, and fatty acids, such as oils, lipids, and fatty acids of plant, animal, or synthetic origin.

Examples of unsaturated fatty acids that may be included in the oil phase include, but are not limited to, myristoleic acid, palmitoleic acid, oleic acid, erucic acid, linoleic acid, linolenic acid, arachidonic acid and ricinoleic acid, and also mixtures thereof. The fatty acids may be in their respective ester form.

Examples of organic oils of animal origin include sperm whale oil, whale oil, sardine oil, herring oil, shark oil, and cod liver oil. Examples of waxes of animal origin include beeswax. Examples of organic oils of plant origin include rapeseed oil, sunflower oil, groundnut oil, olive oil, walnut oil, maize oil, soybean oil, linseed oil, hemp oil, grapeseed oil, coconut oil, palm oil, cottonseed oil, babassu oil, jojoba oil, sesame seed oil, castor oil, cocoa butter, shea butter, omega-3 fat alpha-linolenic acid (ALA) from flaxseeds, chia seeds, walnuts, and edamame, and algal omega-3 fatty acids eicosapentaenoic acid (EPA), and docosahexaenoic acid (DHA). Examples of mineral oils include naphthenic oils, paraffinic oils and polybutenes. The paraffin waxes may similarly be suitable for preparing the emulsion.

The oil phase may include cannabinoids, phytocannabinoids, cannabidiol, $\Delta^9$-tetrahydrocannabinol ($\Delta^9$-THC), $\Delta^8$-THC, cannabinol, cannabicyclol, synthetic compounds (such as JWH133, WIN55212-2, SR141716), endocannabinoids, such as the N-arachidonoylethanolamide (anandamide, AEA), 2-arachidonoylglycerol (2-AG), N-arachidonoyldopamine, N-arachidonoylglycerolether and O-arachidonoylethanolamine.

The oil phase may be a liquid fat/oil at room temperature and pressure, such as avocado oil, tsubaki oil, turtle oil, macadamia nut oil, corn oil, mink oil, olive oil, rape seed oil, egg yolk oil, sesame seed oil, persic oil, wheat germ oil, sasanqua oil, castor oil, linseed oil, safflower oil, cotton seed oil, perilla oil, soy bean oil, peanut oil, tea seed oil, kaya oil, rice bran oil, Chinese wood oil, Japanese wood oil, jojoba oil, germ oil, triglycerol, glyceryl trioctanoate and glyceryl triisopalmitate; solid fat/oil, such as cacao butter, coconut oil, horse tallow, hardened coconut oil, palm oil, beef tallow, sheep tallow, hardened beef tallow, palm kernel oil, pork tallow, beef bone tallow, Japanese core wax, hardened oil, neatsfoot tallow, Japanese wax and hydrogenated castor oil; wax, such as beeswax, candelilla wax, cotton wax, carnauba wax, bayberry wax, tree wax, whale wax, montan wax, bran wax, lanolin, kapok wax, lanolin acetate, liquid lanolin, sugar cane wax, lanolin fatty acid isopropyl ester, hexyl laurate, reduced lanolin, jojoba wax, hard lanolin, shellac wax, polyoxyethylene (POE) lanolin alcohol ether, POE lanolin alcohol acetate, lanolin fatty acid polyethylene glycol and POE hydrogenated lanolin alcohol ether, etc.; or a hydrocarbon, such as liquid petrolatum, ozokerite, squalene, pristane, paraffin, ceresin, and microcrystalline wax; synthetic esters include isopropyl myristate, cetyl octanoate, octyldodecyl myristate, isopropyl palmitate, butyl stearate, hexyl laurate, myristyl myristate, decyl oleate, hexyldecyl dimethyloctanoate, cetyl lactate, myristyl lactate, lanolin acetate, isocetyl stearate, isocetyl isostearate, cholesteryl 12-hydroxystearate, ethylene glycol di-2-ethylhexylate, dipentaerythritol fatty acid ester, N-alkyl glycol monoisostearate, neopentyl glycol dicaprylate, diisostearyl malate, glyceryl di-2-heptylundecanoate, trimethylolpropane tri-2-ethylhexylate, trimethylolpropane triisostearate, pentaerythritol tetra-2-ethylhexylate, glyceryl tri-2-ethylhexylate, trimethylolpropane triisostearate, cetyl 2-ethylhexanoate, 2-ethylhexyl palmitate, glyceryl trimyristate, tri-2-heptylundecanic acid glyceride, castor oil fatty acid methyl ester, oleyl oleate, cetostearyl alcohol, acetoglyceride, 2-heptylundecyl palmitate, diisopropyl adipate, 2-octyldodecyl N-Iauroyl-L-glutamate, di-2-heptylundecyl adipate, ethyl laurate, di-2-ethylhexyl sebacate, 2-hexyldecyl myristate, 2-hexyldecyl palmitate, 2-hexyldecyl adipate, diisopropyl sebacate, 2-ethylhexyl succinate, ethyl acetate, butyl acetate, amyl acetate, or triethyl citrate.

2. Aqueous Phase

The aqueous phase contains an aqueous medium in which the first oil phase is able to disperse.

The aqueous phase contains water, and typically includes one or more additives, such as surfactants, initiators, buffers, and/or polymerizable monomers or macromers.

The water in the aqueous phase may be purified water, filtered water, deionized water, distilled water, double distilled water, or water containing mineral impurities.

Typically, the aqueous phase contains a material that is substantially hydrophilic, i.e., the molecules forming the material have a greater affinity for, and thus solubility in, water as compared to organic solvents. The hydrophilicity of a material can be determined by measuring its partition coefficient between water (or a buffered aqueous solution) and a water-immiscible organic solvent, such as octanol, ethyl acetate, methylene chloride, or methyl tert-butyl ether. If after equilibration a greater concentration of the material is present in the water than in the organic solvent, then the material is hydrophilic.

a. Polymerizable Monomer or Macromer

The polymerizable monomer or macromer is generally a hydrophilic molecule with little (e.g., less than 10% by weight, such as less than 5% by weight, such as less than 4%, less than 3%, less than 2%, or less than 1% by weight) or no solubility in the oil phase. Typically, the polymerizable monomer or macromer does not interfere with the surface activity of the surfactant. Similarly, the polymerizable monomer or macromer generally does not strongly interact with (such as form intermolecular bonds) the surfactant. Strong interactions include interactions of the polymerizable monomer or macromer with the surfactant such that the surfactant layer surrounding the oil phase is disrupted. Typically, the polymerizable monomer or macromer does not prevent the surfactants from adsorbing to the oil-aqueous phase interface.

Examples of suitable polymerizable monomers or macromers include acrylic acid, acrylonitrile, vinyl acetate, methacrylate, methacrylic acid, ethylene oxide, ethylene glycol, N,N-dimethylacrylamide, 2-hydroxyethyl methacrylate, 4-vinylpyridine, 2-hydroxyethyl acrylate (HEA), N,N-dimethylaminoethyl methacrylate, quaternary ammonium compounds, and derivatives thereof. Quaternary ammonium compounds are cationic compounds that have a protonated basic nitrogen atom, or include quaternary nitrogen atoms. Exemplary quaternary ammonium compounds include N,N-dimethylaminoethyl acrylate, N,N-dimethylaminoethyl methacrylate, allylamine, vinylamine, L-lysine, ornithine, L-arginine, and D-glucosamine.

Other examples of suitable macromers are crosslinkable polymers, such as polyimide, poly(ethylene glycol) diacrylate (PEGDA), and poly(ethylene glycol) diacrylamide (PEGDAA); polysaccharides, such as celluloses, alginates, chitosans, hyaluronic acid, glucosaminoglycans, dimethylaminoethyl (DEAE)-cellulose, and DEAE-dextran; hydrophilic poly(amino acids), such as poly-L-glutamic acid, gamma-polyglutamic acid, poly-L-aspartic acid, poly-L-serine, polyornithine, poly-L-arginine, and poly-L-lysine; poly(oxyethylated polyol); poly(olefinic alcohol), such as poly(vinyl alcohol) and aminoacetalized poly(vinyl alcohol); poly(N-vinylpyrrolidone); poly(amidoamine); acrylic or acrylate, and alkacrylic or alkacrylate polymers such as poly(acrylic acid), poly(acrylate), poly(methacrylic acid), poly(methacrylate), poly(hydroxyethyl acrylate); poly(N,N-dimethylaminoethyl methacrylate), poly(N,N-dimethylaminoethyl acrylate), poly(hydroxyalkyl methacrylate) e.g. poly(hydroxyethyl methacrylate); acrylamide polymers such as poly(acrylamide), poly(N,N-dimethylacrylamide), poly(hydroxyalkyl methacrylamide) e.g. poly(hydroxyethyl methacrylamide; poly(ethylene imine); poly(allylamine); poly(vinylamine); and poly(4-vinylpyridine); and copolymers thereof.

i. Solubility in Aqueous Phase

Generally, the macromer or monomer is at least as soluble in aqueous phase as PEGDA having a number average molecular weight of 575 g/mol. Optionally, the macromer or monomer is at least as soluble in aqueous phase as PEGDA having a number average molecular weight between 575 and 20,000 g/mol, 575 and 40,000 g/mol, or 575 and 60,000 g/mol, such as PEGDA having a number average molecular weight of 10,000 g/mol, or 20,000 g/mol.

Examples of macromers with similar solubilities to PEGDA having a number average molecular weight of between 575 and 60,000 g/mol include, but are not limited to, poly(acrylamide) (PAM), poly(vinyl alcohol) (PVOH), poly(acrylic acid) (PAA), poly(ethylene glycols), poly(amino acids), polyamines, poly(ethylene imines), quaternary ammonium compounds, poly(vinylpyrrolidone) (PVP), poly(vinyl methyl ether/maleic anhydride), and derivatives thereof, and copolymers containing any one or more of these macromers.

ii. Molecular Weight of Monomers and Macromers

The molecular weight of the monomer or the macromer may be between 100 g/mol and 1,000,000 g/mol. For macromers the molecular weight refers to the number average molecular weight. Typically, the macromer has a number average molecular weight between 500 g/mol and 1,000,000 g/mol. Exemplary number average molecular weights of the macromers are between about 500 g/mol and 60,000 g/mol, about 700 g/mol and 60,000 g/mol, about 700 g/mol and 50,000 g/mol, about 700 g/mol and 40,000 g/mol, about 700 g/mol and 30,000 g/mol, about 700 g/mol and 20,000 g/mol, about 700 g/mol and 10,000 g/mol, about 500 g/mol and 10,000 g/mol, about 500 g/mol and 1,000 g/mol, or about 700 g/mol, 10,000 g/mol, or about 20,000 g/mol.

Typically the molecular weight of the monomer ranges from 100 g/mol to 1,500 g/mol. Exemplary molecular weights of the monomers are between about 100 g/mol and 1,500 g/mol, such as between about 200 g/mol and 1,500 g/mol, about 300 g/mol and 1,500 g/mol, about 400 g/mol and 1,500 g/mol, about 500 g/mol and 1,500 g/mol, about 700 g/mol and 1,500 g/mol, about 800 g/mol and 1,500 g/mol, about 900 g/mol and 1,500 g/mol, about 1,000 g/mol and 1,500 g/mol, about 1,100 g/mol and 1,500 g/mol, about 1,200 g/mol and 1,500 g/mol, about 1,300 g/mol and 1,500 g/mol, or about 1,400 g/mol and 1,500 g/mol.

Typically, the molecular weight of the monomer or number average molecular weight of the macromer is a value, or a range of values, at which the monomer or macromer is soluble in the aqueous phase, and does not interfere with the surface activity of the surfactant. The interference with the surface activity of the surfactant may be determined by measuring the stability of the nanodroplets within the nanoparticles or nanoemulsions. In one aspect, the interference with the surface activity is measured by measuring the stability of the nanoemulsions. In another aspect, the interference with the surface activity may be measured by measuring the size and dispersity of the nanodroplets in the nanoparticles. In another aspect, the interference with the surface activity may be measured by measuring the contact angle of the liquids comprising the nanoemulsions. An exemplary method for measuring the interference with the surface activity of the surfactant is cryo-transmission electron microscopy (cryo-TEM) of the nanoparticles, as described in Example 5.

iii. Phase Change Macromers

The macromers may be phase change macromers undergoing a transition in state, such as from liquid to gel or solid, dependent on the changes to the physical and chemical conditions in the nanoemulsion. The phase change of a macromer may be dependent on changes in temperature, pH, or ionic strength. Exemplary macromers and polymers include poly(ethylene glycol), polysaccharides, and polyurethanes.

Exemplary ranges of pH for polymerizing the macromers include between 2 and 9, such as between 3 and 8.

Exemplary ionic strength for polymerizing the macromers include between 0 M and 0.4 M, such as between 0.01 M and 0.4 M, or between 0.01 M and 0.1 M.

An example of a phase change macromer includes polysaccharides, such as alginate, which can be physically cross-linked by the addition of multivalent cations, such as calcium ($Ca^{2+}$), at pH above 3.4.

iv. Modification of Aqueous Phase Properties

The monomers or macromers may dissolve, disperse, or swell in water and thus modify the physical properties of aqueous phase of the nanoemulsion. Monomers and macromers may be selected for the effects that they impart on the aqueous phase of the nanoemulsions and/or the resulting polymers that are formed and the effects of the polymers on the nanoparticles. For example, monomers and macromers may be selected to increase or reduce the gelation time of the aqueous phase, to increase the stability of the nanoemulsions, or to regulate the release of nanodroplets from the nanoemulsions. Monomers or macromers may also be selected to increase the stability of nanoparticles forming from the nanoemulsion, to increase the biocompatibility of the nanoparticles, to control the mesh size, the types of cargo one can load, or to control the rate of release of nanodroplets from the nanoparticles. For example, the monomers or macromers for a nanoparticle polymer may be selected to control of release rate of nanodroplets from the nanoparticles via pH-triggered swelling/degradation of polymer.

v. Concentration in Aqueous Phase

The monomers or macromers may be present in the aqueous phase of a nanoemulsion in a volume fraction between 0.1 and 0.9, between 0.1 and 0.8, between 0.1 and 0.7, between 0.1 and 0.6, between 0.1 and 0.5, between 0.1 and 0.4, between 0.1 and 0.3, and between 0.1 and 0.2. The volume fraction of the monomer or macromer may be between 0.01 and 0.9, between 0.01 and 0.8, between 0.01 and 0.7, between 0.01 and 0.6, between 0.01 and 0.5, between 0.01 and 0.4, between 0.01 and 0.3, and between 0.01 and 0.2. For example, when the macromer is PEGDA of about 700 g/mol, the volume fraction of PEGDA may be between 0.1 and 0.6, and preferably, between 0.1 and 0.4 of the aqueous phase.

Generally, volume fraction refers to a fraction out of 1 by volume for a particular component. For example, an aqueous phase volume fraction (presented as $\Phi^W$) of water is 1 (or 100% of the volume). For example, an additive to the aqueous phase that is another liquid at room temperature and pressure, such as polyethylene glycol with an average molecular weight of 200 (PEG200), forming a 1% solution by volume in the aqueous liquid will have a volume fraction of $\varphi^{W}_{PEG200}=0.01$.

The volume fraction for particular monomers or macromers in the aqueous phase of a nanoemulsion can be determined using an in situ test, such as described in Example 3.

b. First Surfactant

The surfactants may be characterized based on their hydrophilic-lipophilic balance (HLB). The HLB of a surfactant is a measure of the degree to which it is hydrophilic or lipophilic, and may be determined by calculating values for the different regions of the molecule, as described for example by Griffin, *J. Soc. Cosmetic Chemists* 311-326 (1949), and Davies, Gas/Liquid and Liquid/Liquid Interfaces. Proceedings of 2nd International Congress Surface Activity, Butterworths, London, pp. 426-438 (1957).

Surfactants may also be characterized based on their packing parameter. Typically, the packing parameter for a surfactant (p) can be determined using Equation 1 below:

$$p = v_o/a_e l_o \quad \text{(Equation 1)}$$

where $v_o$ is the surfactant tail volume, $l_o$ is the tail length, and $a_e$ is the equilibrium area per molecule at the aggregate surface.

Generally, surfactants with packing parameters that are greater than 1 form water-in-oil emulsions, whereas those with packing parameters that are less than 1 form oil-in-water emulsions.

Surfactants with packing parameters of about 1 generally correspond to an HLB value of 10; those with packing parameters of greater than 1 correspond to HLB value of less than 10; and those with packing parameters of less than 1 correspond to HLB value of greater than 10.

The HLB value can be used to predict the surfactant properties of a molecule, as described in Table 1.

TABLE 1

HLB value and associated surfactant properties

| HLB value | Surfactant Property |
| --- | --- |
| <10 | Lipid-soluble (water-insoluble) |
| >10 | Water-soluble (lipid-insoluble) |
| 1.5 to 3 | anti-foaming agent |
| 3 to 6 | W/O (water* in oil) emulsifier |
| 7 to 9 | wetting and spreading agent |
| 13 to 15 | detergent |
| 12 to 16 | O/W (oil in water*) emulsifier |
| 15 to 18 | solubilizer or hydrotrope |

*water or "W" refers to aqueous phase

Examples of suitable surfactants include glyceryl monostearate (HLB about 3.8), polyoxyethylene monooleate (HLB about 11.4), polyoxyethylene monostearate (HLB about 11.6), polyoxyethylene monolaurate (HLB about 13.1), potassium oleate (HLB about 20.0), sodium lauryl sulfate (HLB about 40), sodium oleate (HLB about 18), SPAN® 20 (Sorbitan monolaurate, HLB about 8.6), SPAN® 40 (Sorbitan monopalmitate, HLB about 6.7), SPAN® 60 (Sorbitan monostearate, HLB about 4.7), SPAN® 65 (Sorbitan tristearate, HLB about 2.1), SPAN® 80 (Sorbitan monooleate, HLB about 4.3), SPAN® 85 (Sorbitan trioleate, HLB about 1.8), triethanolamine oleate (HLB about 12), TWEEN® 20 (Polyoxyethylene sorbitan monolaurate, HLB about 16.7), TWEEN® 21 (Polyoxyethylene sorbitan monolaurate, HLB about 13.3), TWEEN® 40 (Polyoxyethylene sorbitan monopalmitate, HLB about 15.6), TWEEN® 60 (Polyoxyethylene sorbitan monostearate, HLB about 14.9), TWEEN® 61 (Polyoxyethylene sorbitan monostearate, HLB about 9.6), TWEEN® 65 (Polyoxyethylene sorbitan tristearate, HLB about 10.5), TWEEN® 80 (Polyoxyethylene sorbitan monooleate, HLB about 15.0), TWEEN® 81 (Polyoxyethylene sorbitan monooleate, HLB about 10.0), or TWEEN® 85 (Polyoxyethylene sorbitan trioleate, HLB about 11.0).

Examples of surfactants for the aqueous phase include lipophilic non-ionic surfactants such as sorbitan fatty acid esters including sorbitan monooleate, sorbitan monoisostearate, sorbitan monolaurate, sorbitan monopalmitate, sorbitan monostearate, sorbitan sesquioleate, sorbitan trioleate, diglycerolsorbitan penta-2-ethylhexylate and diglycerolsorbitan tetra-2-ethylhexylate, etc., glycerine polyglycerine fatty acids including monocottonseed-fatty acid glyceryl ester, glyceryl monoerucate, glyceryl sesquioleate, glyceryl monostearate, glyceryl α, α'-oleate pyroglutamate and glyceryl monostearate monomalate, propylene glycol fatty acid esters including propylene glycol monostearate, as well as hydrogenated castor oil derivatives, and glycerol alkyl ether.

The surfactant may be present in the aqueous phase at any suitable concentration that forms a nanoemulsion. For example, the concentration of the surfactant in the aqueous phase may be between 0.1 mM and 500 mM, such as between 1 mM and 400 mM, between 10 mM and 300 mM, between 10 mM and 200 mM, or between 10 mM and 100 mM. In some aspects, the concentration of the surfactant may be between 1 mM and 200 mM, such as between 1 mM and 100 mM, or between 50 mM and 150 mM.

Typically, surfactants with HLB between 3 and 6 tend to form a water-in-oil (W/O) emulsion, while those with HLB between 8 and 16 or even up to 17 tends to form an oil-in-water emulsion. For the inner oil droplets, TWEEN® 20 (HLB~16.7) may be used to form oil-in-water nanoemulsions. In place of TWEEN® 20, another surfactant with an HLB in the range of 8 to 17 or with a packing parameter between ½ and 1 (i.e. ½<p<1) may be used. Other examples of surfactants for forming oil-in-water nanoemulsions include TWEEN® 40 (HLB 15.6), TWEEN® 60 (HLB 14.9), TWEEN® 80 (HLB 15.0), BRIJ® L23 (HLB 16.9), and BRIJ® 58 (15.7).

c. Cargo

One or more materials may be included in the oil phase, in the aqueous phase, or both the oil phase and the aqueous phase of the nanoemulsion. The cargo in the oil phase and in the aqueous phase may be the same or different. Generally, the cargo in the oil phase is lipophilic, while the cargo in the aqueous phase is hydrophilic.

The cargo may include fertilizers and other agricultural agents, industrial agents, food agents, cosmetic agents, pharmaceutical agents, or any combination thereof. One of skill in the art would appreciate that the cargo listed herein is only an example, and other materials may be incorporated into compositions, as needed for a particular application.

The concentration of one or more compounds included as cargo may vary as needed for the particular application. Suitable concentrations for cargo in the first nanoemulsion may be between picomoles and nanomoles, between nanomoles and micromoles, or between micromoles and millimoles. For example, the concentration of cargo in the first nanoemulsion may be between 0.1 pM and 1000 pM, between 0.1 nM and 100 nM, between 0.1 μM and 10 mM, between 0.1 mM and 10 mM. The concentration of the cargo in the nanoemulsions or nanoparticles may be between 1 nM and 1000 mM, between 1 mM and 100 mM, between 1 mM and 10 mM. The concentration of the cargo in the nanoemulsions or nanoparticles may be between 0.01 mM and 1000 mM, between 0.01 mM and 100 mM, between 0.01 mM and 10 mM.

For example, the concentration of cargo in the first nanoemulsion may be between 0.1 percent by volume (vol. %) and 50 vol. %, between 1 vol. % and 50 vol. %, between 10 vol. % and 50 vol. %, or between 10 vol. % and 30 vol. %. For example, in nanoemulsions in which the cargo is an encapsulated oil itself, the concentration of the cargo is typically between 10 to 50 vol %. Similarly, in nanoemulsions in which the cargo is solid nanoparticles (e.g. drug particles, quantum dots, etc.), suitable concentrations of the cargo are within the range of 10 to 50 vol %. In nanoemulsions, in which the cargo is a hydrophobic dissolved solute in the in the first oil phase and/or in the second oil phase, or is a hydrophilic dissolved solute in the aqueous phase, then the concentration of the dissolved solute may be between 0.1 pM and 100 mM, or between 100 pM and 10 mM.

d. Liquid or Gel Aqueous Phase

Typically, the aqueous phase of the first nanoemulsion is a liquid at room temperature and pressure.

In some embodiments, the aqueous phase of the first nanoemulsion may be in the form of a gel at room temperature and pressure. In these embodiments, the nanoparticles may be referred to as nanogels.

The aqueous phase in the nanoemulsion contains the oil nanodroplets therein. The continuous matrix in the nanoparticles contains the oil nanodroplets therein. In the nanoparticles, the oil nanodroplets are dispersed within the continuous phase.

Generally, gels include a three-dimensional network of a polymer that spans the volume of an aqueous phase. This internal network structure may result from physical bonds (physical gels) or chemical bonds (chemical gels). Gels typically have rigidity that may be influenced by the concentration and the molecular weight of the polymer, by environmental conditions, such as temperature and pressure, as well as by the presence of crosslinking agents, such as initiators and activators.

Gels generally may be described by their swelling ratio in an aqueous medium. Typically, the gelled aqueous phase of the nanoemulsion may have a swelling ratio (Q) of between 1.5 and 10, between 1.5 and 5, or between 2 and 5 in an aqueous environment. Typically, swelling ratio may be calculated by measuring the volume of a gel in dry form and the volume of the same gel in the swollen form after reaching an equilibrium state (no change in volume when stored in deionized water at room temperature). Swelling ratio is typically the ratio between the volume in the swollen state after reaching equilibrium and the volume in the dry state at room temperature and pressure (see Table 3).

The swelling ratio may also be determined by the change in distance between the crosslinked polymer chains (mesh size, see Table 3) (Molina et. al., *Macromolecules*, 48:5402-5411 (2015)). The change in distance between the crosslinked polymer chains may be any value, such as 1.5 times, two times, three times, four times, five times, six times, seven times, eight times, nine times, ten times or more, 20 times or more, 30 times or more, 40 times or more, 50 times or more, 60 times or more, 70 times or more, 80 times or more, 90 times or more, 100 times or more, 200 times or more, 300 times or more, 400 times or more, 500 times or more, 600 times or more, 700 times or more, 800 times or more, 900 times or more, or 1000 times or more over the distance in unswollen nanoparticle.

The distance between the crosslinked polymer chains in the swollen state may not be greater than the diameter of nanodroplets. In this aspect, the oil nanodroplets remain within the nanogels.

In some aspects, the change in distance between the crosslinked polymer chains is such that this distance in the swollen state is greater than the diameter of nanodroplets. In this aspect, the oil nanodroplets are released from the nanoparticles following swelling of the nanogels. In this aspect, controlling the rate of swelling may be used to control the rate of release of the oil nanodroplets. For example, nanoparticles may include polymers that swell over a period of time, and reach a swelling state after about 10 min, 20 min, 30 min, 40 min, 50 min, 60 min, two hours, three hours, or more, during which distance between the crosslinked polymer chains is greater than the diameter of nanodroplets. In this swollen state, the nanoparticles may begin to release the nanodroplets.

B. Second Nanoemulsion

The first nanoemulsion, when dispersed in the second oil phase, forms a second nanoemulsion.

The second nanoemulsion may include a second surfactant in the second oil phase. The second nanoemulsion may include initiators and activators.

Typically, the first nanoemulsion, when dispersed in the second oil phase, forms nanoparticles of the O/W dispersed in the oil phase, or a O/W/O double emulsion. The aqueous phase of the double emulsion may be a liquid, a gel, or a solid, and may be referred to as continuous matrix when nanoparticles are formed from the double nanoemulsion.

1. Second Oil Phase

The second oil phase is typically an oil that may be the same oil as that for the first oil phase ($O_1/W/O_1$), or different ($O_1/W/O_2$). Typically, the oil for the second oil phase can be any of the oils listed for the first oil phase.

In some embodiments, the second oil is different from the first oil. For example, the second oil may be of lower molecular weight, of lower density, of higher volatility at room temperature and pressure, or of higher solubility in organic solvents than the first oil. The differences in properties between the first oil and second oil may be used to stabilize the double nanoemulsion, to increase the encapsulation efficiency of the double nanoemulsion, or to help with purification of the nanoparticles from the double nanoemulsions.

The first oil phase, the second oil phase, or both the first oil phase and the second oil phase may include linear alkanes such as pentane, hexane, heptane, octane, nonane, decane, undecane, dodecane, pentadecane, and hexadecane; cyclic alkanes such as cyclohexane, cycloheptane, cyclooctane, cyclononane, and cyclodecane, fatty acid esters such as ethyl caprylate propyl caprylate, nonyl caprylate, stearyl caprylate, ethyl decanoate, butyl decanoate, hexyl decanoate, dodecyl decanoate, butyl octanoate, octyl octanoate, heptyl octanoate, stearyl heptanoate, isopropyl palmitate, cetyl palmitate, lauryl palmitate, stearyl palmitate, stearyl heptanoate, stearyl behenate and stearyl olivate, stearyl stearate, octyl stearate, ethyl dotriacontanoate, methyl laurate, ethyl laurate, hexyl laurate, methyl myristate, and ethyl myristate; or fatty alcohols such as octanol, decanol, undecanol, lauryl alcohol, myristyl alcohol, hexadecanol, stearyl alcohol, oleyl alcohol, arachidyl alcohol, behenyl alcohol, lignoceryl alcohol, ceryl alcohol, heptacosanol, octacosanol, nonacosanol, myricyl alcohol, dotriacontanol, and geddyl alcohol.

a. Second Surfactant

Typically, the second oil phase includes a second surfactant. The second surfactant may be any one or a combination of the surfactants listed for the first surfactant. The second surfactant may be the same as the first surfactant, or different.

Typically, the surfactants used to form O/W/O nanoemulsion are a combination of surfactants. For example, a combination of surfactants SPAN® 80 and TWEEN® 80 may be used. SPAN® 80 has a HLB of 4.3, while TWEEN® 80 has a HLB of 15.0. The combined HLB of the two is around 6.8 based on volume fraction. This surfactant combination can be replaced with a different surfactant of similar HLB index, and the amount of the surfactant may be modified to achieve a combined HLB of similar value of about 6.8. Some non-ionic surfactants that could be used to replace SPAN® 80 are SPAN® 83 (HLB 3.7), SPAN® 60 (HLB 4.7), SPAN® 120 (HLB 4.7), BRIJ® 93 (4), or BRIJ® S2 (4.9). In place of SPAN® 80, another surfactant with a packing parameter between 1 and 2 (i.e. $1<p<2$) may be used.

In some embodiments, the second surfactant is a different from the first surfactant. For example, the second surfactant may have a HLB of between 2 and 15, or between 2 and 12.

In some embodiments the second surfactant is a mixture of at least two surfactants, at least three surfactants, or more.

b. Initiators and Activators

Suitable initiators and activators for polymerizing and crosslinking the polymerizable monomer or macromer are known in the art. These include, but are not limited to, free radical initiators, atom transfer radical polymerization (ATRP) initiators, nitroxide mediated polymerization (NMP) initiators, ionic polymerization initiators, amine photochemical coinitiators, and organic photoinitiators.

Chemical crosslinking agents include difunctional molecules including diamines and dicarboxylic acids, such as 1,11-diamino-3,6,9-trioxaundecane. Crosslinking agents include divalent, trivalent, and multivalent metal ions, such as magnesium, calcium, or copper, and/or trivalent metal ions, such as iron or aluminum.

Two classes of initiators are peroxide and azo compounds. Radicals may be generated by thermal or ambient redox conditions. Decomposition rates for some initiators vary with pH and the presence of amines Examples of azo compounds include 4,4'-Azobis(4-cyanovaleric acid), 1,1'-Azobis(cyclohexanecarbonitrile), Azobisisobutyronitrile, 2,2'-Azobis(2-methylpropionamidine) dihydrochloride, and 2,2'-Azobis(2-methylpropionitrile). Examples of suitable inorganic peroxides as initiators include ammonium persulfate, hydroxymethanesulfinic acid monosodium salt, potassium persulfate, and sodium persulfate. Examples of organic peroxides include tert-Butyl hydroperoxide, cumene hydroperoxide, 2,5-Di(tert-butylperoxy)-2,5-dimethyl-3-hexyne, Dicumyl peroxide, LUPEROX® 101 (2,5-Bis(tert-butylperoxy)-2,5-dimethylhexane), LUPEROX® 224, 2,4-Pentanedione peroxide solution ~34 wt. % in 4-hydroxy-4-methyl-2-pentanone and N-methyl-2-pyrrolidone, LUPEROX® 231, 1,1-Bis(tert-butylperoxy)-3,3,5-trimethylcyclohexane, LUPEROX® 331M80, 1,1-Bis(tert-butylperoxy)cyclohexane, LUPEROX® 531M80, 1,1-Bis(tert-amylperoxy)cyclohexane, LUPEROX® A70S, and benzoyl peroxide.

Examples of suitable ATRP initiators include 2-Azidoethyl 2-bromoisobutyrate, Bis[2-(2'-bromoisobutyryloxy)ethyl]disulfide, Bis[2-(2-bromoisobutyryloxy)undecyl] disulfide, 2-Bromoisobutanoic acid N-hydroxysuccinimide ester, 2-Bromoisobutyric anhydride, α-Bromoisobutyryl bromide, 2-(2-Bromoisobutyryloxy)ethyl methacrylate, tert-Butyl α-bromoisobutyrate, 3-Butynyl 2-bromoisobutyrate, Dipentaerythritol hexakis(2-bromoisobutyrate), Dodecyl 2-bromoisobutyrate, Ethylene bis(2-bromoisobutyrate), 2-Hydroxyethyl 2-bromoisobutyrate, 1-(DL-1,2-Isopropylideneglyceryl) 2-bromoisobutyrate, Methyl α-bromoisobutyrate, 2-(4-Morpholino)ethyl 2-bromoisobutyrate, Octadecyl 2-bromoisobutyrate, Pentaerythritol tetrakis(2-bromoisobutyrate), 1-(Phthalimidomethyl) 2-bromoisobutyrate, Poly(ethylene glycol) bis(2-bromoisobutyrate) average Mn 2,200, Poly(ethylene glycol) bis(2-bromoisobutyrate) average Mn 4,300, Poly(ethylene glycol) bis(2-bromoisobutyrate) average Mn 1,000, Poly(ethylene glycol) methyl ether 2-bromoisobutyrate average Mn 2,000, Poly(ethylene glycol) methyl ether 2-bromoisobutyrate average Mn 600, Poly(ethylene glycol) methyl ether 2-bromoisobutyrate average Mn 5,000, Poly(ethylene glycol) methyl ether 2-bromoisobutyrate average Mn 1,200, Propargyl 2-bromoisobutyrate, 1,1,1-Tris(2-bromoisobutyryloxymethyl)ethane, and 10-Undecenyl 2-bromoisobutyrate.

Examples of suitable NMP initiators include N-tert-Butyl-O-[1-[4-(chloromethyl)phenyl]ethyl]-N-(2-methyl-1-phenylpropyl)hydroxylamine, N-tert-Butyl-N-(2-methyl-1-phenylpropyl)-O-(1-phenylethyl)hydroxylamine, 2,2,5-Trimethyl-4-phenyl-3-azahexane-3-nitroxide, 2,2,6,6-Tetramethyl-1-piperidinyloxy (TEMPO), and TEMPO methacrylate.

Examples of suitable ionic polymerization initiators include aluminum chloride, antimony(V) chloride, boron trifluoride, n-butyllithium, sec-butyllithium, perchloric acid, titanium(IV) chloride, and zinc chloride.

i. Thermal Initiators

Examples of thermal initiators include tert-amyl peroxybenzoate, 4,4-Azobis(4-cyanovaleric acid), 1,1'-Azobis(cyclohexanecarbonitrile), 2,2'-Azobisisobutyronitrile (AIBN), Benzoyl peroxide, 2,2-Bis(tert-butylperoxy)butane, 1,1-Bis(tert-butylperoxy)cyclohexane, 2,5-Bis(tert-butylperoxy)-2,5-dimethylhexane, 2,5-Bis(tert-Butylperoxy)-2,5-dimethyl-3-hexyne, Bis(1-(tert-butylperoxy)-1-methylethyl)benzene, 1,1-Bis(tert-butylperoxy)-3,3,5-trimethylcyclohexane, tert-Butyl hydroperoxide, tert-Butyl peracetate, tert-Butyl peroxide, tert-Butyl peroxybenzoate, tert-Butylperoxy isopropyl carbonate, Cumene hydroperoxide, Cyclohexanone peroxide, Dicumyl peroxide, Lauroyl peroxide, 2,4-Pentanedione peroxide, Peracetic acid, and potassium persulfate, ii. Photo Initiators Examples of amine photochemical coinitiators include 4,4'-Bis(diethylamino)benzophenone, 4-(Diethylamino) benzophenone, 2-(Diethylamino)ethyl acrylate and monomethyl ether hydroquinone (MEHQ), 2-(Diethylamino)ethyl methacrylate and MEHQ, 4-(Dimethylamino) benzophenone, 2-(Dimethylamino)ethyl acrylate and MEHQ, 3-(Dimethylamino)propyl acrylate, Ethyl 4-(dimethylamino)benzoate, 2-Ethylhexyl 4-(dimethylamino)benzoate, Isoamyl 4-(dimethylamino)benzoate (mixture of isomers), and Michler's ketone.

Examples of suitable organic photoinitiators include thioxanthones, such as 1-Chloro-4-propoxy-9H-thioxanthen-9-one, 2-Chlorothioxanthen-9-one, 2,4-Diethyl-9H-thioxanthen-9-one, Isopropyl-9H-thioxanthen-9-one, mixture of 2- and 4-isomers, 10-Methylphenothiazine, Thioxanthen-9-one, and 2-hydroxy-2-methylpropiophenone.

C. Stability

The double nanoemulsions are sufficiently stable at room temperature and pressure to form nanoparticles via polymerization of the polymerizable monomer or macromer. Typically, the double nanoemulsions are stable for at least two hours, at least six hours, or up to six months at room temperature and pressure.

Emulsion stability is the ability to resist change in size over time. Generally, there are four types of instability in emulsions: flocculation, creaming, coalescence, and Ostwald ripening. Due to each of these processes, the size of the droplets in the emulsion increase over time. For example, in double nanoemulsions, coalescence may involve the movement of the inner ($O_1$) oil droplets through the aqueous phase (W) to coalesce with the outer phase ($O_1$ or $O_2$) oil phase.

Generally, an emulsion is considered to be stable over a particular time period if each phase in the emulsion does not separate or sediment over the particular period of time. An emulsion may be considered to be of limited stability if the droplets change size substantially over a time period of minutes (e.g., 1-10 minutes, 1-20 minutes, 1-30 minutes, or up to 1 hour) or hours (1 hour, 2 hours, 3 hours, or up to 10 or 20 hours) following formation of the emulsion. An emulsion may be considered stable if the droplet size is stable from hours to days or weeks to months following formation of the emulsion.

The nanoparticle size in the double nanoemulsions may be measured with any suitable method and monitored over time. Suitable methods include dynamic light scattering (DLS), cryogenic-transmission electron microscopy (cryo-TEM), small angle x-ray scattering (SAXS), or small angle neutron scattering (SANS). Typically, the size of nanoparticles in the double nanoemulsions remains substantially unchanged for a period of at least two hours, at least four hours, at least six hours, at least eight hours, or up to six months when stored at room temperature and pressure. The double nanoemulsions are therefore stable for a long enough time to allow templating and nanoparticle formation.

The stability of double nanoemulsions can also be determined by measuring the encapsulation efficiency over time and determining whether it changes over time. The stability of the $O_1/W/O_2$ double nanoemulsions can be determined by measuring the coalescence of the $O_1$ phase with the $O_2$ phase over time, during which the encapsulation efficiency reduces.

The stability of nanoemulsions and nanoparticles may be measured as a length of time during which the nanodroplets remain suspended in the aqueous phase without a substantial change in the nanodroplet size (e.g. less than 10% change in the nanodroplet size over a particular time period). Examples of stability may include double nanoemulsions or nanoparticles stable for at least about two hours, four hours, six hours, eight hours, 10 hours, 12 hours, 14 hours, 16 hours, 18 hours, 20 hours, 22 hours, 24 hours, three days, seven days, 10 days, 12 days, 14 days, 16 days, 18 days, 20 days, 22 days, 24 days, 26 days, 28 days, one month, two months, three months, four months, five months, or six months at room temperature and pressure.

Typically, the nanoemulsions are stable for at least about two hours, four hours, six hours, eight hours, 10 hours, 12 hours, 14 hours, 16 hours, 18 hours, 20 hours, 22 hours, 24 hours, three days, or even up to seven days, or longer, in the absence of hardening or stabilizing agents, such as clay, minerals, organophilic clay minerals, silicone dioxide, polysaccharides, solid particles, naphthenic acids, asphaltenes, or mixtures thereof.

Typically, the nanoemulsions are stable at pH between 2 and 9, such as between 3 and 8. Typically, the nanoemulsions are stable in solutions with ionic strengths between 10 and 100 mM, such as between 20 and 80 mM, such as about 50 mM. In some aspects, the nanoemulsions are stable in solutions with a at pH between 2 and 9, such as between 3 and 8, and with an ionic strengths between 10 and 100 mM, such as between 20 and 80 mM, such as about 50 mM. The nanoemulsions may remain stable for at least about two hours, four hours, six hours, eight hours, 10 hours, 12 hours, 14 hours, 16 hours, 18 hours, 20 hours, 22 hours, 24 hours, three days, seven days, 10 days, 12 days, 14 days, 16 days, 18 days, 20 days, 22 days, 24 days, 26 days, 28 days, one month, two months, three months, four months, five months, or six months at room temperature and pressure, at pH between 3 and 8, and ionic strength up to about 50 mM.

D. Encapsulation Efficiency

The encapsulation efficiency of double emulsions typically refers to the amount of inner oil droplet phase remaining suspended in the aqueous phase relative to the initial oil content.

The encapsulation efficiency can be determined by measuring the volume/weight of the oil encapsulated in an aqueous phase over time.

For each sample, the oil encapsulation efficiency ($\varepsilon$) can be determined according to Equation 2 below:

$$\varepsilon = \frac{\text{measured oil content}}{\text{initial oil content}} \qquad \text{(Equation 2)}$$

where the initial and final amounts of oil may be measured by any suitable methods known in the art (Pal, *Colloids Surfaces A Physicochem. Eng. Asp.* 84 (2-3):141-193 (1994). Examples of suitable methods include destructive techniques and non-destructive techniques, depending upon whether or not the emulsion undergoes any permanent degradation during the measurement. The destructive techniques include titration and related methods, total organic carbon analysis, centrifugation, distillation, flash vaporization, solvent extraction and differential scanning calorimetry. The non-destructive techniques include electrical methods (capacitance/conductance techniques), microwave-based techniques, radiation scattering techniques (turbidity measurement, neutron scattering, depolarization measurement), spectroscopic techniques (infrared (IR) absorption, ultraviolet (UV) absorption, nuclear magnetic resonance (NMR)), ultrasonic techniques (sound scattering, use of the acoustic velocitimeter, measurement of the ultrasonic vibration potential), density-based techniques (use of a radiation gauge, vibrating densitometers, a method involving continuous weighing, pressure drop measurement) and viscosity-based techniques.

Typically, a double nanoemulsion is considered to have a low encapsulation efficiency if $\varepsilon$ is at or below 0.2 at the time of formation of the double nanoemulsion, for at least 30 min, for at least 1, for at least 90 min, for at least 2 hours, for at least 2.5 hours, for at least 3 hours, for at least 4, hours, for at least 5 hours, for at least 6 hours, for at least 8 hours, for at least 10 hours, for at least 12 hours, for at least 24 hours following formation of the double nanoemulsion when stored at room temperature and pressure.

Typically, a double nanoemulsion is considered to have a medium encapsulation efficiency if $\varepsilon$ is above 0.2 but below 0.3 at the time of formation of the double nanoemulsion, for at least 30 min, for at least 1, for at least 90 min, for at least 2 hours, for at least 2.5 hours, for at least 3 hours, for at least 4, hours, for at least 5 hours, for at least 6 hours, for at least 8 hours, for at least 10 hours, for at least 12 hours, for at least 24 hours following formation of the double nanoemulsion when stored at room temperature and pressure.

Typically, a double nanoemulsion is considered to have a high encapsulation efficiency if ε is above 0.3, such as about 0.4, about 0.5, about 0.6, about 0.7, about 0.8, or about 0.9 at the time of formation of the double nanoemulsion, for at least 30 minutes, for at least 1, for at least 90 min, for at least 2 hours, for at least 2.5 hours, for at least 3 hours, for at least 4, hours, for at least 5 hours, for at least 6 hours, for at least 8 hours, for at least 10 hours, for at least 12 hours, for at least 24 hours following formation of the double nanoemulsion when stored at room temperature and pressure.

In drug delivery applications, a high level of encapsulation is achieved when the drug is encapsulated in the nanodroplets in the nanoemulsion at about 30% by weight (wt. %) or greater, greater than 40% by weight, greater than 50% by weight, greater than 60% by weight, greater than 70% by weight, greater than 80% by weight, or greater than 90% by weight, compared to the drug in the starting solution.

E. Nanoemulsions as a Template for Nanoparticles

The nanoemulsions can serve as a template for forming nanoparticles. As described in the examples, the $O_1/W/O_2$ double nanoemulsions remained kinetically stable for many hours, facilitating their use as colloidal templates for multiphase nanoparticles. This was demonstrated through cross-linking and subsequent purification of oil-laden, water-swollen nanoparticles (also referred to as nanogels) with relatively high encapsulation efficiency with sizes ranging from 200-300 nm and relatively narrow size distribution (PDI of between 0.05 and 0.4) and encapsulation polydispersity. The encapsulation polydispersity was typically between 10-20% as a relative fraction of the average encapsulated amount.

The methods described herein are versatile, and can be used to form different types of nanoparticle compositions, e.g. having different oil and/or polymer hydrogel chemistry, hydrogel crosslink density and/or encapsulated oil droplet size and/or concentration.

Crosslink density refers to the average mass of polymer between crosslinks. Crosslink density can be represented by the symbol Mc. One way to determine the crosslink density of samples of the resulting nanoparticles includes the use methods such as dynamic light scattering or electron microscopy to measure the size of the particles in various solvents, or in the dry state. The swelling ratio of the samples can be calculated and used to determine the crosslinking density, such as described in Malo de Molina et al., Macromolecules, 48(15):5402-5411 (2015).

II. Nanoparticles

Typically, the nanoparticles have more than one phase, i.e. are multiphase nanoparticles. The nanoparticles typically include an oil phase in a form of a plurality of nanodroplets suspended in a continuous matrix.

The nanoparticles form following polymerization of a polymerizable monomer or macromer in the aqueous phase of the nanoemulsion. Typically, the nanoparticles have a diameter greater than 150 nm and less than 1000 nm, optionally the diameters may be between 200 and 800 nm, between 200 and 600 nm, between 200 and 400 nm, or between 200 and 300 nm. The nanoparticles are substantially homogenous in size.

Optionally, the nanoparticles are biocompatible nanoparticles.

A. Oil Phase

The oil phase may be any of the oil compounds listed for the first oil phase above.

B. Continuous Matrix

The nanoparticles include a continuous matrix in a form of a liquid, gel, or a solid at room temperature and pressure.

The composition of the continuous matrix is as described above for the aqueous phase of the double nanoemulsions. The continuous matrix may include polymers, surfactants, and cargo.

1. Liquid, Gel, or Solid

The polymerization of the polymerizable monomer or macromer of the aqueous phase forms a matrix. The matrix may be in a form of a viscous liquid, gel, or a solid. Generally, the matrix is in the form of a viscous liquid or a gel when the nanoparticles are suspended within the outer oil phase, or are stored in a storage medium. The nanoparticles containing a plurality of oil nanodroplets suspended within the continuous matrix may be referred to as nanoparticles or nanogels.

In some embodiments, the polymerization of the polymerizable monomer or macromer of the aqueous phase forms a solid continuous matrix. The continuous matrix can be in a solid state when the polymerizable monomer or macromer is substantially polymerized. Substantially polymerized indicates at least 90% by weight or by mole of the polymerizable monomer or macromer is converted into a polymer, or higher molecular weight polymer (in the case of a polymerizable macromer). The degree of polymerization of the polymerizable monomer or macromer can be measured with methods known in the art. For example, when the liquid monomer has cross-linked into a solid, NMR may be used to detect the free acrylate groups. When PEGDA is used as the polymerizable macromer, 1H-NMR may be used to check how many of the acrylate groups on PEGDA responsible for cross-linking remain after polymerization. This can be compared to the amount of the acrylate groups that remain in a macroscopic gel when it becomes a solid.

The continuous matrix may be dehydrated, forming nanoparticles containing oil nanodroplets and the polymeric continuous matrix only. In other aspects, the continuous matrix may include various degrees of hydration with an aqueous solution, such as a storage medium. The nanoparticles may be suspended within the outer oil phase, may be stored in a storage medium, or may be stored dried, such as in a presence of a desiccant or under dehumidified conditions.

2. Polymer

The nanoparticles may include a polymer. The polymer may be one or more polymers. The polymer may be formed from polymerization of the polymerizable monomer or macromer, may be added to the double nanoemulsion during production process, or both.

The polymer may be any suitable polymer material including, but not limited to, non-bioerodable/non-biodegradable and bioerodable/biodegradable polymers. Such polymers are known. Suitable polymers include, but are not limited to polyamides, polycarbonates, polyalkylenes, polyalkylene glycols, polyalkylene oxides, polyalkylene terepthalates, poly(vinyl alcohols), polyvinyl ethers, polyvinyl esters, polyvinyl halides, polyvinylpyrrolidone, polyglycolides, polysiloxanes, polyurethanes and copolymers thereof, celluloses such as alkyl cellulose, hydroxyalkyl celluloses, cellulose ethers, cellulose esters, nitro celluloses, methyl cellulose, ethyl cellulose, hydroxypropyl cellulose, hydroxy-propyl methyl cellulose, hydroxybutyl methyl cellulose, cellulose acetate, cellulose propionate, cellulose acetate butyrate, cellulose acetate phthalate, carboxylethyl cellulose, cellulose triacetate, and cellulose sulphate sodium salt, polymers of acrylic and methacrylic esters, poly (methyl methacrylate), poly(ethyl methacrylate), poly(butyl methacrylate), poly(isobutyl methacrylate), poly(hexyl methacrylate), poly(isodecyl methacrylate), poly (lauryl methacrylate), poly (phenyl methacrylate), poly(methyl acrylate), poly(isopropyl acrylate), poly(isobutyl acrylate), poly(octadecyl acrylate), polyethylene, polypropylene poly(ethylene glycol), poly(ethylene oxide), poly(ethylene terephthalate), poly(vinyl alcohols), poly(vinyl acetate), poly vinyl chloride polystyrene and polyvinylpryrrolidone.

Examples of suitable biodegradable polymers include synthetic polymers such as polymers of lactic acid and glycolic acid, polyanhydrides, poly(ortho)esters, polyurethanes, poly(butic acid), poly(valeric acid), poly(caprolactone), poly(hydroxybutyrate), poly(lactide-co-glycolide) and poly(lactide-co-caprolactone), and natural polymers such as alginate and other polysaccharides including dextran and cellulose, collagen, chemical derivatives thereof (substitutions, additions of chemical groups, for example, alkyl, alkylene, hydroxylations, oxidations, and other modifications routinely made by those skilled in the art), albumin and other hydrophilic proteins, zein and other prolamines and hydrophobic proteins, copolymers and mixtures thereof. In general, these materials degrade either by enzymatic hydrolysis or exposure to water, by surface or bulk erosion. The continuous matrix may contain one polymer, or more than one polymer. When more than one polymer is present, the continuous matrix may contain a mixture of blend of the polymers, or a co-polymer containing the polymers. Examples of polymers also include polyesters, polyanhydrides, polystyrenes and blends thereof.

In some embodiments, one or more of the polymers is a bioadhesive polymer. Representative bioadhesive polymers of particular interest include bioerodible hydrogels described by Sawhney, et al., *Macromolecules*, 26:581-87 (1993), polyhyaluronic acids, casein, gelatin, gluten, polyanhydrides, polyacrylic acid, alginate, chitosan, poly(methyl methacrylates), poly(ethyl methacrylates), poly(butylmethacrylate), poly(isobutylmethacrylate), poly(hexlmethacrylate), poly(isodecyl methacrylate), poly(lauryl methacrylate), poly(phenyl methacrylate), poly (methyl acrylate), poly(isopropyl acrylate), poly(isobutyl acrylate), poly(octadecyl acrylate), and poly(fumaric-co-sebacic)acid.

In some embodiments, one or more of the polymers is a hydrophilic polymer, such as for example, sodium alginate, carrageenan, xanthan gum, gelatin, curdlan, agar, glucomannan, starch, hyaluronic acid, scleroglucan, schizophyllan, lentinan, pararomine, callose, raminarun, cellulose, methylcellulose, ethylcellulose, nitrocellulose, gum arabic, polyvinyl alcohol, carboxyvinyl polymer, carboxymethylcellulose, hydroxyethylcellulose, polyethylene glycol, tragacanth gum, garactan, guar gum, carob gum, karaya gum, pectin, guince seed, argecolloids, glycyrrhizinic acid, dextran, puluran, collagen, casein, albumen, carboxymethyl starch, methylhydroxypropyl starch, methylhydroxypropylcellulose, sodium cellulose sulfate, hydroxypropyl-cellulose, propylene glycol alginate, polyvinylmethyl ether, polyvinyl pyrrolidone, polyoxyethylene, polyoxypropylene copolymer, sodium polyacrylate, polyethylacrylate, polyacryl amide, or polyethylene imine.

The amount of the polymer present in the nanoparticles may be between 0.001% by weight and 60% by weight, between 0.01% by weight and 60% by weight, between 0.1% by weight and 60% by weight, or between 1% by weight and 60% by weight, such as between 10% by weight and 40% by weight, or between 10% by weight and 33% by weight, or about 33% by weight.

3. Surfactant

The nanoparticle may include a surfactant. Any one of the surfactants listed as a First Surfactant may be present in the nanoparticles. Any combination of the surfactants listed as a First Surfactant may be present in the nanoparticles.

The amount of surfactant present in the nanoparticles may be between 0.00001% by weight and 0.5% by weight, between 0.0001% by weight and 0.5% by weight, between 0.001% by weight and 0.5% by weight, or between 0.01% by weight and 0.5% by weight.

4. Cargo

One or more cargo materials (also referred to herein as cargo) may be included in the oil phase, in the continuous matrix, or both the oil phase and the continuous matrix of the nanoparticles. If multiple cargo materials are included, optionally one type of cargo is included in the oil phase and a different type is included in the water phase.

The cargo may include fertilizer and other agricultural agents, industrial agents, food agents, cosmetic agents, pharmaceutical agents, or any combination thereof. One of skill in the art would appreciate that the cargo listed herein is only an example, and other materials may be incorporated into compositions, as needed for a particular application.

The amount of cargo present in the nanoparticles may be between 0.00001% by weight and 50% by weight, between 0.0001% by weight and 50% by weight, between 0.001% by weight and 50% by weight, or between 0.01% by weight and 50% by weight The concentration of cargo in the nanoemulsion may be between 0.1 percent by volume (vol. %) and 50 vol. %, between 1 vol. % and 50 vol. %, between 10 vol. % and 50 vol. %, between 10 vol. % and 30 vol. %.

5. Nanoparticles with Surface Functionalization

The nanoparticles may be functionalized using any suitable chemical modifications of the additives in the continuous matrix. An example is a copper-free click chemistry that can be used to functionalize the surface of the particles to bind any ligand or moiety of interest, including linkers, peptides, antibodies, and fluorescent or radiolabeled reporter molecules.

a. Surface Ligand or Moiety

The nanoparticles can be targeted to a specific tissue or organ in vivo with a surface ligand or moiety. The targeting moiety can be covalently or non-covalently associated with the nanoparticle. The targeting moiety may be an antibody or antigen-binding fragment thereof. The targeting moiety can be an RNA or protein shaped to specifically interact with the target (e.g., an RNA- or peptide-aptamer). The targeting moiety can be a small molecule or element with specific binding affinity (e.g., biotin which binds streptavidin, or iron which is bound by the transferrin receptor). The targeting moieties should have an affinity for a cell-surface receptor, cell-surface antigen, or other ligand that is specific to the target tissue.

The targeting moiety can specifically recognize and bind to a target molecule specific for a cell type, a tissue type, or an organ. The target molecule can be a cell surface polypeptide, lipid, or glycolipid. The target molecule can be a receptor that is selectively expressed on a specific cell surface, a tissue or an organ. Cell specific markers can be for specific types of cells including, but not limited to stem cells, skin cells, blood cells, immune cells, muscle cells, nerve cells, cancer cells, virally infected cells, and organ specific cells. The cell markers can be specific for endothelial, ectodermal, or mesenchymal cells. Representative cell specific markers include, but are not limited to cancer specific markers, immune-cell specific markers, and skin-cell specific markers. The nanoparticles with the targeting moieties may be delivered to specific tissues, such as liver tissue, pancreatic tissue, heart tissue, lung tissue, intestinal tissue, spleen tissue, kidney tissue, bladder tissue, muscle tissue, bone tissue, cartilage, neural tissue, the blood, lymphatic tissues, or sensory tissues, such as skin, eye, ear and nasal passages.

The targeting moiety can be covalently associated with the nanoparticle, and the covalent association can be mediated by a linker.

i. Peptide Targeting Moieties

In some aspects, the targeting moiety is a peptide. Specifically, the peptide can be, but is not limited to, one or more of the following: Epidermal growth factor (EGF), hepatocyte growth factor, and α4 integrin (which is bound by vascular cell adhesion molecule-1), or the targets of various integrins (e.g. integrin ligands, matrikines and matricryptins).

ii. Antibody Targeting Moieties

The targeting moiety can be an antibody or an antigen-binding fragment thereof. The antibody can be any type of immunoglobulin that is known in the art. For instance, the antibody can be of any isotype, e.g., IgA, IgD, IgE, IgG, IgM, etc. The antibody can be monoclonal or polyclonal. The antibody can be a naturally-occurring antibody, e.g., an antibody isolated and/or purified from a mammal, e.g., mouse, rabbit, goat, horse, chicken, hamster, human, etc. Alternatively, the antibody can be a genetically-engineered antibody, e.g., a humanized antibody or a chimeric antibody. The antibody can be in monomeric or polymeric form. The antigen binding portion of the antibody can be any portion that has at least one antigen binding site, such as Fab, F(ab')2, dsFv, sFv, diabodies, and triabodies. In certain embodiments, the antibody is a single chain antibody.

iii. Aptamer Targeting Moieties

Aptamers are oligonucleotide or peptide sequences with the capacity to recognize virtually any class of target molecules with high affinity and specificity. Aptamers bind to targets such as small organics, peptides, proteins, cells, and tissues. Unlike antibodies, some aptamers exhibit stereoselectivity. The aptamers can be designed to bind to specific targets expressed on cells, tissues or organs.

iv. Additional Moieties

The nanoparticles can contain one or more polymer conjugates containing end-to-end linkages between the polymer and a moiety. The moiety can be a targeting moiety, a detectable label, or a therapeutic, prophylactic, or diagnostic agent. For example, a polymer conjugate can be a polymer, such as PEGDA, linked to the moiety by such chemistries as free radical reaction of an acrylic end group, click chemistry, condensation of a carboxylic acid, etc. to reduce the need for subsequent functionalization and purification steps.

The additional targeting elements may refer to elements that bind or otherwise localize the nanoparticles to a specific locale. The locale may be a tissue, a particular cell type, or a subcellular compartment. The targeting element of the nanoparticles can be an antibody or antigen binding fragment thereof, an aptamer, or a small molecule (less than 500 Daltons).

The nanoparticles can also contain a detectable label, such as, a radioisotope, a fluorophore (e.g., fluorescein isothiocyanate (FITC), phycoerythrin (PE)), an enzyme (e.g., alkaline phosphatase, horseradish peroxidase), or a contrast agent. These may be encapsulated within, dispersed within, or conjugated to the polymer of the nanoparticle.

For example, a fluorescent label can be chemically conjugated to the polymer to yield a fluorescently labeled polymer. In other embodiments the label is a contrast agent. A contrast agent refers to a substance used to enhance the contrast of structures or fluids within the body in medical imaging. Contrast agents are known in the art and include, but are not limited to agents that work based on X-ray attenuation, magnetic resonance signal enhancement, ultrasonic wave attenuation, and ultraviolet, visible, and infrared (IR) light absorbers and reflectors. Suitable contrast agents include iodine, barium, superparamagnetic iron, gadolinium, and other materials.

v. Radioisotopes

Exemplary radioisotopes include, but are not limited to Molybdenum-99, Technetium-99m, Chromium-51, Cobalt-60, Copper-64, Ytterbium-169, Iodine-131, Iridium-192, Iron-59, Xenon-133, Xenon-127, Phosphorus-32, Potassium-42, Samarium-153 (and Strontium-89, Selenium-75, Sodium-24, Yttrium-90, Gallium-67, Fluorodeoxyglucose-18, and combinations thereof.

C. Encapsulation Efficiency

The nanoparticles have an encapsulation efficiency that may be calculated based on the original volume of oil used to form the nanoemulsions, as described above for the encapsulation efficiency of nanoemulsions. The encapsulation efficiency of the nanoparticles is generally between 0.2 and 1, preferably between 0.4 and 1.

D. Stability

The stability of the nanoparticles is reflected in the length of time during which the nanoparticles are stored at room temperature and pressure without a substantial change in composition and/or structure. For example, the nanoparticles may remain stable for a period of time of at least 30 days, at least two months, optionally from 30 days to six months, or one year at room temperature and pressure without substantial change in nanoparticle structure, composition, or the combination thereof.

Nanoparticle structure may be reflected by the dispersity of the nanodroplets of the oil phase within the continuous matrix, which is in the form of a liquid, a gel or a solid.

Substantial change in structure and/or composition can be determined by measuring one or more parameters, such as nanodroplet or nanoparticle size, nanodroplet or nanoparticle size polydispersity, or oil content, and comparing the measured parameters to those for freshly prepared nanoparticles. If the difference for the one or more measured parameters between the test particles and the freshly prepared particles is about 10% or less, then there is no substantial change in nanoparticle structure and/or composition, and the nanoparticles are considered to be stable over the tested time period.

Freshly prepared nanoparticles refer to nanoparticles on the day of preparation.

1. Size Homogeneity

The oil nanodroplets within the nanoparticles typically have a diameter between 1 nm and 100 nm.

The nanodroplets dispersed within the continuous matrix are substantially homogeneous in size. For example, the polydispersity index for the nanodroplet size in the nanoparticles may be between about 0.05 and 0.4, for example between 0.1 and 0.3, between 0.15 and 0.25, or about 0.2.

Similarly, the nanoparticles are substantially homogeneous in size, so that the polydispersity index for the nanoparticle size prior to or after polymerization of the polymerizable monomer or macromer is between about 0.05 and 0.4, for example between 0.1 and 0.3, between 0.15 and 0.25, or about 0.2.

Generally, the polydispersity is measured according to the equation 3 below:

$$PDI = (\sigma/D)^2 \quad \text{(Equation 3)}$$

where $\sigma$ is the standard deviation for the nanodroplet or nanoparticle size distribution, and D is the average diameter of the nanodroplets or nanoparticles.

Figure 3A:
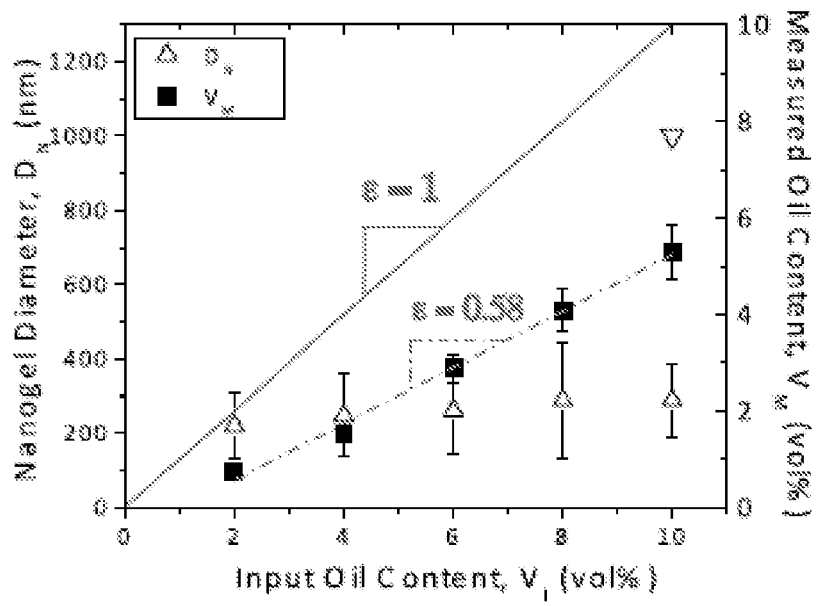
FIGS. 3A, 3B, 3C, and 3D are graphs showing the effect of composition and operating parameters on oil encapsulation efficiency.
Figure 3B:
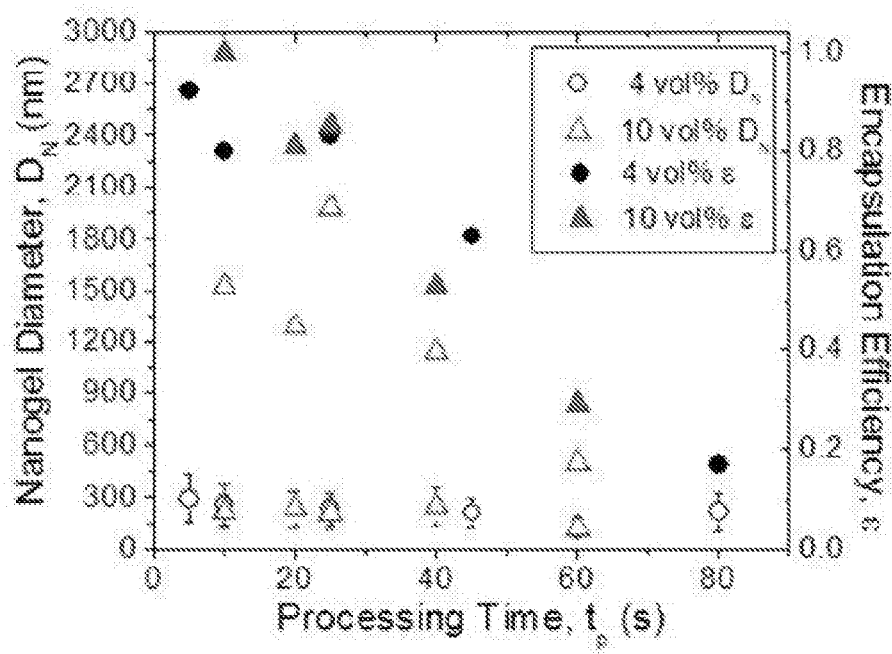
Figure 3C:
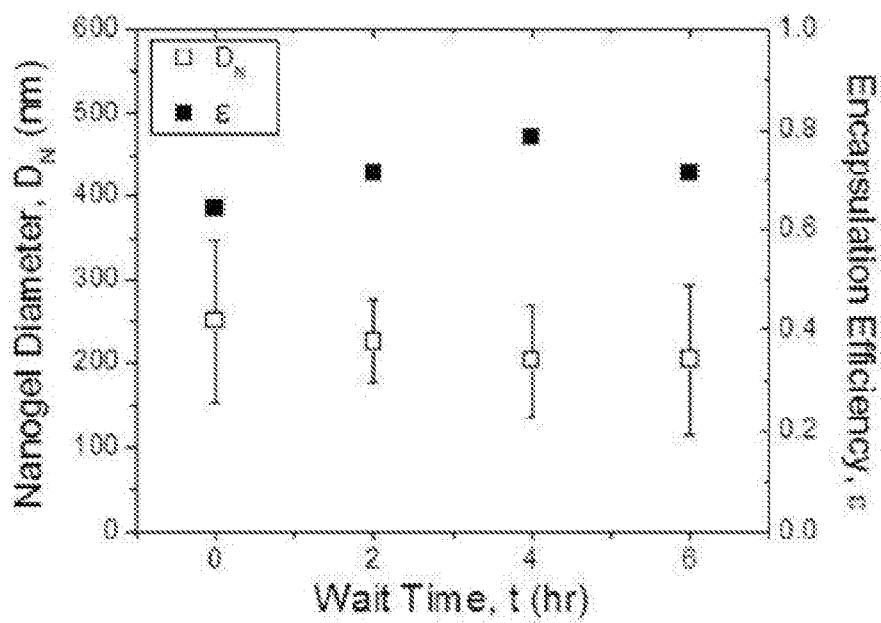

Generally, the nanoemulsions remain stable for at least about an hour, at least two hours, at least six hours, at least eight hours, at least 10 hours, at least one day, and up to six months at room temperature and pressure without substantial change in nanoparticle size and polydispersity (see FIG. 3C).

Generally, when stored at about room temperature and pressure, the nanoparticles remain stable over a period of time of at least 30 days, at least two months, optionally from 30 days to six months, or one year, i.e. without substantial change in nanoparticle their size and polydispersity over the period of time.

III. Compositions

The double nanoemulsions or nanoparticles may be used on their own, or may be combined with excipients or carriers, to form compositions.

The double nanoemulsions or nanoparticles may be used for forming agricultural, industrial, food, cosmetic, and pharmaceutical compositions. In these embodiments, the double nanoemulsions or nanoparticles include cargoes suitable for the particular composition.

A. Agricultural Compositions

In some embodiments, the cargo is one or more agrochemicals, such as fertilizers, insecticides, and/or herbicides.

Fertilizers may include single nutrient fertilizers, such as ammonia, urea, superphosphates, double superphosphate, triple superphosphate, gypsum, phosphate, binary fertilizers such as monoammonium phosphate and diammonium phosphate, multinutrient fertilizers such as NPK, and micronutrients, such as molybdenum, zinc, iron and copper, and any combination thereof.

Insecticides include natural and synthetic insecticides. Examples of natural and synthetic insecticides include organochlorides such as Aldrin, Chlordane, Chlordecone, Dichlorodiphenyltrichloroethane (DDT), Dieldrin, Endosulfan, Endrin, Heptachlor, Hexachlorobenzene, Lindane (gamma-hexachlorocyclohexane), Methoxychlor, Mirex, Pentachlorophenol, and 1,1-Dichloro-2,2-bis(4-chlorophenyl)ethane (TDE); organophosphates and carbamates such as Acephate, Azinphos-methyl, Bensulide, Chlorethoxyfos, Chlorpyrifos, Chlorpyriphos-methyl, Diazinon, Dichlorvos (DDVP), Dicrotophos, Dimethoate, Disulfoton, Ethoprop, Fenamiphos, Fenitrothion, Fenthion, Fosthiazate, Malathion, Methamidophos, Methidathion, Mevinphos, Monocrotophos, Naled, Omethoate, Oxydemeton-methyl, Parathion, Parathion-methyl, Phorate, Phosalone, Phosmet, Phostebupirim, Phoxim, Pirimiphos-methyl, Profenofos, Terbufos, Tetrachlorvinphos, Tribufos, and Trichlorfon, and carbamates Aldicarb, Bendiocarb, Carbofuran, Carbaryl, Dioxacarb, Fenobucarb, Fenoxycarb, Isoprocarb, Methomyl, and 2-(1-Methylpropyl)phenyl methylcarbamate; pyrethroids, such as Allethrin, Bifenthrin, Cyhalothrin, Lambda-cyhalothrinm, Cypermethrin, Cyfluthrin, Deltamethrin, Etofenprox, Fenvalerate, Permethrin, Phenothrin, Prallethrin, Resmethrin, Tetramethrin, Tralomethrin, and Transfluthrin, neonicotinoids such as Acetamiprid, Clothianidin, Imidacloprid, Nithiazine, Thiacloprid, and Thiamethoxam; and ryanoids, such as Chlorantraniliprole, Cyantraniliprole, Flubendiamide, Benzoylureas Diflubenzuron, Flufenoxuron, Cyromazine, Methoprene, Hydroprene, Tebufenozide, Anabasine, Anethole, Annonin, Asimina, Azadirachtin, Caffeine, Carapa, Cinnamaldehyde, Cinnamon leaf oil, Cinnamyl acetate, Citral, Deguelin, Derris, Derris (rotenone), *Desmodium caudatum*, Eugenol (mosquito larvae), Linalool, Myristicin, Neem (Azadirachtin), Nicotine, *Peganum harmala*, Oregano oil, Polyketide, Pyrethrum, Quassia, Ryanodine, Spinosad, Spinosyn D, Tetranortriterpenoid, and Thymol, Diatomaceous earth, Borate, Borax, Boric Acid, include arsenates, copper and fluorine, pyrethrum, rotenone, neem oil, and various essential oils, enzymes, and any combination thereof.

Examples of herbicides include Glyphosate, 2,4-D, Aminopyralid, Atrazine, Clopyralid, Dicamba, Glufosinate ammonium, Fluazifop, Fluroxypyr, Imazapyr, Imazapic, Imazamox, Linuron, 2-methyl-4-chlorophenoxyacetic acid (MCPA), Metolachlor, Paraquat, Pendimethalin, Picloram, sodium chloride, Triclopyr, and sulfonylureas, including Flazasulfuron and Metsulfuron-methyl, and any combination thereof.

B. Industrial Compositions

In some embodiments, the cargo is one or more industrial agents. Industrial agents may be hydrophilic or hydrophobic chemical compounds. The chemical compounds suitable for inclusion in the nanoparticles and nanoemulsions can be those that are toxic when handled directly, volatile at room temperature and pressure, light-sensitive, highly viscous compounds, thermoconductive compounds, or electrical conductor agents, catalysts, dyes, and the like.

Industrial agents include any inorganic industrial agent and organic industrial agents purified from natural sources or synthesized chemically. Natural sources include bacterial, fungal, plant, and animal sources.

Examples of inorganic industrial agents include chloralkali, ammonia, chlorine, sodium hydroxide, sulfuric acid, nitric acid, sodium chloride, Phosphoric acid, ammonium sulfate, titanium dioxide, aluminum sulfate, and others.

Examples of organic industrial agents include acrylonitrile, phenol, ethylene oxide, and urea, ceramic agents such as clay, silica, and glass, petrochemicals such as ethylene, propylene, benzene, and styrene, polymers such as polyethylene, polyoxybenzylmethylenglycolanhydride, and polyester, elastomers such as polyisoprene, neoprene, and polyurethane, oleochemicals such as lard, soybean oil, and stearic acid, dyes and pigments such as acidic dyes (salts of a sulfuric, carboxylic or phenolic organic acid (e.g., sodium or ammonium salts), basic dyes, mordants for dyes, vat dyes, reactive dyes, disperse dyes (e.g., azobenzene and its derivatives, or anthraquinone and its derivatives), azo dyes, sulfur dyes, leather dyes, fluorescent dyes, solvent dyes (e.g., dyes soluble in organic solvents), and contrast dyes.

The dyes may include acridine dyes (derivatives of acridine), anthraquinone dyes (derivatives of anthraquinone); arylmethane dyes, such as diarylmethane dyes (based on diphenyl methane) and triarylmethane dyes; (derivates of triphenylmethane); azo dyes (based on —N═N— azo structure); diazonium dyes (based on diazonium salts); nitro dyes (based on a —$NO_2$ nitro functional group); nitroso dyes (based on a —N═O nitroso functional group); phthalocyanine dyes (derivatives of phthalocyanine); quinone-imine dyes (derivatives of quinone), such as asin dyes, euthodin dyes, safranin dyes (derivatives of safranin); indamins, indophenol dyes (derivatives of indophenol), oxazone dyes (derivatives of oxazone), and thiazine dyes (derivatives of thiazine); thiazole dyes (derivatives of thiazole), safranin dyes (derivatives of safranin); xanthene dyes (derivatives of xanthene) such as fluorine dyes, pyronin dyes, fluorine dyes (based on fluorine), and rhodamine dyes (derivatives of rhodamine).

C. Food Compositions

In some embodiments, the cargo is one or more food or nutritional agents. Food compositions are edible and can be safely consumed by humans or mammals. Examples of food or nutritional agents include vitamins, carbohydrates, proteins, fats, preservatives, sweeteners, color additives, flavors and spices, flavor enhancers, fat replacers (and components of formulations used to replace fats), nutrients, emulsifiers, stabilizers and thickeners, binders, texturizers, pH control agents and acidulants, leavening agents, anti-caking agents, humectants, yeast nutrients, dough strengtheners and conditioners, firming agents, enzymes and minerals.

Food compositions may include cargo that is a generally recognized as safe (GRAS) compound. Examples of food compositions include nanoparticles and/or nanoemulsions with food supplements as the cargo. Food supplements include vitamins, oils, lipids, animal-derived or plant-derived compounds, synthetic compounds, and minerals. Examples of food supplements include lipids, polyunsaturated fatty acids (such as algal-derived omega-3 fatty acids), alpha-lipoic acid, cannabinoids (such as cannabidiol), polyphenols (such as curcumin), and vitamins.

Curcumin (diferuloylmethane) and certain of its analogs, together termed curcuminoids, are well known natural products, recognized as safe for ingestion by and administration to mammals including humans. Curcumin is a yellow pigment found in the rhizome of *Curcuma longa*, the source of the spice turmeric. Turmeric has been a major component of the diet of the Indian subcontinent for several hundred years, and the average daily consumption of curcumin has been found to range up to 0.6 grams for some individuals, without reported adverse effects. Food-grade curcumin may consists of the three curcuminoids in the relative amounts: 77% curcumin, 17% demethoxycurcumin, and 3% bisdemethoxycurcumin. The fully saturated derivative tetrahydrocurcumin is also included in the term curcuminoid. The curcumin analogs include demethoxycurcumin, bisdemethoxycurcumin, and tetrahydrocurcumin.

Examples of the oil-soluble vitamins include, as vitamin A group, retinol, 3-dehydroretinol, retinal, 3-dehydroretinal, retinoic acid, 3-dehydroretinoic acid, and esters such as vitamin A acetate and vitamin A palmitate and, as provitamin A, carotenoids and xanthophylls such as α-, β-, and γ-carotenes, β-cryptoxanthin, and echinenone. Examples of vitamin D include vitamin D2 to D7. Examples of vitamins E include α-, β-, γ-, and δ-tocopherols, and α-, β-, γ-, and δ-tocotrienols and esters such as vitamin E acetate and vitamin E nicotinate. Examples of vitamin K include vitamin K1 to K3.

Examples of preservatives include Ascorbic acid, citric acid, sodium benzoate, calcium propionate, sodium erythorbate, sodium nitrite, calcium sorbate, potassium sorbate, butylated hydroxyanisole (BHA), butylated hydroxytoluene (BHT), EDTA, and tocopherols (Vitamin E), and vitamin B12.

Examples of sweeteners include Sucrose (sugar), glucose, fructose, sorbitol, mannitol, corn syrup, high fructose corn syrup, saccharin, aspartame, sucralose, acesulfame potassium (acesulfame-K), and neotame.

Examples of food colors include Annatto extract, Dehydrated beets (beet powder), Canthaxanthin, Caramel, β-Apo-8'-carotenal, β-Carotene, Cochineal extract, Carmine, Sodium copper chlorophyllin, Toasted partially defatted cooked cottonseed flour, Ferrous gluconate, Ferrous lactate, Grape color extract, Grape skin extract, (enocianina), Synthetic iron oxide, Fruit juice, Vegetable juice, Carrot oil, Paprika, Paprika oleoresin, Mica-based pearlescent pigments, Riboflavin, Saffron, Spirulina extract, Titanium dioxide, Tomato lycopene extract; tomato lycopene concentrate, Turmeric, and Turmeric oleoresin.

Examples of flavors and spices and flavor enhancers include Natural flavoring, artificial flavor, and spices, Monosodium glutamate (MSG), hydrolyzed soy protein, autolyzed yeast extract, and disodium guanylate or inosinate.

Examples of fat replacers (and components of formulations used to replace fats) include Olestra, cellulose gel, carrageenan, polydextrose, modified food starch, microparticulated egg white protein, guar gum, xanthan gum, and whey protein concentrate.

Examples of nutrients include thiamine hydrochloride, riboflavin (Vitamin B2), niacin, niacinamide, folate or folic acid, beta carotene, potassium iodide, iron or ferrous sulfate, alpha tocopherols, ascorbic acid, Vitamin D, and amino acids (L-tryptophan, L-lysine, L-leucine, L-methionine).

Examples of emulsifiers include soy lecithin, mono- and diglycerides, egg yolks, polysorbates, sorbitan monostearate.

Examples of stabilizers and thickeners, binders, and texturizers include gelatin, pectin, guar gum, carrageenan, xanthan gum, and whey.

Examples of pH control agents and acidulants include lactic acid, citric acid, ammonium hydroxide, and sodium carbonate.

Examples of leavening agents include baking soda, monocalcium phosphate, and calcium carbonate.

Examples of anti-caking agents include calcium silicate, iron ammonium citrate, and silicon dioxide.

Examples of humectants include glycerin and sorbitol.

Examples of yeast nutrients include calcium sulfate and ammonium phosphate.

Examples of dough strengtheners and conditioners include ammonium sulfate, azodicarbonamide, and L-cysteine.

Examples of firming agents include calcium chloride and calcium lactate.

Examples of enzyme preparations include enzymes, lactase, papain, rennet, and chymosin.

The nanoparticles and nanoemulsions may include one or more food agents, such as those listed above, alone or in any combination.

D. Cosmetic Compositions

In some embodiments, the cargo is one or more cosmetic agents. Examples of suitable cosmetic agents that can be used as cargo include binding agents such as gums, fats, or waxes, foaming agents, chelating agents, texturizers, thickeners, plasticizers, film formers, colors, opacifiers, fragrance, antioxidants, and preservatives.

Examples of binding agents include acacia powder, agar, alginic acid, amylopectin, behenyl alcohol, benzoin gum, calcium caseinate, carboxymethylcellulose sodium, ceresin wax, collodion, corn starch, croscarmellose sodium, damar gum, dextran, dextrin, ethylcellulose, gelatin, gluten, glycerin, guar gum, hydroxyethyl cellulose, hydroxypropyl cellulose, hypromellose, isopropyl myristate, karaya gum, locust bean gum, maltodextrin, mannitol, mastic gum, methylcellulose, multiwax, n-octyltriethyoxysilane, pectin, polyacrylamide, poly(styrene-co-maleic anhydride), polyvinyl acetate, polyvinyl alcohol, polyvinyl butiral, povidone K-30, povidone K-90, polyvinylpirrolidone K-15, pullulan, rosin gum, shellac gum, sodium alginate, sodium starch glycolate, sorbitol, starch (potato or wheat starch), stearyl palmitate, beeswax substitute, tragacanth, Tridecafluoro-1,1,2,2-tetrahydrooctyl-1-triethoxysilane, 3-(Trimethoxysilyl)propyl Methacrylate, white wax, bees wax, xantham gum, and Poly(vinyl Methyl Ether).

Examples of chelating agents include ethylenediaminetetraacetic acid (EDTA), sodium phytate, phytic acid, citric acid, sodium citrate, sodium gluconate, nitrilotriacetic acid (NTA), ethylenediamine-N,N'-disuccinic acid (EDDS), cyclodextrin and activated carbon.

Examples of texturizers include natural minerals and crystals (e.g. silicates, bismuth, magnesium and others).

Examples of cosmetic thickeners include liquid thickeners (maltodextrin VP copolymer, methyl glucose caprate/caprylate/oleate, propanediol, isododecane, disteardimonium hectorite, propylene carbonate, *Ricinus Communis* (castor) seed oil, hydrogenated castor oil, beeswax, copernicia cerifera (carnauba) wax, and PEG-120 methyl glucose dioleate, methyl gluceth-10), solid thickeners (stearyl palmitate, gum Arabic, tapioca starch, acrylate copolymer, carbomer 940, starch, cetyl alcohol, xanthan gum, guar gum, cellulose, polyamide 3, polyvinylpyrrolidone (PVP), sorbitol, synthetic wax, castor wax, hydroxypropyl guar, and trihydroxystearin), emulsifying thickeners (stearic acid, PEG-8 beeswax, glyceryl oleate, myristic acid, cetearyl alcohol, PEG-150 distearate, and glyceryl stearate), natural waxes, and polymers (acrylate copolymer, carbomer 940, GELMAKER®, hydroxypropyl guar, hydroxypropyl methylcellulose, Iso-Dimethicone Copolymer, PVP, silicone gel, and silicone resin).

Examples of color agents include Annatto, Caramel, Carmine, 13-Carotene, Bismuth citrate, Disodium EDTA-copper, Potassium sodium copper chlorophyllin (chlorophyllin copper-complex), Dihydroxyacetone, Bismuth oxychloride, Guaiazulene, Henna, Iron oxides, Ferric ammonium ferrocyanide, Ferric ferrocyanide, Chromium hydroxide green, Chromium oxide greens, Guanine, Lead acetate, Pyrophyllite, Mica, Silver, Titanium dioxide, Aluminum powder, Bronze powder, Copper powder, Ultramarines, Manganese violet, Zinc oxide, and Luminescent zinc sulfide.

Examples of fragrances and flavors, include benzyl benzoate, coumarin, and vanillin.

Examples of fragrances and flavors include essential oils of naturally occurring plants, as well as their synthetic counterparts and derivatives. The essential oils are typically concentrated hydrophobic liquids containing volatile aroma compounds from plants. Essential oils are also known as volatile oils, ethereal oils, aetherolea, or simply as the oil of the plant from which they were extracted. The essential oils may be synthetic or derived from plant sources including from bark for Cassia, Cinnamon, and Sassafras oils, from berries for Allspice and Juniper oils, from flowers for Cannabis, chamomile, Clary sage, Clove, Scented geranium, Hops, Hyssop, Jasmine, Lavender, Manuka, Marjoram, Orange, Rose, and Ylang-ylang oils, from leaves for Basil, Bay leaf, Buchu, Cinnamon, Common sage, Eucalyptus, Guava, Lemon grass, Melaleuca, Oregano, Patchouli, Peppermint, Pine, Rosemary, Spearmint, Tea tree, Thyme, Tsuga, and Wintergreen oils, from peel for Bergamot, Grapefruit, Lemon, Lime, Orange, and Tangerine oils, from resin for Benzoin, Copaiba, Frankincense, and Myrrh oils, from rhizome for Galangal and Ginger oils, from root for Valerian oils, from seeds for Anise, Buchu, Celery, Cumin, Flax, and Nutmeg oil, and from wood for Camphor, Cedar, Rosewood, Sandalwood, and Agarwood oils.

The nanoparticles and nanoemulsions may include one or more cosmetic agents, such as those listed above, alone or in any combination.

E. Pharmaceutical Compositions

In some embodiments, the cargo is one or more food or pharmaceutical agents. The double nanoemulsions and nanoparticles may be particularly suitable for encapsulating poorly water soluble pharmaceutical compositions. For example, under the Biopharmaceutical Classification System (BCS), drugs can belong to four classes: class I (high permeability, high solubility), class II (high permeability, low solubility), class III (low permeability, high solubility) or class IV (low permeability, low solubility). Suitable active agents also include poorly soluble compounds; such as drugs that are classified as class II or class IV compounds using the BCS. Examples of class II compounds include: acyclovir, nifedipine, danazol, ketoconazole, mefenamic acid, nisoldipine, nicardipine, felodipine, atovaquone, griseofulvin, troglitazone glibenclamide and carbamazepine. Examples of class IV compounds include: chlorothiazide, furosemide, tobramycin, cefuroxmine, and paclitaxel.

The double nanoemulsions and nanoparticles may be particularly suitable for encapsulating class II and class IV pharmaceuticals.

Examples of suitable pharmaceutical agents include therapeutic, prophylactic, nutraceutical and diagnostic agents. Any suitable pharmaceutical agent may be used. These include organic compounds, inorganic compounds, proteins, polysaccharides, nucleic acids or other materials.

Pharmaceutical agents include synthetic and natural proteins (including enzymes, peptide-hormones, receptors, growth factors, antibodies, signaling molecules), and synthetic and natural nucleic acids (including RNA, DNA, anti-sense RNA, triplex DNA, inhibitory RNA (RNAi), and oligonucleotides), and biologically active portions thereof. Suitable active agents have a size greater than about 1,000 Da for small peptides and polypeptides, more typically at least about 5,000 Da and often 10,000 Da or more for proteins. Nucleic acids are more typically listed in terms of base pairs or bases (collectively "bp"). Nucleic acids with lengths above about 10 bp are typically used in the present method. More typically, useful lengths of nucleic acids for probing or therapeutic use will be in the range from about 20 bp (probes; inhibitory RNAs, etc.) to tens of thousands of bp for genes and vectors. The active agents may also be hydrophilic molecules, preferably having a low molecular weight.

Examples of useful proteins include hormones such as insulin and growth hormones including somatomedins. Examples of useful drugs include neurotransmitters such as L-DOPA, antihypertensives or saluretics such as Metolazone from Searle Pharmaceuticals, carbonic anhydrase inhibitors such as Acetazolamide from Lederle Pharmaceuticals, insulin like drugs such as glyburide, a blood glucose lowering drug of the sulfonylurea class, synthetic hormones such as Android F from Brown Pharmaceuticals and Testred® (methyltestosterone) from ICN Pharmaceuticals.

Anti-Cancer Agents

Representative anti-cancer agents that can be included as cargo in the nanoparticles or nanoemulsions include, but are not limited to, alkylating agents (such as cisplatin, carboplatin, oxaliplatin, mechlorethamine, cyclophosphamide, chlorambucil, dacarbazine, lomustine, carmustine, procarbazine, chlorambucil and ifosfamide), antimetabolites (such as fluorouracil (5-FU), gemcitabine, methotrexate, cytosine arabinoside, fludarabine, and floxuridine), antimitotics (including taxanes such as paclitaxel and decetaxel, epothilones A-F, and vinca alkaloids such as vincristine, vinblastine, vinorelbine, and vindesine), anthracyclines (including doxorubicin, daunorubicin, valrubicin, idarubicin, and epirubicin, as well as actinomycins such as actinomycin D), cytotoxic antibiotics (including mitomycin, plicamycin, and bleomycin), topoisomerase inhibitors (including camptothecins such as camptothecin, irinotecan, and topotecan as well as derivatives of epipodophyllotoxins such as amsacrine, etoposide, etoposide phosphate, and teniposide), and combinations thereof. Other suitable anti-cancer agents include angiogenesis inhibitors including antibodies to vascular endothelial growth factor (VEGF) such as bevacizumab (AVASTIN®), other anti-VEGF compounds; thalidomide (THALOMID®) and derivatives thereof such as lenalidomide (REVLIMID®); endostatin; angiostatin; receptor tyrosine kinase (RTK) inhibitors such as sunitinib (SUTENT®); tyrosine kinase inhibitors such as sorafenib (NEXAVAR®), erlotinib (TARCEVA®), pazopanib, axitinib, and lapatinib; transforming growth factor-α or transforming growth factor-β inhibitors, and antibodies to the epidermal growth factor receptor such as panitumumab (VECTIBIX®) and cetuximab (ERBITUX®).

Other suitable anti-neoplastic agents include cyclophosphamide, actinomycin, bleomycin, daunorubicin, doxorubicin, epirubicin, mitomycin, methotrexate, fluorouracil, carboplatin, carmustine (BCNU), methyl-CCNU, cisplatin, etoposide, camptothecin and derivatives thereof, phenesterine, paclitaxel and derivatives thereof, docetaxel and derivatives thereof, vinblastine, vincristine, tamoxifen, piposulfan, altretamine, asparaginase, bleomycin, busulfan, carboplatin, carmustine, chlorambucil, cisplatin, cladribine, cyclophosphamide, cytarabine, dacarbazine, diethylstilbestrol, ethinyl estradiol, etoposide, mitomycin, mitotane, mitoxantrone, paclitaxel, pentastatin, pipobroman, plicamycin, prednisone, procarbazine, streptozocin, tamoxifen, teniposide, vinblastine, and vincristine.

Antigens

The nanoparticles and nanoemulsions can include antigenic materials, such as an infectious agent or cellular antigen, to be delivered to antigen presenting cells to induce immunological responses in a patient in need thereof. Exemplary antigens include infectious disease antigens, killed or attenuated infectious agents such antigens from hepatitis, influenza, and polio, and protozoans such as *Plasmodium* (malaria) and *Leishmania*. Other antigens are antigenic proteins or haptens such as carbohydrate or sugar antigens effective as antigens for these infectious agents, as cancer antigens, or as immunostimulants.

Cellular antigens include tumor antigens, abnormal cellular proteins, and mammalian cellular components produced by viral, bacterial, or protozoan infected cells.

Antimicrobial Agents

The nanoparticles and nanoemulsions can include agents against viral, bacterial or fungal infection, such as, neomycin, streptomycin, chloramphenicol, cephalosporin, ampicillin, penicillin, tetracycline, and ciprofloxacin griseofulvin, ketoconazole, itraconizole, amphotericin B, nystatin, and candicidin, antihistamines/antipruritics (e.g., hydroxyzine, diphenhydramine, chlorpheniramine, brompheniramine maleate, cyproheptadine hydrochloride, terfenadine, clemastine fumarate, triprolidine, carbinoxamine, diphenylpyraline, phenindamine, azatadine, tripelennamine, dexchlorpheniramine maleate, and methdilazine); antibacterial agents (e.g., amikacin sulfate, aztreonam, chloramphenicol, chloramphenicol palmitate, ciprofloxacin, clindamycin, clindamycin palmitate, clindamycin phosphate, metronidazole, metronidazole hydrochloride, gentamicin sulfate, lincomycin hydrochloride, tobramycin sulfate, vancomycin hydrochloride, polymyxin B sulfate, colistimethate sodium, and colistin sulfate); antiviral agents (e.g., interferon alpha, beta or gamma, zidovudine, amantadine hydrochloride, ribavirin, and acyclovir); antimicrobials (e.g., cephalosporins such as cefazolin sodium, cephradine, cefaclor, cephapirin sodium, ceftizoxime sodium, cefoperazone sodium, cefotetan disodium, cefuroxime e azotil, cefotaxime sodium, cefadroxil monohydrate, cephalexin, cephalothin sodium, cephalexin hydrochloride monohydrate, cefamandole nafate, cefoxitin sodium, cefonicid sodium, ceforanide, ceftriaxone sodium, ceftazidime, cefadroxil, cephradine, and cefuroxime sodium; penicillins such as ampicillin, amoxicillin, penicillin G benzathine, cyclacillin, ampicillin sodium, penicillin G potassium, penicillin V potassium, piperacillin sodium, oxacillin sodium, bacampicillin hydrochloride, cloxacillin sodium, ticarcillin disodium, azlocillin sodium, carbenicillin indanyl sodium, penicillin G procaine, methicillin sodium, and nafcillin sodium; erythromycins such as erythromycin ethylsuccinate, erythromycin, erythromycin estolate, erythromycin lactobionate, erythromycin stearate, and erythromycin ethylsuccinate; and tetracyclines such as tetracycline hydrochloride, doxycycline hyclate, and minocycline hydrochloride, azithromycin, clarithromycin); anti-infectives (e.g., GM-CSF); steroidal compounds, hormones and hormone analogues (e.g., incretins and incretin mimetics such as GLP-1 and exenatide, androgens such as danazol, testosterone cypionate, fluoxymesterone, ethyltestosterone, testosterone enathate, methyltestosterone, fluoxymesterone, and testosterone cypionate; estrogens such as estradiol, estropipate, and conjugated estrogens; progestins such as methoxyprogesterone acetate, and norethindrone acetate; corticosteroids such as triamcinolone, betamethasone, betamethasone sodium phosphate, dexamethasone, dexamethasone sodium phosphate, dexamethasone acetate, prednisone, methylprednisolone acetate suspension, triamcinolone acetonide, methylprednisolone, prednisolone sodium phosphate, methylprednisolone sodium succinate, hydrocortisone sodium succinate, triamcinolone hexacetonide, hydrocortisone, hydrocortisone cypionate, prednisolone, fludrocortisone acetate, paramethasone acetate, prednisolone tebutate, prednisolone acetate, prednisolone sodium phosphate, and hydrocortisone sodium succinate; or thyroid hormones such as levothyroxine sodium), or a combination of two or more of these agents.

Imaging Agents

The nanoparticles or nanoemulsions can include suitable imaging agents (e.g., tracers). Examples of suitable imaging agents (tracers) include radionuclide-labeled small molecules, such as Technetium99 ($^{99m}$Tc), F-18 fluorodeoxyglucose, fluorinated compounds, such as fluorinated silicon oil, perfluorocarbon, or perfluoropolyether containing $^{19}$F, superparamagnetic iron oxide (SPIO), gadolinium, europium, diethylene triamine pentacetic acid (DTPA), 1,4,7,10-tetraazacyclododecane-1,4,7,10-tetraacetic acid (DOTA) and their derivatives, gas, and fluorescent tracers. Suitable modalities with respective tracers are known in the art (Baum et al., *Theranostics*, 2(5)437-447 (2012)).

The nanoparticles may include one or more pharmaceutical agents listed above in any combination.

F. Excipients and Carriers

The nanoparticles and/or multiple nanoscale emulsions may be used alone as a composition.

Alternatively, the nanoparticles and/or multiple nanoscale emulsions may be a part of a composition. The composition may also include a suitable carrier and/or excipient.

1. Excipients

Excipients may be chosen based on the application of the composition, as would be understood by those of skill in the art. Suitable excipients include surfactants, emulsifiers, emulsion stabilizers, anti-oxidants, emollients, humectants, chelating agents, suspending agents, thickening agents, occlusive agents, preservatives, stabilizing agents, pH modifying agents, solubilizing agents, solvents, flavoring agents, colorants, fragrances, and other excipients.

Suitable emulsifiers include, but are not limited to, straight chain or branched fatty acids, polyoxyethylene sorbitan fatty acid esters, sorbitan fatty acid esters, propylene glycol stearate, glyceryl stearate, polyethylene glycol, fatty alcohols, polymeric ethylene oxide-propylene oxide block copolymers, and combinations thereof.

Suitable surfactants include, but are not limited to, anionic surfactants, non-ionic surfactants, cationic surfactants, and amphoteric surfactants.

Suitable suspending agents include, but are not limited to, alginic acid, bentonite, carbomer, carboxymethylcellulose and salts thereof, colloidal oatmeal, hydroxyethylcellulose, hydroxypropylcellulose, microcrystalline cellulose, colloidal silicon dioxide, dextrin, gelatin, guar gum, xanthan gum, kaolin, magnesium aluminum silicate, maltitol, triglycerides, methylcellulose, polyoxyethylene fatty acid esters, polyvinylpyrrolidone, propylene glycol alginate, sodium alginate, sorbitan fatty acid esters, tragacanth, and combinations thereof.

Suitable antioxidants include, but are not limited to, butylated hydroxytoluene, alpha tocopherol, ascorbic acid, fumaric acid, malic acid, butylated hydroxyanisole, propyl gallate, sodium ascorbate, sodium metabisulfite, ascorbyl palmitate, ascorbyl acetate, ascorbyl phosphate, Vitamin A, folic acid, flavons or flavonoids, histidine, glycine, tyrosine, tryptophan, carotenoids, carotenes, alpha-Carotene, beta-Carotene, uric acid, pharmaceutically acceptable salts thereof, derivatives thereof, and combinations thereof.

Suitable chelating agents include, but are not limited to, ethylenediaminetetraacetic acid (EDTA), and combinations thereof.

Suitable humectants include, but are not limited to, glycerin, butylene glycol, propylene glycol, sorbitol, triacetin, and combinations thereof.

Preservatives can be used to prevent the growth of fungi and other microorganisms. Suitable preservatives include, but are not limited to, benzoic acid, butylparaben, ethyl paraben, methyl paraben, propylparaben, sodium benzoate, sodium propionate, benzalkonium chloride, benzethonium chloride, benzyl alcohol, cetylpyridinium chloride, chlorobutanol, phenol, phenylethyl alcohol, thimerosal, and combinations thereof.

Excipients may include suspending agents such as sterile water, phosphate buffered saline, saline, or a non-aqueous solution such as glycerol.

a. Pharmaceutically Acceptable Excipients

Pharmaceutically acceptable excipients include compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio, in accordance with the guidelines of agencies such as the Food and Drug Administration. Pharmaceutically acceptable excipients include, but are not limited to, diluents, preservatives, binders, lubricants, disintegrators, swelling agents, fillers, stabilizers, and combinations thereof.

b. Cosmetically Acceptable Excipients

Cosmetically acceptable excipients include, but are not limited to, water, preservatives, antioxidants, chelating agents, sunscreen agents, vitamins, dyes, hair coloring agents, proteins, amino acids, natural extracts such as plant extracts, humectants, fragrances, perfumes, oils, emollients, lubricants, butters, penetrants, thickeners, viscosity modifiers, polymers, resins, hair fixatives, film formers, surfactants, detergents, emulsifiers, opacifying agents, volatiles, propellants, liquid vehicles, carriers, salts, pH adjusting agents (e.g., citric acid), neutralizing agents, buffers, hair conditioning agents, anti-static agents, anti-frizz agents, anti-dandruff agents, absorbents, and combinations thereof.

Optionally, the cosmetically acceptable excipients are considered safe and effective for application to human skin, human hair and/or human scalp.

2. Carriers

The skilled person can select the appropriate carrier based on the desired use. For example, in some embodiments the carrier can be polyethylene glycol, polypropylene glycol, a mixture or polymer of sugars (lactose, sucrose, dextrose, etc.), salts, poloxamers, hydroxypropylcellulose, polyvinyl alcohol, other water-soluble food grade excipients, or even other excipients.

The carrier may also include a water insoluble polymer. Examples of such polymers are ethylcellulose, acrylic resins, co-polymer of methacrylic acid and acrylic acid ethyl ester, polylactic acid, PLGA, polyurethane, polyethylene vinyl acetate copolymer, polystyrene-butadiene copolymer and silicone rubber, or mixtures thereof.

3. Forms of the Compositions

The composition may be in any suitable form, such as a liquid, cream, gel, foam, solid (e.g. tablet or capsule).

For example, the nanoparticles may be compressed into tablets, optionally with a suitable binder and/or other excipients. Optionally, the tablet is coated with a material such as an enteric coating, e.g. EUDRAGIT®, to prevent release of the nanoparticles after passage through the stomach.

In some embodiments, the composition is in the form of a capsule. Optionally, the nanoparticles are encapsulated in hard or soft gels, such as gelatin and alginate capsules or enteric formulated soft gels.

In some embodiments, the pharmaceutical composition is in a form suitable administration to mucosal surfaces, such as the mouth, nasal cavity, oral cavity, pulmonary system, rectal or vaginal surfaces.

In some embodiments, the composition is in a form suitable for topical administration, such as the surface of the skin.

The compositions may also be in in the form of tablets, gels, capsules, pellets, strips, and concentrated powders, concentrated liquids, and the like.

IV. Methods of Making Nanoemulsions

A typical method for forming double nanoemulsions includes forming an $O_1/W$ pre-emulsion (first pre-emulsion) by dispersing an oil phase (e.g., silicone oil) into a continuous aqueous phase and applying a high-energy force for forming a single emulsion, then dispersing the single emulsion in a second oil phase to form a second pre-emulsion, and applying a second high-energy force to form a double emulsion.

The methods of making the nanoemulsions and nanoparticles are scalable and can be adapted to lab bench or industrial-scale applications. The methods described herein can be used to produce large quantities of multi-nanoemulsions, and multi-phase nanoparticles therefrom.

The multi-nanoemulsions and resulting particles may be prepared in batches of 15 mL. Using a bench-scale ultrasonicator, this can be scaled up to about 250 mL batches. For larger batches or continuous processing, industrial scale ultrasonicators can be used to produce greater quantities, such as batches up to 10 L. Alternatively, high-pressure homogenizers can be used to produce emulsions on a larger scale in a continuous fashion.

A. Forming a Single Emulsion

A pre-emulsion of an inner oil phase ($O_1$) in water ($O_1$/W) may be formed as follows.

Typically, an aqueous phase containing water and a polymerizable monomer or macromer (e.g., poly(ethylene glycol) diacrylate) is used to emulsify the inner oil $O_1$ (e.g., a silicon oil, a peanut oil, an olive oil, or a soybean oil). The aqueous phase may include a surfactant (e.g., TWEEN®20).

The $O_1$/W nanoemulsion can have an oil volume fraction of between 0.001 and 0.3, a polymerizable monomer or macromer fraction of between 0.1 and 0.6, and a concentration of the surfactant of between 10 mM and 500 mM. Optionally, a cargo to be encapsulated in the nanoemulsions or nanoparticles may be included in the oil phase, in the aqueous phase, or in both oil and aqueous phases. If the cargo is hydrophobic, it is typically in the oil. If the cargo in hydrophilic, it is typically in the aqueous phase.

A high-energy force, such as provided using an ultrasonicator (e.g., Fisher Scientific Model FB705), can be used to emulsify the first pre-emulsion to form a single nanoemulsion of oil nanodroplets dispersed in the aqueous phase. The period of time for emulsification with a high-energy emulsifier e.g. ultrasonicator) is sufficient to form oil nanodroplets with a diameter between 10 nm and 150 nm, between 10 nm and 100 nm, between 10 nm and 70 nm, between 10 nm and 40 nm, or between 15 and 45 nm. Sufficient time periods include about 10 sec, 20 sec, 30 sec, 40 sec, 50 sec, 60 sec, 90 sec, 2 min, 3 min, 5 min, or longer. The length of time for the emulsification can be a continuous pulse of ultrasonication, or it can be broken down to two or more pulses. The length of time for emulsification can vary based on batch size.

1. High-Energy Force

The high energy force typically refers to power densities larger than 0.1 W/mL. Generally, power densities smaller than 0.1 W/mL are considered low energy forces. High energy forces typically induce high shear, while low energy forces typically induce low shear.

For the $O_1$/W nanoemulsion, the ultrasonicator may be operated from 23 W to 110 W (corresponding to power densities of 1.5 W/mL to 7.3 W/mL). For the $O_1$/W/$O_2$ nanoemulsion, the ultrasonicator may be operated from 32 W to 58 W, which gives a power density of 2 W/mL to 3.6 W/mL.

Typically, low shear indicates flows producing low shear rates and stresses, as could be produced by stirring by hand, by a magnetic stir bar, or by an impellor in a vessel, or by flow through a pipe or tube.

Generally, high shear indicates flows producing high shear rates and stresses, as could be produced by various types of laboratory or industrial grade homogenizers or ultrasonicators.

Excessive shear indicates external flow in the fluid outside the droplets that is sufficient to produce a flow inside the droplets that will carry the inner $O_1$ droplets toward the W/$O_2$ interface. This typically occurs when the viscosity of the fluid(s) inside the droplets is similar to or smaller than that of the surrounding fluid, and when the velocities produced inside the droplets is comparable to that of Brownian motion.

B. Forming a Double Emulsion

After the oil nanodroplets are formed in the single nanoemulsion ($O_1$/W), a double nanoemulsion ($O_1$/W/$O_2$) can be formed.

The single nanoemulsion may be used to form a double nanoemulsion without further modifications, such as dilution, addition of one or more agents, cargo, etc. Alternatively, the single nanoemulsion can be further modified, such as diluted, or additional agents added. If a double emulsion having nanodroplets of the same constituents as the single emulsion is desired, then the single nanoemulsion may be used without a dilution. By contrast, if a double nanoemulsion with different constituents, or different concentrations of one or more constituents, than what is in the single emulsion is desired, then the single nanoemulsion may be diluted. For example, the single nanoemulsion may be diluted to a lower oil volume fraction with an aqueous solution containing a polymerizable monomer or macromer.

Diluents may be chosen based on the desired final constitutes and compositions for the nanoemulsions. For example, to prepare an $O_1$/W/$O_2$ nanoemulsion from an $O_1$/W nanoemulsion where only the $O_1$ droplets are to be diluted, a diluent with the same constituents and concentrations as the aqueous phase may be used. To change the $O_1$ nanodroplet concentration and/or the monomer or macromer concentration in the aqueous phase, a diluent of the same constituents as the aqueous phase, but with a different concentration of PEGDA (either higher or lower, as is required by the final desired composition), may be used. The volume fraction of the polymerizable monomer or macromer can be between 0.1 and 0.6, optionally 0.1 to 0.4.

One part of the O/W nanoemulsion (single nanoemulsion) may be dispersed into at least 5 parts, at least 10 parts, at least 15 parts, at least 20 parts, at least 25 parts, at least 30 parts of an outer oil $O_2$ phase (e.g., cyclohexane) containing a mixture of at least two surfactants (e.g., TWEEN®80 and SPAN®20) to form the second pre-emulsion.

Each of the surfactants in the second pre-emulsion may be present at a concentration of between 5 mM and 500 mM, such as between 5 mM and 200 mM, or between 5 mM and 100 mM. The mixture is then mixed for a sufficient time period at a sufficient speed to form the second pre-emulsion. Typically, the second pre-emulsion contains a dispersion of the O/W nanoparticles. For example, the mixture can be stirred for at least 10 min, at least 20 min, at least 30 minutes, at least 40 min, at least 50 min, 1 hour, at least 1 hour 10 min, at least 1 hour 20 min, at least 1 hour 30 min, at least 1 hour 40 min, at least 1 hour 50, or at least 2 hours at a speed of between 50 and 1000 rpm, between 100 and 800 rpm, between 200 and 700 rpm, or about 500 rpm. The time and/or speed for stirring may vary based on batch size.

The second pre-emulsion is treated with a high-energy source, such as ultrasonication, for a length of time of about 10 sec, 20 sec, 30 sec, 40 sec, 50 sec, 60 sec, 90 sec, 2 min, 3 min, 5 min, or longer at an amplitude of about 30% (32 Watt) to a final size of the largest particles in the $O_1$/W/$O_2$ double nanoemulsion of at least about 150 nm, at least about 200 nm, at least about 250 nm, at least about 300 nm, at least about 350 nm, at least about 400 nm, at least about 450 nm, at least about 500 nm, at least about 600 nm, at least about 700 nm, at least about 800 nm, at least about 900 nm, or more.

Figure 1B:
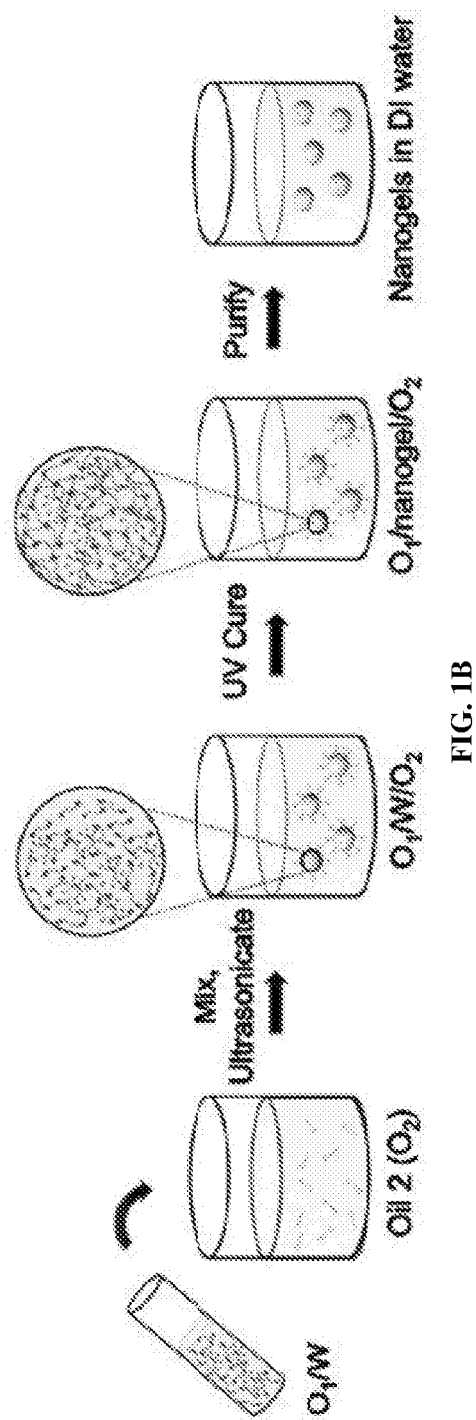

This forms the $O_1/W/O_2$ double nanoemulsion formed of $O_1/W$ particles of diameter between 150 nm and 999 nm suspended in the outer $O_2$ phase (FIGS. 1A and 1B).

1. Stability and Encapsulation Efficiency

The $O_1/W/O_2$ double nanoemulsions have high encapsulation efficiency, and are stable for at least one hour, at least two hours, at least 3 hours, at least 4 hours, at least 5 hours, at least 6 hours, at least 7 hours, at least 8 hours, at least 10 hours, at least 12 hours, at least one day, at least two days, at least three days, or more at room temperature and pressure.

The highly stable $O_1/W/O_2$ double nanoemulsions may be used to form nanoparticles.

V. Methods of Making Nanoparticles

After forming a nanoemulsion, such as a double nanoemulsion, the final nanoparticles may be formed. To the $O_1/W/O_2$ double nanoemulsion a desired initiator (optionally with an activator) can be added at a concentration suitable to initiate the polymerization of the polymerizable monomer or macromer in the aqueous phase. The initiator may be added prior to, during, or after forming the double nanoemulsion. The particles are then polymerized under the conditions suitable for polymerizing with the initiator (and activator, if present) of choice.

Prior to polymerization, the continuous matrix is a liquid, and the continuous matrix is suspended in the outer oil phase of the double nanoemulsion.

Following polymerization in the aqueous phase of the $O_1/W/O_2$ double nanoemulsion, nanoparticles form, which and are suspended in the $O_2$ phase.

A. Polymerization, Crosslinking, and Phase Change

Polymerization and/or crosslinking may be used to polymerize and/or crosslink the monomer or macromer of the aqueous phase and transform the liquid aqueous phase of the nanoemulsions to the liquid, gel, or solid continuous matrix in the nanoparticle.

1. Polymerization and Crosslinking

The polymerizable monomer or macromer may be polymerized and/or crosslinked with any suitable method. Crosslinking may be via light, such as UV light (photopolymerization), electron beam crosslinking, thermo-crosslinking, chemical crosslinking with an initiator, or non-covalent crosslinking though non-covalent interactions.

Examples of initiators and activators are provided above. Examples of crosslinkable polymers are provided above. For example, exemplary macromers and polymers include poly(ethylene glycol), polysaccharides, and polyurethanes. Exemplary ranges of pH for polymerizing the macromers include between 2 and 9, such as between 3 and 8. Exemplary ionic strength for polymerizing the macromers are between 0 M and 0.4 M, such as between 0.01 M and 0.4 M, or between 0.01 M and 0.1 M.

An example of a phase change macromer includes polysaccharides, such as alginate, which can be physically cross-linked by the addition of multivalent cations, such as calcium ($Ca^{2+}$), at pH above 3.4.

The concentration of the initiator and activator may be based on the batch size of the O/W/O preparation and adjusted as needed. Typically, for a 15 ml batch of a double O/W/O nanoemulsion containing between 0.1 and 0.6 volume fraction of the polymerizable monomer or macromer, the amount of a liquid initiator added can be between 1 µl and 1000 between 10 µl and 800 or between 50 µl and 500 The concentration of the initiator in a 15 ml batch of a double O/W/O nanoemulsion containing between 0.1 and 0.6 volume fraction of the polymerizable monomer or macromer can be between 10 µM and 100 mM, between 1 mM and 100 mM, or between 10 mM and 100 mM.

The concentrations of the initiator and/or activator can be modified, as needed to achieve the desired scale.

2. Phase Change

The transition from a liquid aqueous phase in a nanoemulsion to a liquid, gel, or solid continuous matrix in the nanoparticle may take place through a phase change of the aqueous phase macromer.

The macromers may undergo a phase change based on physical or chemical changes to the aqueous phase of the nanoemulsions. Exemplary physical and chemical changes to the aqueous phase of the nanoemulsions include changes in temperature, changes in pH, and changes in ionic strength of the aqueous phase. The change is typically an increase or a decrease in the one or more of physical or chemical factors relative to the respective factor(s) in the nanoemulsions at the time of nanoemulsion formation.

B. Solvent Exchange and Washing

Once formed, the crosslinked nanoparticles can be subject to solvent exchange using any suitable materials, solvents, and equipment. For example, solvent exchange may take place in an evaporative chamber and, in particular, an evaporation chamber operated as a distillation column, with the base containing a liquid phase. The nanoparticles may accumulate in the liquid phase relative to the vapor phase that will partition most of the oil to be removed overhead from the system. Solvent exchange may also take place through dialysis and, in particular, in a membrane chamber with a suspension of the crosslinked nanoparticles on one side and a new solvent to be introduced on the other. If the membrane is impermeable to the particles but permeable to both the original suspending medium and new solvent, the membrane may exchange the original suspending medium with the new solvent, thereby diluting the original suspending medium. The new solvent can be periodically or continuously replaced, removing the original suspending medium.

The nanoparticles may be washed by centrifuging the nanoparticles and then resuspending in any suitable washing medium. Suitable washing media include oils, buffers, and water. Water can be sterile water, deionized water, purified water, filtered water, or water containing impurities. When the washing medium is oil, the oil preferably is different from the oil used as the outer oil phase during the preparation of the double nanoemulsions.

The washing step may be repeated any number of times, such as two times, three times, four times, five times, six times, and so on.

The washing medium can be changed between washes as needed by the operator or as needed for the final application of the nanoparticles.

The nanoparticle concentrations can be determined by freeze-drying a known volume and measuring the freeze-dried mass. The nanoparticles can be resuspended in a desired medium at a desired concentration, as would be known to those of skill in the art.

C. Storing the Nanoparticles

The crosslinked nanoparticles can be stored in any suitable storage medium. Suitable storage media include excipients, desiccants, salts, buffers, pH stabilizing agents, oils, and water. When the suitable storage medium is oil, the oil may be the same as or different from the outer oil phase used during the preparation of the double nanoemulsions.

The storage can be at temperatures at or below 0° C. (e.g., −20° C., −80° C., or −165° C.), at or above 0° C., such as at refrigeration temperature (about 4° C.), at about 10° C., at room temperature and standard pressure (about 20° C., 1 atm), or at physiological temperature (about 37° C.).

Storage may be in any suitable vessel for ease of utilizing the nanoparticles in future applications. Suitable storage vessels include but are not limited to capsules, vials, packets, pouches, syringes, tubes, tubs, cans, and the like.

VI. Methods of Using the Particles and Compositions

The double nanoemulsions and nanoparticles can have a variety of different uses on their own or as part of a composition. The uses included herein are not intended to be limiting.

The nanoparticles and nanoemulsions can improve handling, stability, and availability of diverse chemical compounds and make them available as materials for industrial and consumer uses. Such uses include automotive, building and constructions, electronic materials, energy industry, water industry, including water purification, packaging industry, agriculture, consumer products, and medicine.

In the case of drug delivery, the disclosed nanoemulsions and nanoparticles allow to co-encapsulate high concentrations of hydrophobic and hydrophilic agents within the same particle. This is useful for delivering combinations of active agents, such as therapeutic agents, with disparate polarities.

With altering the inner oil type, the nanoparticles may be useful for delivery of anti-cancer drugs. More generally, vegetable oils (such as peanut oil, olive oil, soybean oil, etc.) may be used to encapsulate hydrophobic drugs for drug delivery, such as paclitaxel and camptothecin.

For other applications, including foods and consumer products, the nanoscale size range may be useful for setting colloidal stability to compositions, i.e., where Brownian motion of droplets and particles becomes sufficient to stabilize them against sedimentation.

In some embodiments, the nanoparticles are formed from commonly-used, biocompatible components. Such nanoparticles may be used in the fields of drug delivery, catalysis, or photonics.

A. Agricultural Use

The nanoparticles and/or multiple nanoscale emulsions containing food agents may be used alone, or as a part of a composition forming fertilizers, herbicides, or insecticides.

B. Consumer Use

Exemplary consumer products that can benefit from including the double nanoemulsions and/or nanoparticles include cosmetics, foodstuff, cleaning products, clothing (textile) products, and medicine.

1. Cosmetics

The disclosed nanoemulsions and/or nanoparticles may be used in any cosmetic product, include in creams, gels, salts, powders, polishes, soaps, scrubs, and coloring products. The cosmetic products may include hair cosmetics, such as perming agent, hair color, hair-growth medicine, hair-growth drug, hair cream, hair lotion, hair serum, hair milk, hair ointment, hair treatment, hair conditioner, shampoo, rinse and the like, skin cosmetics such as facial wash, skin lotion, skin milk, cream, gel, serum, facial mask, mask, soap, body shampoo, face powder, foundation, lip color, blush, eyeliner, mascara, eye shadow, eyebrow pencil and the like, and the like.

The nanoparticles and/or nanoemulsions may be used as or in dermal fillers, sunscreen, concealers, anti-wrinkle compositions, eye lash extenders, make-up, and make-up removers.

2. Food Additives

The nanoparticles and/or multiple nanoscale emulsions containing food agents may be used as food additives to increase the nutritional composition of the food, as flavoring agent, or as food preservatives to increase the stability and shelf life of particular food ingredients in a food product. Alternatively, the nanoparticles and/or nanoemulsions containing food agents may be added to the food to increase the shelf life of the food product itself.

Food includes food suitable for bacterial, fungal, plant, animal, or human consumption.

3. Cleaning and Clothing Products

The double nanoemulsions and/or nanoparticles with fragrances and/or flavors as cargo may be used to form cosmetic and consumer products. The fragrances may be added in perfumes, colognes, or aftershaves, as well as in shampoos, shower gels, shaving creams, and body lotions. Fragrances may be added to laundry detergents, fabric softeners, dryer sheets, room fresheners, or carpet fresheners. Flavors may be added to personal care products, including creams, oils, gels, balms, butters, or salts.

The double nanoemulsions and/or nanoparticles with dyes as cargo can be used to form textile dyes or hair dyes with improved safety.

C. Medicine

The double nanoemulsions and/or nanoparticles containing pharmaceutical agents can be used in a variety of medical applications.

The use can be to treat undesirable conditions, such as skin wrinkles, acne, hair loss; as preventative treatments by incorporating the double nanoemulsions and/or nanoparticles in creams, drops, or in dosage forms for preventing exposure of skin and eyes to harmful agents, such as chemicals or sunrays; as therapeutic treatments to treat diseases such as infections, inflammation, neoplastic diseases (e.g., cancer), diseases of cardio-vascular system, renal system, pulmonary system, digestive system, immune system, nervous system, and musculoskeletal system; or as imaging agents used for diagnostic purposes, such as contrast agents.

1. Cancers to be treated

Examples of cancers to be treated include, but are not limited to Leukemia, AIDS-Related Cancers Kaposi Sarcoma, AIDS-Related Lymphoma, Lymphoma, Astrocytomas, Basal Cell Carcinoma, Bile Duct Cancer, Bladder Cancer, Bone, Brain Tumors, Breast Cancer, Bronchial Tumors, Burkitt Lymphoma, Cardiac (Heart) Tumors, Cervical Cancer, Chronic Myeloproliferative Neoplasms, Colorectal Cancer, Craniopharyngioma, Embryonal Tumors, Endometrial Cancer, Ependymoma, Esophageal, Esthesioneuroblastoma, Eye Cancer Intraocular Melanoma, Retinoblastoma, Fallopian Tube Cancer, Fibrous Histiocytoma of Bone, Gallbladder Cancer, Gastric (Stomach) Cancer, Gastrointestinal Carcinoid Tumor, Head and Neck Cancer, Hepatocellular (Liver) Cancer, Hodgkin Lymphoma, Intraocular Melanoma, Pancreatic Neuroendocrine Tumors, Kaposi Sarcoma, Langerhans Cell Histiocytosis, Lip and Oral Cavity Cancer, Liver Cancer (Primary), Lung Cancer, Lymphoma, Melanoma, Mesothelioma, Non-Hodgkin Lymphoma, Non-Small Cell Lung Cancer, Osteosarcoma and Malignant Fibrous Histiocytoma of Bone, Ovarian Cancer, Pancreatic Cancer and Pancreatic Neuroendocrine Tumors (Islet Cell Tumors), Pregnancy and Breast Cancer, Osteosarcoma, Rhabdomyosarcoma, Uterine Sarcoma, Vascular Tumors, Skin Cancer, Small Cell Lung Cancer, Small Intestine Cancer, Soft Tissue Sarcoma, Squamous Cell Carcinoma, Squamous Neck Cancer with Occult Primary, T-Cell Lymphoma, Testicular Cancer, Throat Cancer, Thymoma and Thymic Carcinoma, Thyroid Cancer, Thyroid Tumors, Uterine Cancer, Endometrial and Uterine Sarcoma, and Vaginal Cancer.

D. Controlled Release and Mode of Administration

The rate of release of the cargo from the nanoparticles is typically controlled by the rate of degradation of the outer polymer in the nanoparticles. The rate of release of cargo may be controlled by the swelling properties of the nanogels. For example, the cargo retained in the nanodroplets can be released in a controlled manner by controlling the mesh size of the polymers in the nanogels.

The nanoparticles and/or nanogels may be formulated for different modes of cargo release. The different modes of cargo release include an immediate, such as burst, release, a continuous, such as zero order, release, or controlled release, such as any combination of burst release, continuous release, a lag phase before the burst release, a lag phase before the continuous release, and so on. From within the same nanoparticles, both a hydrophilic and a hydrophobic cargo may be released. Nanoparticles incorporating hydrophobic and hydrophilic cargo may be formulated to release the hydrophobic cargo with one mode of release and the hydrophilic cargo with another mode of release. Nanoparticles incorporating hydrophobic and hydrophilic cargo may be formulated to release the hydrophobic and the hydrophilic cargo with a similar mode of release.

The nanoemulsions, nanoparticles, or compositions containing nanoemulsions and/or nanoparticles, may be administered in any form suitable for their particular application.

For therapeutic applications, compositions may be in a form suitable for any mode of administration, including systemic, parenteral, enteral, topical, local, buccal, intracranial, intravenous, subcutaneous, intradermal, intramuscular, intraocular, and intraperitoneal administration. The nanoemulsions, nanoparticles, and compositions may be suitable for administration to mucosal surfaces, such as the mouth, nasal cavity, oral cavity, pulmonary system, rectal or vaginal surfaces.

In some embodiments, the composition is in a form suitable for topical administration, such as the surface of the skin.

The nanoemulsions, nanoparticles, and/or compositions thereof may be administered by pouring, spreading, ingesting, injecting, spraying, brushing, mixing, and any other suitable application modes.

E. Dosage Forms

The pharmaceutical compositions can be formulated as a pharmaceutical dosage unit, also referred to as a unit dosage form. The dosage forms can be for immediate or controlled, such as delayed release.

The compositions are typically formulated in dosage unit form for ease of administration and uniformity of dosage. It will be understood, however, that the total daily usage of the compositions will be decided by the attending physician within the scope of sound medical judgment. The specific therapeutically effective dose level for any particular subject or organism will depend upon a variety of factors including the disorder being treated and the severity of the disorder; the activity of the specific active ingredient employed; the specific composition employed; the age, body weight, general health, sex and diet of the subject; the time of administration, route of administration, and rate of excretion of the specific active ingredient employed; the duration of the treatment; drugs used in combination or coincidental with the specific active ingredient employed; and other factors well known in the medical arts.

In certain embodiments, dosage units contain nanoparticles encapsulating a pharmaceutical agent in amounts ranging from about 0.001 mg/kg to about 100 mg/kg, from about 0.01 mg/kg to about 50 mg/kg, from about 0.1 mg/kg to about 40 mg/kg, from about 0.5 mg/kg to about 30 mg/kg, from about 0.01 mg/kg to about 10 mg/kg, from about 0.1 mg/kg to about 10 mg/kg, or from about 1 mg/kg to about 25 mg/kg, of subject body weight per day, one or more times a day, to obtain the desired therapeutic effect. The desired dosage may be delivered three times a day, two times a day, once a day, every other day, every third day, every week, every two weeks, every three weeks, or every four weeks. In certain embodiments, the desired dosage may be delivered using multiple administrations (e.g., two, three, four, five, six, seven, eight, nine, ten, eleven, twelve, thirteen, fourteen, or more administrations).

VII. Kits

Kits containing the nanoparticles and/or multiple nanoscale emulsions are also provided. The kits may include vials, tablets, gels, capsules, pellets, and strips, or other suitable vessels containing the nanoparticles and/or multiple nanoscale emulsions.

In some aspects, the kit contains a pre-mixed combined composition, which contains the nanoparticles and/or multiple nanoscale emulsions with cargo and a suitable excipient. The combined compositions in the kit may be in sterile form. The combined compositions may be provided in the form of a liquid, gel, capsule, tablet, pellet, suppositories, cream, or spray. The compositions may be available in a kit ready for use form.

Instructions for use of the kit are also typically provided.

The present invention will be further understood by reference to the following non-limiting examples.

EXAMPLES

Example 1. Production of Single $O_1/W$ and $W/O_2$ Nanoemulsions

Nomenclature for $O_1/W$ nanoemulsion $\Phi^{O_1}$: volume fraction of inner oil phase ($O_1$) in $O_1/W$ nanoemulsion $V^{O_1}$: volume of inner oil phase ($O_1$) in $O_1/W$ nanoemulsion $\Phi^W$: volume fraction of dispersed phase (i.e. for $O_1/W/O_2$, dispersed phase is $O_1/W$; for just simple W/O nanoemulsion, dispersed phase is just W)

$V^W$: volume of aqueous phase consisting of PEGDA ($V_{PEGDA}^W$)+water ($V_{H_2O}^W$)+Tween 20 ($V_{T20}^W$) in $O_1/W$ nanoemulsion $C_{T20}^W$: concentration of Tween 20 in aqueous phase of $O_1/W$ nanoemulsion $M_{T20}^W$: moles of Tween 20 in $O_1/W$ nanoemulsion $\Phi_{PEGDA}^W$: volume fraction of PEGDA in aqueous phase of $O_1/W$ nanoemulsion $$V^W = V_{PEGDA}^W + V_{H_2O}^W + V_{T20}^W$$

$$\Phi^{O_1} = \frac{V^{O_1}}{V^{O_1} + V^W}$$

$$\phi_{PEGDA}^W = \frac{V_{PEGDA}^W}{V^W}$$

$$C_{T20}^W = \frac{M_{T20}^W}{V^W}$$

Materials and Methods

Poly(ethylene glycol) diacrylate ($M_n$=700 g/mol), TWEEN®20, TWEEN®80, SPAN®80, cyclohexane (ACS reagent grade≥99%), silicone oil (100 cSt), were purchased from Sigma Aldrich and used as received.

For most studies, a high-viscosity silicone oil phase was chosen as a model liquid for the $O_1$ phase due to its relatively low solubility in water/PEGDA mixtures. PEGDA ($M_n$=700 g/mol) was the macromere used in most of the studies due to its high water solubility, relatively fast polymerization rate, ability to crosslink with itself to form hydrogels, and biocompatibility. Based on previous studies of the production of O/W/O multi-nanoemulsions, cyclohexane as the $O_2$ phase was used for its low viscosity and relative volatility (to facilitate separation), and a mixture of conventional ethoxylated nonionic surfactants Span®80 and Tween®80 was used for their ability to form stable nanoemulsions.

Results

The multi-nanoemulsions include an inner oil nanodroplets phase ($O_1$) encapsulated within nanodroplets of a dispersed aqueous phase (W) containing a photocrosslinkable hydrogel pre-cursor, poly(ethylene glycol) diacrylate (PEGDA), which are suspended within an outer oil phase ($O_2$).

Single Oil-in-Water ($O_1$/W) Nanoemulsions

Figure 2A:
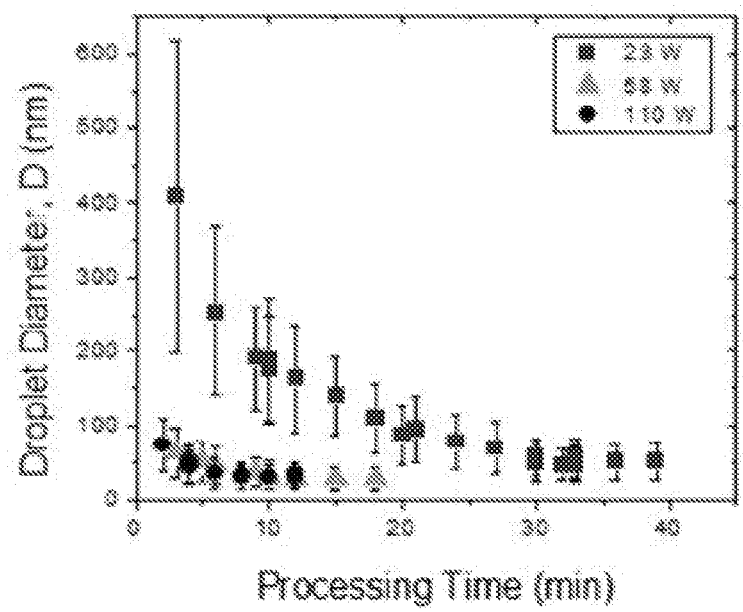
FIG. 2A is a graph showing the influence of ultrasonication time (min) and power (23 W—squares, 58 W—triangles, and 110 W—circles) on the droplet size (Droplet Diameter, D (nm)) of $O_1$/W nanoemulsions.
Figure 2B:
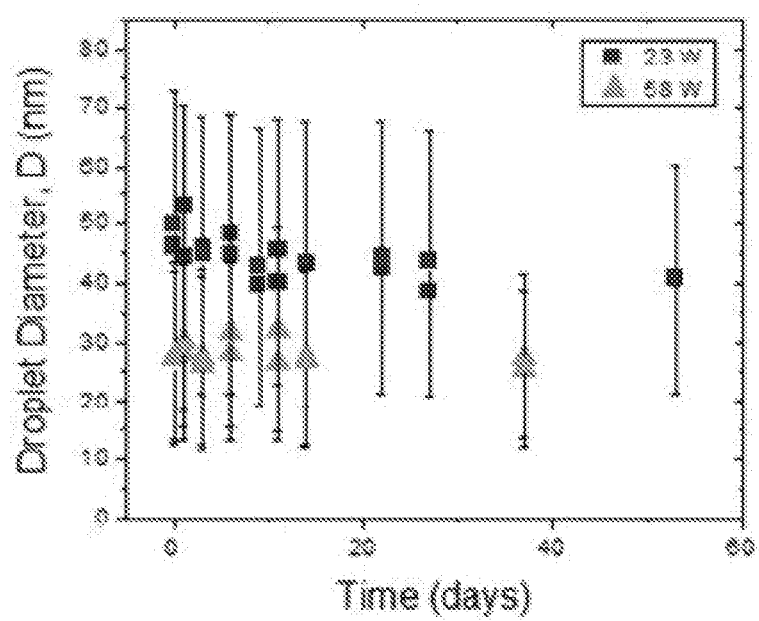
FIG. 2B is a graph showing the stability of $O_1$/W nanoemulsion (Droplet Diameter, D (nm)) over a period of 2 months (60 days).

Single oil-in-water ($O_1$/W) nanoemulsions were formed by ultrasonicating a coarse emulsion composed of silicone oil ($O_1$) in an aqueous PEGDA solution containing Tween20 surfactant. When keeping the composition constant, the final size of the nanoemulsion can be controlled by adjusting either the power or time of ultrasonication. In the canonical composition, 10% of the total suspension volume was silicone oil ($\Phi^{O_1}$=0.10), 33% of the aqueous phase volume was PEGDA ($\phi_{PEGDA}^{W}$=0.33), with the surfactant, TWEEN®20, being at a concentration of 100 mM in the aqueous phase ($C_{T20}^{W}$=100 mM). For nanoemulsions with this composition, average sizes measured by dynamic light scattering (DLS) range from approximately 30-400 nm depending on the ultrasonication power and processing time (FIG. 2A, showing data from N=$10^{14}$ particles). The average droplet size decreases as more mechanical energy is added to the system until a size plateau is reached, whereby the deformations applied to the fluid are no longer sufficient to break up the droplets. These droplet sizes are corroborated by cryo-TEM. The stability of the nanoemulsions was determined by measuring the droplet size over time (FIG. 2B). As expected for nanoemulsions of such a small size, these droplets are extremely stable, with no appreciable change in diameter over multiple months (FIG. 2B).

Single Water-in-Oil (W/$O_2$) Nanoemulsions

Figure 2C:
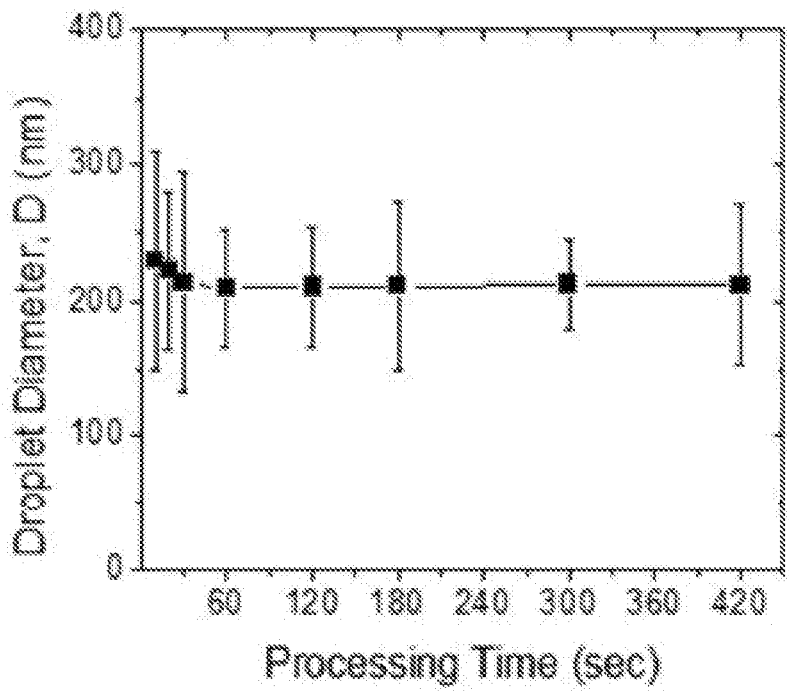
FIG. 2C is a graph showing the influence of ultrasonication time (sec) on the droplet size (Droplet Diameter, D (nm)) of $\Phi^W$=0.06 W/$O_2$ nanoemulsions (power=46 W).
Figure 2D:
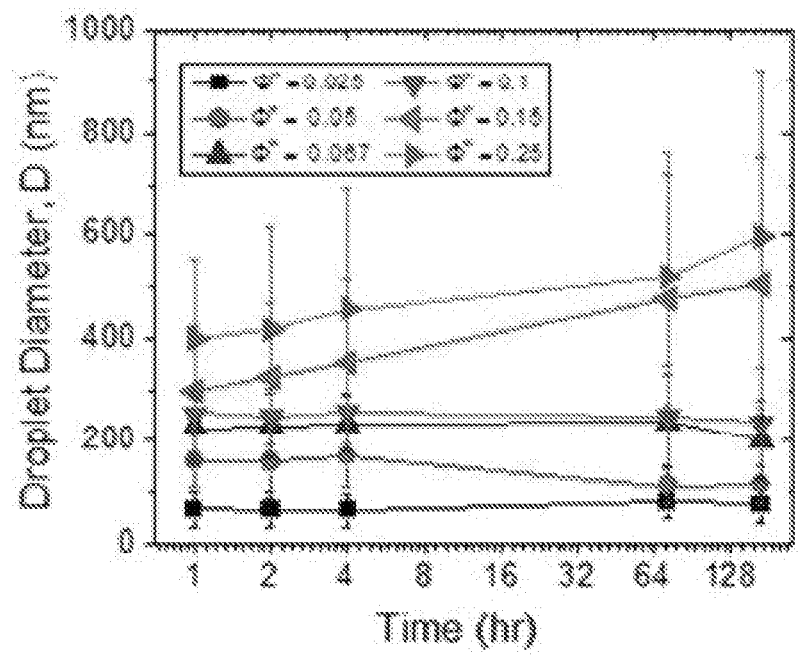
FIG. 2D is a graph showing the effect of dispersed phase volume fraction ($\Phi^W$) in cyclohexane on nanoemulsion size (Droplet Diameter, D (nm)) and stability over time (hours). Error bars on the droplet diameters indicate polydispersity of droplet distribution (±1 standard deviation).

Single W/$O_2$ nanoemulsions were formed by ultrasonicating a coarse emulsion of hydrogel precursor solution in cyclohexane with SPAN®80 and TWEEN®80 as co-surfactants, similar to a system used in previous work to generate uniform nanogel particles. As a canonical composition, 1 mL of the dispersed W phase composed of 33 vol % PEGDA ($\phi_{PEGDA}^{W}$=0.33) and water was emulsified into 15 mL cyclohexane with 300 mg of SPAN®80 and 100 mg of TWEEN®80 to achieve a final dispersed phase volume fraction ($\Phi^{W}$) of 0.06. Cryo-TEM shows distinct 100 nm to 200 nm droplets dispersed in cyclohexane. The effect of ultrasonication time on W/$O_2$ nanoemulsion size was measured via DLS and exhibited a trend qualitatively similar to that of the $O_1$/W nanoemulsion (FIG. 2C). As with the $O_1$/W nanoemulsion, this trend is a result of additional energy input breaking up the emulsion into progressively smaller droplets combined with mechanical limitations on the minimum droplet size. The aqueous phase volume fraction ($\Phi^{W}$) provides some degree of control over the droplet size over a relatively wide range, with final droplet sizes ranging from 70 nm to over 400 nm (FIG. 2D, showing data from N=$10^{11}$ particles). The average PDI is between 0.15 to 0.25 for all samples; error bars indicate standard deviation (σ) of the droplet size distribution, where PDI=$(\sigma/D)^2$. Droplet size was then monitored over time with DLS. Larger droplets ($\geq\Phi^{W}$=0.15) showed limited stability, i.e. the size of droplets changed substantially within a period of 0 to 1 hours, but the smaller sizes remained stable for multiple weeks (FIG. 2D), demonstrating that smaller W/$O_2$ nanoemulsions possess adequate stability for particle templating.

Example 2. Synthesis of Oil-Laden Nanogels from $O_1$/W/$O_2$ Double Nanoemulsion Templates Materials Poly(ethylene glycol) diacrylate ($M_n$=700 g/mol), TWEEN®20, TWEEN®80, SPAN®80, cyclohexane (ACS reagent grade≥99%), silicone oil (100 cSt), peanut oil, and 2-hydroxy-2-methylpropiophenone were purchased from Sigma Aldrich and used as received. Poly(ethylene glycol) diacrylate ($M_n$=10,000 g/mol) was synthesized in-house. PEG, 2.2 equiv of acryloyl chloride and trimethylamine reacted in dichloromethane for 8 h in a dark environment at room temperature. The solution was filtered and precipitated into ethyl ether. The product was collected by filtration and then dried in a vacuum oven prior to use. The molecular mass and molecular mass distribution were determined using a combination of 41 NMR and GPC.

Methods

The double nanoemulsions and oil-laden nanoparticles were synthesized according to FIGS. 1A and 1B through a two-step high energy emulsification process. Emulsification by sonication was performed using a 700 Watt Fischer sonicator dismembrator with modular amplitude.

A typical protocol is as follows: First, an $O_1$/W pre-emulsion was created by dispersing an oil of choice (i.e. silicone oil) into a continuous phase consisting of water, poly(ethylene glycol) diacrylate, and TWEEN®20. Unless otherwise stated, the typical stock composition for the $O_1$/W nanoemulsion is $\phi_{oil}$=0.10, $\phi_{PEGDA}^{W}$=0.33, $C_{T20}$=121 mM. A high-energy ultrasonicator (Fisher Scientific Model FB705) was used to emulsify the pre-emulsion into 20-30 nm oil droplets. At this point, the stock nanoemulsion was ready to be diluted down to a lower oil volume fraction with solutions containing either higher or lower concentrations of PEGDA to create suspensions with a wide range of $\phi_{PEGDA}^{W}$. In the particular sample, the stock $O_1$/W was diluted with pure $\phi_{PEGDA}$=0.20 solution to get a final composition of $\phi_{oil}$=0.04, and $\phi_{PEGDA}^{W}$=0.25, $C_{T20}^{W}$=44 mM. 1 mL of this $O_1$/W nanoemulsion was then dispersed into 15 mL of an outer oil $O_2$ (cyclohexane) phase with 300 mg of SPAN®80 and 100 mg of TWEEN®80 and let stir for 30 minutes at speed of 500 rpm. The pre-emulsion was then ultrasonicated for 30 s to 1 minute at an amplitude of 30% (32 Watt) to a final size of 300 nm. 100 μL of photoinitiator 2-hydroxy-2-methylpropiophenone was then added to the sample and the sample was UV-polymerized via free-radical polymerization for 5 min using a 365 nm long-wave UV lamp. The nanoparticles were then washed first in cyclohexane via centrifugation (20 mL, 1 round, 18,000 g), then in DI water (35 mL, 2 rounds, 25,000 g), and then resuspended in DI water. Nanoparticle concentrations can be determined by freeze-drying a known volume and measuring the freeze-dried mass.

For FIGS. 1A, 1B, and 3C. First, a stock of silicone oil-in-water nanoemulsion at $\Phi^{O_1}=0.10$, $\phi_{PEGDA}^{W}=0.33$, and $C_{T20}^{W}=117$ mM (V s=1.50 ml, $V_{H_2O}^{W}=7.39$ ml, $m_{PEGDA}=1.98$ g, $m_{PEGDA}=4.99$ g) was mixed together and ultrasonicated (amplitude 90) to a final size of 25 nm. Then, 2 ml of the stock was mixed with 3 ml of water/PEGDA mixture (with PEGDA v/v of 0.2) to get a final composition of $\Phi^{O_1}=0.04$ and $\phi_{PEGDA}^{W}=0.25$, $C_{T20}^{W}=44$ mM. 1 mL of $O_1/W$ was added to 15 mL of cyclohexane solubilized with a surfactant mixture of 100 mg Tween80 and 300 mg Span80 ($C_{T80}^{O_1}=5$ mM, $C_{S80}^{O_1}=47$ mM) to formulate the $O_1/W/O_2$ double nanoemulsion.

For FIG. 3A and making $O_1/W$ at different $\Phi^{O_1}$ while keeping $\Phi_{PEGDA}^{W}$ and number of Tween20 per oil droplet constant. First, a stock of silicone oil in water nanoemulsion at $\Phi^{O_1}=0.12$, $\phi_{PEGDA}^{W}=0.33$ and $C_{T20}^{W}=145$ mM ($V^{O_1}=1.98$ ml, $V_{H_2O}^{W}=7.39$ ml, $m_{T20}=2.55$ g, $m_{PEGDA}=4.99$ g) was mixed together and then ultrasonicated (amplitude 90) for 6 minutes to a size of 27 nm. The stock was then diluted using water/PEGDA mixtures of varying PEGDA concentrations to different final $\Phi^{O_1}$ (0.10, 0.08, 0.06, 0.04, 0.02) while keeping the final $\phi_{PEGDA}^{W}=0.25$ and the surfactant-to-oil ratio constant. 1 mL of $O_1/W$ was added to 15 mL of cyclohexane solubilized with a surfactant mixture of 100 mg Tween80 and 300 mg Span80 ($C_{T80}^{O_1}=5$ mM, $C_{S80}^{O_2}=47$ mM) to formulate the $O_1/W/O_2$ double nanoemulsion.

Figure 3D:
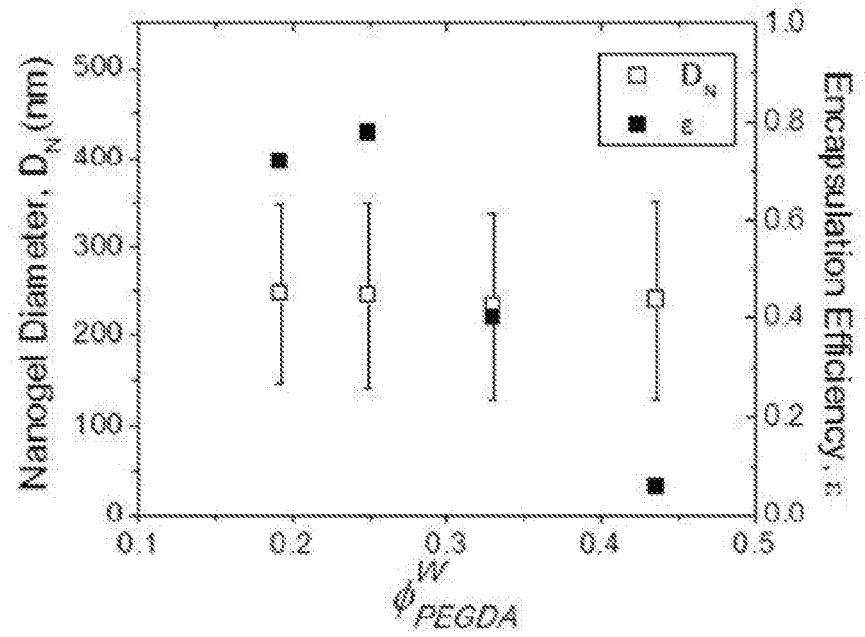

For FIG. 3D Making $O_1/W$ at different $\phi_{PEGDA}^{W}$ while keeping $\Phi^{O_1}$ and Tween20-to-oil ratio constant. First, a stock of silicone oil-in-water nanoemulsion at $\Phi^{O_1}=0.10$, $\phi_{PEGDA}^{W}=0.33$, and $C_{T20}^{W}=117$ mM ($V^{O_1}=1.50$ ml, $V_{H_2O}^{W}=7.39$ ml, $m_{T20}=1.98$ g, $m_{PEGDA}=4.99$ g) was mixed together and then ultrasonicated (amplitude 90) to a size of 25 nm. Then, 2 ml of the stock was diluted with 3 ml of water/PEGDA mixtures at varying PEGDA vol % (10%, 20%, 33%, 50%) to different final $\phi_{PEGDA}^{W}$ (0.18, 0.25, 0.33, 0.43) while keeping the final $\Phi^{O_1}=0.04$ and the surfactant-to-oil ratio constant. 1 mL of $O_1/W$ was added to 15 mL of cyclohexane solubilized with a surfactant mixture of 100 mg Tween80 and 300 mg Span80 ($C_{T80}^{O_1}=5$ mM, $C_{S80}^{O_2}=47$ mM) to formulate the $O_1/W/O_2$ double nanoemulsion.

For Making $O_1/W/O_2$ Using PEGDA 10K.

First, a stock of silicone oil-in-water nanoemulsion at $\Phi^{O_1}=0.096$, $\phi_{PEGDA}^{W}=0.2$, and $C_{SDS}=222$ mM ($V^{O_1}=1.50$ ml, $V_{H_2O}^{W}=10$ ml, $m_{SDS}=1$ g, $m_{PEGDA}=3.5$ g) was mixed together and ultrasonicated to a size of 80 nm. 1 ml of this $O_1/W$ nanoemulsion was dispersed into 15 ml of cyclohexane with 300 mg of SPAN 80 and 100 mg of Tween 80, and stirred for 30 minutes at 500 rpm. The pre-emulsion was then ultrasonicated for 30 s to 2 min at an amplitude of 30 to a final size of 300-400 nm. 100 uL of photoinitiator was subsequently added to the sample and the sample was UV-polymerized for 5 min using a 365 nm long-wave UV lamp, then washed via centrifugation and resuspended in water.

Particle Size.

Size measurements were obtained by dynamic light scattering (DLS) using a BI-20S (Brookhaven Instruments) with a HeNe 632 nm laser with multi-angle capabilities. Measurements were carried out at 20° C. and a fixed angle of 90 degrees. Autocorrelation functions were collected and fit to a cumulant analysis to obtain the Z-average and polydispersity index (PDI). The particles were diluted with Millipore DI water to $10^{-2}$% by dry mass, and the intensity was kept around 200-500 kcps for each measurement.

Particle Structure.

Cryogenic Transmission Electron Microscopy (Cryo-TEM) was used to decipher the internal structure of both the double nanoemulsion and the oil-laden nanogels. Samples were prepared using a Vitrobot Mark IV at room temperature and variable humidity (100% RH for aqueous sample, no humidity control for organic phase samples). Lacey carbon coated copper grids (200 mesh) were acquired from Electron Microscopy Sciences and used as the sample grid for both aqueous and organic phase (i.e. cyclohexane) samples. For aqueous phase samples, the grids were plasma-treated for 20 seconds prior to vitrification in liquid ethane for aqueous samples. For organic phase samples (i.e. samples in cyclohexane), the grids were used directly without plasma treatment and liquid nitrogen was selected as the vitrifying liquid. The procedure for sample preparation is as follows: first, 1.2 μL of aqueous phase samples (2 μL for organic phase) was deposited onto the grid; the grid was then blotted to remove excess liquid (blotting time: 1 s, blotting force: 2, number of blots: 1), and subsequently plunged into the vitrifying liquid to trap the sample in a thin layer of amorphous ice. The samples were then transferred to the cryo-TEM holder and viewed under the FBI Tecnai G2 Sphera TEM at 200 kV. Low-dose mode was used for organic phase samples. Gatan Digital Micrograph was used to record the images acquired by the digital camera.

Particle Oil Content.

Solid-state $^1$H NMR was used to analyze the oil content of the oil-laden nanogels. For sample preparation, the washed nanogel particles were dispersed in $D_2O$ and spun down into a pellet. The pellet was then diluted by adding a small amount of $D_2O$ and placed into a 50 uL NMR rotor with a Kel-F cap. The rotor was then placed into a solid-state 500 MHz NMR (Bruker Avance IPSO500) and spun at a speed of 8 kHz. The number of repeats for this assay was 3.

Results

Having demonstrated the capability of controlling both the size and stability of the single $O_1/W$ and $W/O_2$ nanoemulsions, the creation of $O_1/W/O_2$ double nanoemulsions, and subsequently PEGDA nanogels templated from them employed a serial nanoemulsification protocol. In this protocol, an oil-in-water ($O_1/W$) nanoemulsion is prepared by ultrasonication, and then itself emulsified into an outer oil ($O_2$) phase via a second ultrasonication process (FIG. 1A). After the addition of photo-initiator and exposure to UV light, the PEGDA in the $O_1/W/O_2$ double nanoemulsion is photo-polymerized and forms oil-laden nanogels. Thus, the $O_1/W/O_2$ double nanoemulsion allows templating of the oil-laden nanogels with UV curation. The nanogels are subsequently purified and stored in DI water.

Cryo-TEM images for several important steps were acquired to aid visualization of the synthesis process (FIGS. 1A and 1B). The cryo-TEM images showed circular 20-30 nm darker droplets encapsulated in larger droplets of lower average intensity that have distinct thin edges surrounding them, characterizing the surfactant layer. Combined with the DLS measurements of the $O_1/W$ and $W/O_2$ simple nanoemulsions, this confirms the encapsulation of silicone oil droplets with an average diameter of 30 nm in hydrogel precursor droplets with an average diameter of 300 nm. The image acquired of particles after the addition of photo-initiators and exposure to UV light, which initiates polymerization of the water/PEGDA phase of the double nanoemulsion, showed the structures and contrast resembling those of the particles prior to addition of the photo-initiators and exposure to UV light, with the only difference being the disappearance of thin rings around the 300 nm water/PEGDA droplets. This can be attributed to the disruption of the surfactant layer as the PEGDA polymerizes into a three-dimensional hydrogel network. Finally, after purifying the nanogels through a series of centrifugation and solvent exchange processes and re-dispersing the nanogels into deionized (DI) water, the final structure of the oil-laden nanogels is more clarity observed. The fact that the final oil-laden nanogels retain similar structure as the initial $O_1/W/O_2$ template confirms the effectiveness of the double nanoemulsion template.

The nanogels are subsequently purified and stored in DI water at 10° C. in order to minimize oil solubility in the continuous phase (see Example 6).

Example 3. Encapsulation Efficiency and Stability of Oil-Laden Nanogels from $O_1/W/O_2$ Double Nanoemulsion Templates Materials and Methods
Materials and methods as described in Examples 1 and 2.
Results
For the Examples, the choice of silicone oil as the inner oil phase facilitates direct quantification using solid-state NMR both before the initial nanoemulsification process and after the resulting oil-laden nanogels have been synthesized and purified.

A representative NMR spectrum of the oil-laden nanogels was obtained. By quantifying the area of the various distinct peaks corresponding to silicone oil, Tween20, cyclohexane, and PEGDA, the final composition of the gels was calculated and thereby the encapsulation efficiency of silicone oil was determined.

Cyclohexane is the outer oil phase ($O_2$) from the $O_1/W/O_2$ template and is monitored in the final oil-laden nanogels to gauge i) how much cyclohexane is remaining after the purification process, and ii) whether any cyclohexane is trapped inside the nanogels due to instability of $O_1/W/O_2$ during the emulsification process. The NMR data showed a negligible amount of cyclohexane remains in final purified nanogels and was thus neglected in later analysis.

To better understand the stability of the $O_1/W/O_2$ double nanoemulsions, and determine operating conditions that affect encapsulation efficiency, NMR spectra were measured across a range of several processing parameters, including: 1) the ultrasonication processing time of the $O_1/W/O_2$ double nanoemulsion, 2) the waiting time between ultrasonication and UV-photopolymerization of $O_1/W/O_2$, 3) the initial inner oil volume fraction $\Phi^{O_2}$ in $O_1/W$, and 4) the PEGDA volume fraction $\phi_{PEGDA}^W$ in $O_1/W$.

For each sample, the oil encapsulation efficiency ($\varepsilon$) is defined as $$\varepsilon = \frac{\text{measured oil content}}{\text{initial oil content}},$$

where the initial and final amounts of oil were determined by NMR.

These measurements were used to determine the maximum amount of inner oil ($O_1$) that can be encapsulated within the oil-laden nanogels. Specifically, FIG. 3A shows how the encapsulation efficiency ($\varepsilon$) and size ($D_N$) of nanogels change as the initial silicone oil volume fraction ($\Phi^{O_2}$) in the $O_1/W$ phase is systematically varied while holding the dispersed phase volume fraction ($\Phi^W$), PEGDA volume fraction in the dispersed phase ($\phi_{PEGDA}^W$), and the concentration of Tween20 per oil droplet constant. Once the $O_1/W$ nanoemulsions were prepared, 1 mL of $O_1/W$ was added to 15 mL of cyclohexane solubilized with a surfactant mixture of 100 mg TWEEN®80 and 300 mg SPAN®80 ($C_{T80}^{O_2}$=5 mM, $C_{S80}^{O_2}$=47 mM) to formulate the $O_1/W/O_2$ double nanoemulsion. The double nanoemulsions were then ultrasonicated for 40 s and photocrosslinked to form nanogels.

It was found that both the size polydispersity and oil content of the nanogels increased with increasing oil volume fraction from $\Phi^{O_1}$=0.02 to 0.10 (FIG. 3A). For $\Phi^{O_1}$<0.06, the average size of the nanogels ranges from 200-300 nm, and is fairly monodisperse, with a polydispersity index (PDI) of 0.2 (reflected by the error bars in FIG. 3a). However, at $\Phi^{O_1}$=0.10, a bimodal population of droplet sizes was observed, with a smaller population having an average size of 200 nm and a larger population having an average size of 1.0 μm. This suggested that although more oil could be encapsulated into the nanogels, it became difficult to control size and polydispersity for $\Phi^{O_1}$>0.10. The measured oil content increased linearly with increase in the initial input amount with a slope of $\varepsilon$~0.58. Regardless of the input initial oil content, the oil encapsulation efficiency ($\varepsilon$) at each composition also decreased by approximately 40% after 40 s of ultrasonication. This suggested that the mechanism responsible for oil loss is qualitatively the same regardless of initial oil content. From this, it was concluded that the mechanism of oil encapsulation instability is primarily dictated by kinetic processes occurring within individual $O_1/W$ droplets, and is only weakly influenced by interactions between dispersed $O_1/W$ droplets.

Ultrasonication Processing Time

To further elucidate the primary mechanism for oil loss, the effect of ultrasonication processing time of $O_1/W/O_2$ on the final nanogel size and encapsulation efficiency was studied in more detail for two silicone oil volume fractions, $\Phi^{O_1}$=0.04 and $\Phi^{O_1}$=0.10 (FIG. 4B). For both compositions, both the nanogel size ($D_N$) and encapsulation efficiency ($\varepsilon$) decreased with increasing ultrasonication time. This suggested that ultrasonication plays a significant role in droplet instability, and that there is a tradeoff between size and oil encapsulation efficiency; i.e., increasing the ultrasonication time leads to smaller sizes and lower polydispersity, but at the same time reduces the oil encapsulation efficiency. This observation is demonstrated most clearly for $\Phi^{O_1}$=0.10; in order to achieve a sufficiently small nanogel size (<500 nm) with a narrow PDI, extensive ultrasonication is required, resulting in low oil content. Mechanistically, this suggests the kinetic stability of the $O_1$ phase is significantly reduced during ultrasonication of the $O_1/W/O_2$ nanoemulsion and leads to coalescence of the $O_1$ phase with the outer (miscible) $O_2$ phase. Similar results have been reported in literature for double W/O/W emulsions that exhibit destabilization due to high shear. Specifically, excessive shear could induce streaming, i.e., flow within the outer droplets that induces motion of the inner droplets. In turn, this could hasten film drainage of the outer droplet fluid between the inner $O_1$ droplets and the W/$O_2$ interface, facilitating coalescence of the $O_1$ droplets with the outer $O_2$ phase (FIGS. 4A-4D). Thus, applying more moderate emulsification conditions to produce double nanoemulsions could avoid rapid reduction in encapsulation efficiency. This is likely why most of the double nanoemulsions reported previously exhibit relatively large size polydispersity.

Waiting Time Between the Ultrasonication Step and the Crosslinking Step

To further explore the stability of the inner oil phase inside the double emulsion, the relationship between the nanogel encapsulation efficiency ($\epsilon$) and the waiting time between the ultrasonication step and subsequent UV-photo-crosslinking of $O_1/W/O_2$ was studied (FIG. 3C). To prepare the samples, 1 mL of $O_1/W$ silicone oil-in-water nanoemulsion of $\Phi^{O_1}=0.04$, $\phi_{PEGDA}^{W}=0.25$, $C_{T20}^{W}=44$ mM was added to 15 mL of cyclohexane ($O_2$) solubilized with a surfactant mixture of 100 mg Tween80 and 300 mg Span80 ($C_{T80}^{O_2}=5$ mM, $C_{S80}^{O_2}=47$ mM) to create the $O_1/W/O_2$ double nanoemulsion. The mixture was subjected to 30 s of ultrasonication, divided into 4 batches of equal amount, and photocrosslinked at different time points over a period of 0 to 6 hours after ultrasonication.

It was found that under these conditions, both the encapsulation efficiency and overall diameter of the nanogels remained relatively constant for waiting times up to 6 hours (FIG. 3C). This indicated that the inner phase of the $O_1/W/O_2$ nanoemulsion is relatively stable after ultrasonication. Specifically, the stable size distribution suggested that little to no droplet ripening or coalescence occurred between $O_1/W/O_2$ droplets, and the stable encapsulation efficiency indicated no observable encapsulated oil loss. Therefore, the instability of the $O_1/W/O_2$ nanoemulsions is dominated by the enhanced coalescence of the $O_1$ phase with the $O_2$ phase that occurs during the ultrasonication process (FIGS. 4A-4D).

Macromer Volume Fraction

To demonstrate that the $O_1/W/O_2$ templating method can be used to prepare nanogels with a wide range of crosslinking density, the effect of PEGDA hydrogel pre-cursor concentration ($\phi_{PEGDA}^{W}$) in the $O_1/W$ nanoemulsion on oil encapsulation efficiency in the resulting nanogels was studied. To prepare the samples, a silicone oil-in-water nanoemulsion of $\Phi^{O_1}=0.10$, $\phi_{PEGDA}^{W}=0.33$, $C_{T20}^{W}=117$ mM was prepared, and the $O_1/W$ nanoemulsion was then diluted to $\Phi^{O_1}=0.04$ with solutions containing different volume fractions of PEGDA in water to achieve final values of $\phi_{PEGDA}^{W}$ between 0.18 and 0.43. The average size of the silicone oil droplets in the $O_1/W$ nanoemulsion after dilution (approximately 30 nm in all cases) was found to be independent of $\phi_{PEGDA}^{W}$ (Table 2). These $O_1/W$ nanoemulsions ($\Phi^{O_2}=0.04$) were then emulsified to make $O_1/W/O_2$ double nanoemulsions, polymerized to form nanogels, and the resulting oil encapsulation efficiency was quantified by NMR.

TABLE 2

Size of oil droplet in $O_1/W$ nanoemulsion before and after diluting the oil volume fraction with different concentration of water/PEGDA solutions.

| $\phi_{PEGDA}^{W}$ | Before Dilution (nm)/PDI | After Dilution (nm) PDI |
|---|---|---|
| 0.18 | 27.4/0.22 | 31.2/0.28 |
| 0.25 | 27.0/0.22 | 31.1/0.26 |
| 0.33 | 30.6/0.23 | 29.4/0.26 |
| 0.43 | 30.5/0.27 | 32.7/0.32 |

A decrease in oil encapsulation efficiency with increasing $\phi_{PEGDA}^{W}$ was observed, whereas the size of the nanogels remained relatively constant (FIG. 3D). The observed decrease in e appears to occur above a value of $\phi_{PEGDA}^{W}$~0.3, below which the encapsulation efficiency is relatively independent of PEGDA concentration. To confirm this result, Cryo-TEM images for $\phi_{PEGDA}^{W}=0.25$ and 0.43 were taken of the $O_1/W/O_2$ nanoemulsions immediately after photocrosslinking, and the final nanogels after purification and resuspension into water. The resulting images agreed with the NMR results. Specifically, the images confirmed that the nanogels at $\phi_{PEGDA}^{W}=0.25$ contained a large number of encapsulated oil nanodroplets, whereas the nanogels with $\phi_{PEGDA}^{W}=0.43$ did not have any discernable oil nanodroplets within them.

The cryo-TEM images showed that the oil loss that occurred for $\phi_{PEGDA}^{W}=0.43$ did so prior to the photopolymerization process. Given the previous findings that ultrasonication significantly enhanced droplet instability, this suggested that the presence of PEGDA in the $O_1/W/O_2$ nanoemulsions tended to enhance ultrasonication-induced droplet instability. This may be caused by the increased solubility of the surfactant Span80 in the aqueous phase with increasing $\phi_{PEGDA}^{W}$, which was verified by independent solubilization experiments. The greater solubility of Span80 in the water/PEGDA (W) phase may induce faster transfer of the Span80 molecule from the $W/O_2$ interface to the $O_1/W$ interface, thereby lowering the interfacial tension at both interfaces and facilitating the coalescence of inner oil droplets with the outer oil phase (FIGS. 4D-4G).

Example 4. Double Nanoemulsion Nanogels Incorporating Cargo

Materials and Methods
Materials and methods as described in Examples 1 and 2.
Results
The double nanoemulsion templating process is successful in creating PEGDA nanogels when the silicone oil is replaced with peanut oil nanodroplets with an average size of 20 nm. Moreover, this demonstrated that the oil-laden nanogels can be made entirely from biocompatible components, facilitating their use for in vivo applications.

Example 5. Double Nanoemulsion Formed with Large Molecular Weight Macromers

Materials and Methods
Materials and methods as described in Examples 1 and 2.
Results
In addition, it was tested whether the double nanoemulsion templating process was sensitive to replacing the relatively low molecular weight PEGDA macromer used in previous studies ($M_n=700$ g/mol) with a macromer with significantly larger molecular weight ($M_n=10,000$ g/mol), thereby significantly increasing both the specific viscosity of the aqueous polymer phase during the nanoemulsification process, as well as the mesh size of the hydrogel network in the final nanogel particles.

A successful production of oil-laden nanogels with the larger PEGDA macromer was achieved. In this case, the Tween20 surfactant was unable to produce sufficiently small silicone oil droplets in the $O_1/W$ nanoemulsion, even after matching the viscosity ratio between the W and $O_1$ phases used for the shorter PEGDA macromer. Therefore, Tween20 was replaced with sodium dodecyl sulfate (SDS), which has a smaller packing parameter and is therefore capable of forming smaller nanoemulsion droplets. Doing so produced sufficiently small oil nanodroplets for the formation of double nanoemulsions and subsequent formation of oil-laden nanogels. However, upon purification of the nanogels and re-dispersion into water, cryo-TEM imaging indicates a significant loss of the oil nanodroplets from the nanogel interior, as evident by the appearance of oil nanodroplets surrounding the nanogel. This can be attributed to a combination of non-uniformity of nanogel crosslinking and the large swelling ratio Q of the 10,000 g/mol macromer in water. For bulk hydrogels at a concentration of PEGDA=0.2, the swelling ratio is 3.56 for PEGDA 10k and 1.02 for PEGDA 700, which corresponds to an average mesh size of 16.3 nm for PEGDA 10k and 3.1 nm for PEGDA 700 in the swollen state (Table 3). Compared to the small mesh size of PEGDA 700, PEGDA 10k has an average mesh size that is comparable to the oil droplets, which would likely drive faster oil loss through the heterogeneous nanogel network.

This demonstrates that hydrogel swelling can be used as a mechanism to induce release of the encapsulated nanodroplets from the nanogels.

TABLE 3

Swelling ratio and mesh size of PEGDA 700 and 10K for bulk hydrogels at ($\varphi''_{pegda}$ = 0.2

| MW (g/mol) | $Q_E$ (equilibrium vol/dry vol) | $Q_C$ (equilibrium vol/initial vol) | Rc (equilibrium/ initial radius) | Average mesh size (nm) |
|---|---|---|---|---|
| PEGDA 700 | 5.3 | 1.06 | 1.02 | 3.1 |
| PEGDA 10,000 | 17.8 | 3.56 | 1.53 | 16.3 |

The crosslinking becomes more heterogeneous toward the surface of the nanogels. This surface heterogeneity leads to broken networks that facilitate oil loss. This effect is amplified for the 10,000 g/mol macromer where the large swelling ratio (Q=3.56) of the 10,000 g/mol macromer increases the path for oil loss compared to the 700 g/mol macromere (Hashimoto et al., Soft Matter, 4:1403-1413 (2008)).

Examples 1-5 describe an exemplary method for preparing $O_1/W/O_2$ nanoemulsions using sequential high-energy emulsification. The methods used in Examples 1-5 are suitable for templating oil-laden polymer nanogels with controlled size.

Example 6. Stability of Nanoparticles and Nanodroplets

Materials and Methods

Nanoparticles were prepared as in Example 2.

Both nanogels and oil-laden nanogels were incubated with a hydrophobic dye (Nile Red, overall concentration 0.005 wt %) for 2 days. Nile red was dissolved in ethanol and added to the nanoparticle solution for incubation. Then, the particles were washed several times to remove Nile Red from the supernatant via centrifugation; subsequently, both a plate reader and fluorescence microscopy were used to check for fluorescence of the particles (Excitation wavelength: 510 nm; Emission wavelength: 450-800 nm).

Nuclear Magnetic Resonance (NMR) to detect the amount of silicone oil in the nanoparticles was performed at day 0 and 40 days.

The nanogels were purified and stored in DI water at 10° C. in order to minimize oil solubility in the continuous phase. The encapsulation efficiency of nanogels was determined by NMR.

Results

Figure 5:
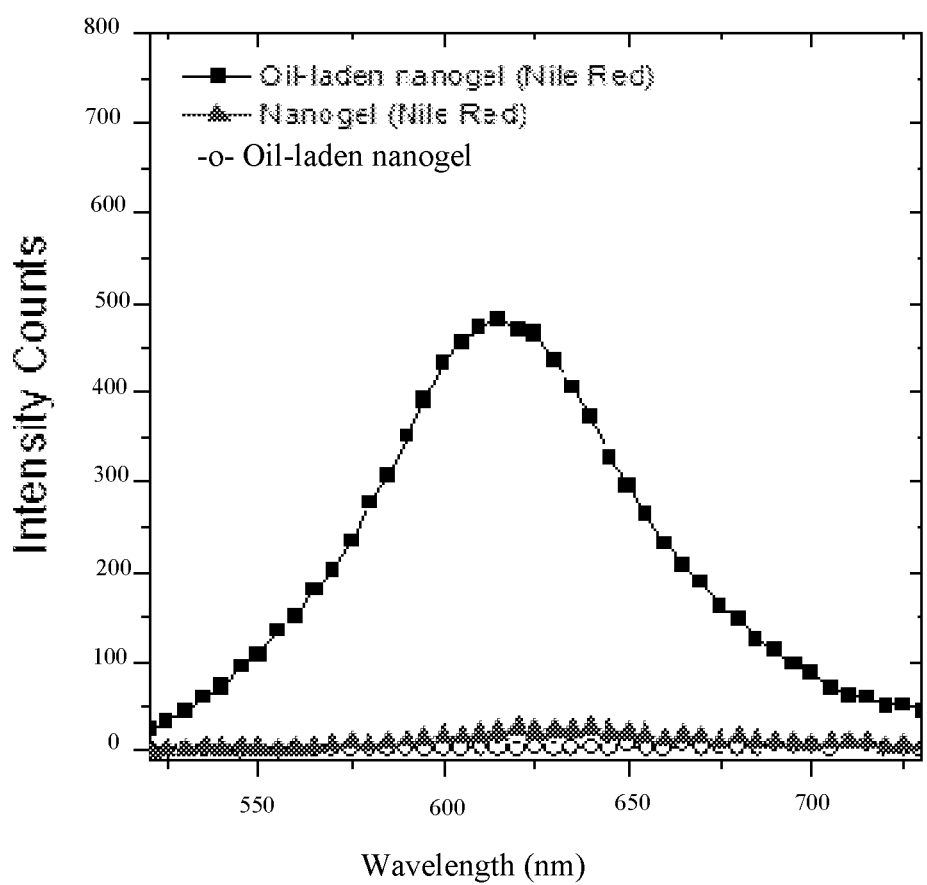
FIG. 5 is a graph showing a hydrophobic reporter dye, Nile Red, incorporated into nanodroplets of nanoparticles after incubation of the nanoparticles in the dye solution. It is a graph of light wavelength (nm) vs. intensity counts, which represents the intensity of fluorescence detected from each sample. Squares are intensity counts from oil-laden nanogels incubated with the Nile Red dye, triangles are intensity counts from nanogels (without oil nanodroplets) incubated with the Nile Red, and open circles are intensity counts from oil-laden nanogels without incubation with Nile Red dye.

FIG. 5 shows that a hydrophobic reporter dye Nile Red is incorporated into nanodroplets of nanoparticles after incubation of the nanoparticles in the dye solution. Nile Red was observed to be fluorescent only in the oil-laden nanogels, which confirms the presence of oil droplets.

The NMR data revealed that there was no measurable loss of dye over time (between days 0 and 30, data not shown). The amount of oil loss during storage over a period of 40 days is negligible once the nanogels have been crosslinked (Table 4), due to the considerable droplet stability of nanoemulsions.

TABLE 4

Stability of oil-laden nanogels.

| Time After Fabrication | 1 day | 40 days |
|---|---|---|
| Encapsulation Efficiency (%) | 28.3 ± 3.1 | 25.9 ± 2.8 |

Example 7. Oil-Laden Nanogels are Non-Toxic to Cells In Vitro

Materials and Methods

Nanogels were produced as described in Examples 1 and 2. A fluorescent dye rhodamine acrylate was covalently incorporated into polymer network of the nanogels.

The cells were grown in RPMI 1640, supplemented with 10% fetal bovine serum and 5% pen/strep. The nanogels were added at specified concentrations and incubated for 24 hours. The cells were then washed and tested for cell viability using the MTT assay according to a standard protocol. The nanoparticle solution was replaced with 0.5 mg/mL MTT in media and allowed to incubate. Media were then aspirated and replaced with dimethyl sulfoxide (DMSO) to solubilize intracellularly reduced MTT (formazan crystals). Formazan dye intensity was determined by absorbance measured at 570 nm.

Results

Figure 6:
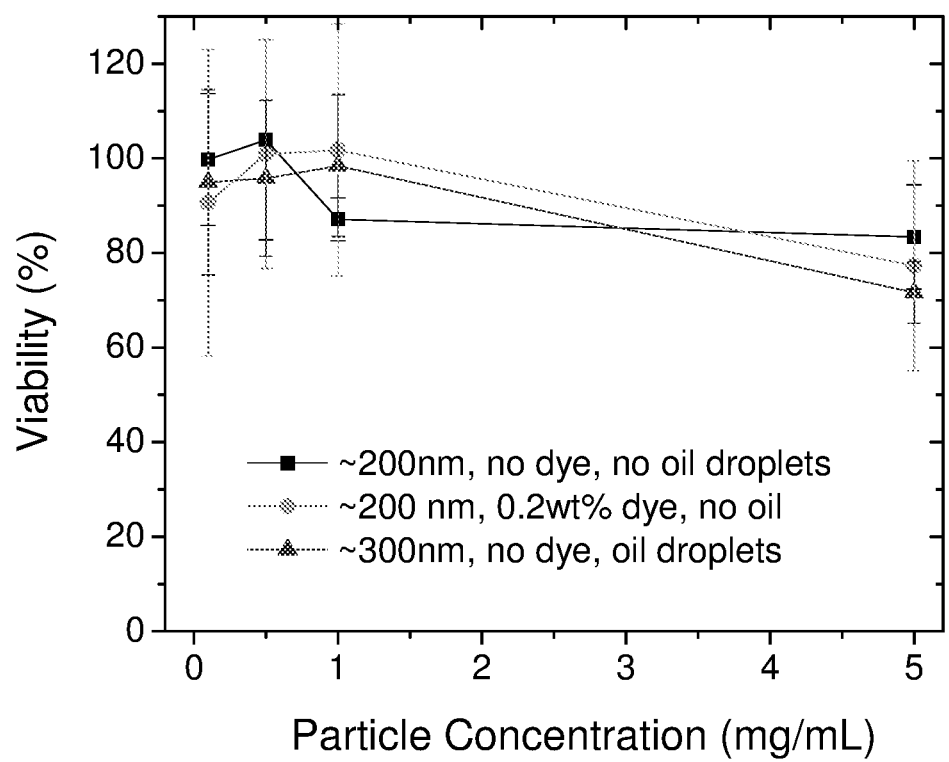
FIG. 6 is a line graph showing the toxicity of nanogels at different concentrations (mg/me on MDA-MB-231 triple negative breast cancer cells after 24-hour long incubation. Viability of the MDA-MB-231 cells was measured via a colorimetric assay for assessing cell metabolic activity (MTT assay). Nanogels without nanodroplets (filled squares), nanogels without nanodroplets containing 0.2 weight % dye (filled circles), and nanogels with nanodroplets (no dye, filled triangles) produced comparable cell viability values.

The cytotoxicity assay was performed using MDA-MB-231 triple negative breast cancer cells (FIG. 6) showed that oil-laden nanogels are non-toxic when incubated with cells for 24 hours (i.e. >80% of cells remain viable).

The disclosure of the present application includes various embodiments as defined by the following numbered paragraphs:

1. A polymeric nanoparticle comprising
a plurality of oil nanodroplets substantially homogeneous in size dispersed within a continuous matrix,
wherein the continuous matrix comprises a hydrophilic polymer, optionally at a volume fraction of between 0.1 and 0.6 in the continuous matrix, and a first surfactant.

2. The polymeric nanoparticle of paragraph 1, wherein the hydrophilic polymer is polyimide; poly(ethylene glycol) diacrylate; poly(ethylene glycol) diacrylamide; polysaccharides, such as celluloses, alginates, chitosans, hyaluronic acid, glucosaminoglycans, dimethylaminoethyl-cellulose, and dimethylaminoethyl-dextran; hydrophilic poly(amino acids); poly(oxyethylated polyol); poly(olefinic alcohol), such as poly(vinyl alcohol) and aminoacetalized poly(vinyl alcohol); poly(N-vinylpyrrolidone); poly(amidoamine); alkacrylic or alkacrylate polymers such as poly(acrylic acid), poly(acrylate), poly(methacrylic acid), poly(methacrylate), poly(hydroxyethyl acrylate), poly(N,N-dimethylaminoethyl methacrylate), poly(N,N-dimethylaminoethyl acrylate), poly(hydroxyalkyl methacrylate), and poly(hydroxyethyl methacrylate); acrylamide polymers such as poly (acrylamide), poly(N,N-dimethylacrylamide), poly(hydroxyalkyl methacrylamide) e.g. poly(hydroxyethyl methacrylamide) and poly(ethylene imine); poly(allylamine); poly(vinylamine); poly(4-vinylpyridine); poly(acrylonitrile); poly(vinyl acetate); or poly(ethylene oxide); or a copolymer thereof.

3. The polymeric nanoparticle of paragraph 1 or 2, wherein the continuous matrix is in the form of a gel or a solid at room temperature and pressure.

4. The polymeric nanoparticle of paragraphs 1-3, wherein the nanodroplets have an average diameter between 1 nm and 100 nm.

5. The polymeric nanoparticle of paragraphs 1-4, wherein the nanodroplets have an average diameter of between 10 nm and 70 nm.

6. The polymeric nanoparticle of paragraphs 1-5, wherein the nanodroplets have a size polydispersity index between about 0.05 and 0.4.

7. The polymeric nanoparticle of paragraphs 1-6, wherein the nanoparticle has a diameter greater than 150 nm and less than 1000 nm.

8. The polymeric nanoparticle of paragraphs 1-7, wherein the nanoparticle remains stable for a period of time of at least 30 days, at least two months, at least six months, or at least one year at room temperature and pressure.

9. The polymeric nanoparticle of paragraphs 1-8, wherein the nanoparticle size, polydispersity of the nanodroplets, or oil content of the nanoparticle does not substantially change over the period of time at room temperature and pressure when compared to the nanoparticle size, polydispersity of the nanodroplets, or oil content of a freshly prepared nanoparticle.

10. The polymeric nanoparticle of paragraphs 1-9, wherein the nanodroplets remain dispersed within the continuous matrix for the period of time at room temperature and pressure.

11. The polymeric nanoparticle of any of claims 1-10, wherein the nanodroplets, the continuous matrix, or both comprise a cargo.

12. A composition comprising a plurality of the polymeric nanoparticle of paragraphs 1-11.

13. The composition of paragraph 12, wherein the nanoparticles in the plurality are substantially homogenous in size.

14. The composition of paragraph 12 or 13, wherein the nanodroplets vary in size and have a polydispersity index between about 0.05 and about 0.4.

15. The composition of paragraph 12 or 13, wherein the nanoparticles vary in size and have a polydispersity index between about 0.05 and about 0.4.

16. The composition of paragraphs 12-15, wherein the hydrophilic polymer of the continuous matrix is present at a volume fraction of between 0.1 and 0.6.

17. The composition of paragraphs 12-16, wherein the composition is a food composition.

18. The composition of paragraph 17, wherein the nanodroplets, the continuous matrix, or both, comprise a cargo, wherein the cargo is selected from the group consisting of vitamins, oils, lipids, plant-derived compounds, and synthetic compounds.

19. The composition of paragraph 18, wherein the cargo is selected from the group consisting of polyunsaturated fatty acids and their esters, lipids, plant oils, and polyphenols.

20. The composition of paragraphs 12-16, wherein the composition is a cosmetic composition.

21. The composition of paragraphs 12-16, wherein the composition is an industrial composition.

22. The composition of paragraphs 12-16, wherein the composition is a fertilizer.

23. The composition of paragraphs 12-16, wherein the composition is a paint.

24. A pharmaceutical composition comprising the polymeric nanoparticles of paragraphs 1-11, wherein the nanodroplets, the continuous matrix, or both further comprise a therapeutic, diagnostic, nutraceutical, or imaging agent.

25. A method of making polymeric nanoparticles, comprising:
(i) dispersing a first oil phase into a continuous aqueous phase using high-energy forces and forming a first nanoemulsion; and
(ii) dispersing the first nanoemulsion in a second oil phase using high-energy forces and forming a second nanoemulsion.

26. The method of paragraph 25, wherein the aqueous phase comprises a polymerizable monomer or macromer at a volume fraction of between 0.1 and 0.6.

27. The method of paragraph 25 or 26, wherein the aqueous phase comprises a first surfactant, and wherein the second oil phase comprises a second surfactant, wherein the second surfactant is different than the first surfactant.

28. The method of any one of paragraphs 25-27, further comprising providing a polymerization initiator, preferably the polymerization initiator is a photo initiator or a thermal initiator.

29. The method of paragraphs 25-28, wherein encapsulation efficiency of oil in the first nanoemulsion is between 0.2 and 1, preferably between 0.4 and 1.

30. The method of paragraphs 28 or 29, further comprising subjecting the second nanoemulsion to a light source for a sufficient period of time to polymerize the polymerizable monomer or macromer.

31. The method of paragraph 30, further comprising (iii) removing the second oil phase.

32. The method of paragraph 31, wherein step (iii) comprises washing or solvent exchange.

33. A double nanoemulsion comprising
a first nanoemulsion comprising a plurality of nanodroplets of a first oil phase dispersed within a continuous aqueous phase comprising a polymerizable monomer or macromer, optionally at a volume fraction of between 0.1 and 0.6,
wherein the first nanoemulsion is suspended in a second oil phase.

34. The double nanoemulsion of paragraph 33, wherein the continuous aqueous phase is in the form of a liquid and the double nanoemulsion is stable for at least two hours, at least six hours, and/or up to six months at room temperature and pressure.

35. The double nanoemulsion of paragraph 33 or 34, wherein the double nanoemulsion is stable for a time period in the range of two to six hours at room temperature and pressure.

36. The double nanoemulsion of paragraphs 33-35, wherein the continuous aqueous phase is in the form of a liquid or a gel at room temperature and pressure.

37. The double nanoemulsion of paragraphs 33-36, wherein the continuous aqueous phase comprises a first surfactant, and the second oil phase comprises a second surfactant, wherein the first surfactant and the second surfactant are the same or different.

38. The double nanoemulsion of paragraph 37, wherein the first surfactant has a hydrophilic-lipophilic balance (HLB) between 8 and 17.

39. The double nanoemulsion of paragraph 37, wherein the second surfactant has a hydrophilic-lipophilic balance (HLB) between 3 and 6.

40. The double nanoemulsion of paragraphs 33-39, wherein the polymerizable monomer or macromer is soluble in the aqueous phase, and does not interfere with the surface activity of the surfactant.

41. The double nanoemulsion of paragraphs 33-40, wherein the polymerizable monomer or macromer is a monomer or macromer that forms a polymer, wherein the polymer is polyimide; poly(ethylene glycol) diacrylate; poly(ethylene glycol) diacrylamide; a polysaccharide, such as a cellulose, an alginate, chitosan, hyaluronic acid, glucosaminoglycan, dimethylaminoethyl-cellulose, or dimethylaminoethyl-dextran; a hydrophilic poly(amino acid); poly(oxyethylated polyol); a poly(olefinic alcohol), such as poly(vinyl alcohol) or aminoacetalized poly(vinyl alcohol); poly(N-vinylpyrrolidone); poly(amidoamine); an alkacrylic or alkacrylate polymer such as poly(acrylic acid), poly(acrylate), poly(methacrylic acid), poly(methacrylate), poly(hydroxyethyl acrylate), poly(N,N-dimethylaminoethyl methacrylate), poly(N,N-dimethylaminoethyl acrylate), poly(hydroxyalkyl methacrylate), or poly(hydroxyethyl methacrylate); an acrylamide polymer such as poly(acrylamide), poly(N,N-dimethylacrylamide), poly(hydroxyalkyl methacrylamide), such as poly(hydroxyethyl methacrylamide) or poly(ethylene imine); poly(allylamine); poly(vinylamine); poly(4-vinylpyridine); poly(acrylonitrile); poly(vinyl acetate); or poly (ethylene oxide); or a copolymer thereof.

Recitation of ranges of values herein are merely intended to serve as a shorthand method of referring individually to each separate value in the range, including referring individually to the first value or the last value of the range. For example, a reference to a volume fraction of between 0.1 and 0.6 refers to a volume fraction of 0.1, 0.2, 0.3, 0.4, 0.5, or 0.6, or to any decimal number within this range, such as to the hundredths place (e.g. 0.11, 0.12, 0.13, etc). A reference to an average diameter between 1 nm and 100 nm refers to an average diameter of 1 nm, 2, nm, 3, nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, or 100 nm, or to a diameter of any whole number or and decimal number within this range. A reference to a pH value between 2 and 9 refers to a pH value of 2, 3, 4, 5, 6, 7, 8, or 9, or to any decimal number within this range, such as a pH value to the hundredths place (e.g. 2.20, 2.25, 5.50, 5.55, etc).

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A polymeric nanoparticle comprising
a plurality of oil nanodroplets dispersed within a continuous matrix, wherein the polydispersity index for nanodroplet size is between 0.05 and 0.4,
wherein the continuous matrix comprises a hydrophilic polymer and a first surfactant,
and wherein the polymeric nanoparticle has a diameter greater than 150 nm and less than 1000 nm.

2. The polymeric nanoparticle of claim 1, wherein the hydrophilic polymer is selected from the group consisting of a polyimide; poly(ethylene glycol) diacrylate; poly(ethylene glycol) diacrylamide; a polysaccharide; a hydrophilic poly (amino acid); poly(oxyethylated polyol); a poly(olefinic alcohol); poly(amidoamine); an alkacrylic or alkacrylate polymer; an acrylamide polymer; poly(allylamine); poly (vinylamine); poly(4-vinylpyridine); poly(acrylonitrile); poly(vinyl acetate); and poly(ethylene oxide); and a copolymer thereof.

3. The polymeric nanoparticle of claim 1, wherein the continuous matrix is in the form of a gel or a solid at room temperature and pressure.

4. The polymeric nanoparticle of claim 1, wherein the nanodroplets have an average diameter between 1 nm and 100 nm.

5. The polymeric nanoparticle of claim 1, wherein the nanoparticle has a diameter between 200 nm and 600 nm.

6. The polymeric nanoparticle of claim 1, wherein the nanoparticle remains stable for a period of time of at least 30 days at room temperature and pressure.

7. The polymeric nanoparticle of claim 6, wherein the change of nanoparticle size, polydispersity of the nanodroplets, or oil content of the nanoparticle over the period of time at room temperature and pressure is about 10% or less when compared to the nanoparticle size, polydispersity of the nanodroplets, or oil content of a freshly prepared nanoparticle.

8. The polymeric nanoparticle of claim 1, wherein the nanodroplets, the continuous matrix, or both comprise a cargo.

9. The polymeric nanoparticle of claim 1, wherein the hydrophilic polymer of the continuous matrix is present at a volume fraction of between 0.1 and 0.6.

10. A composition comprising a plurality of the polymeric nanoparticle of claim 1.

11. The composition of claim 10, wherein the composition is a food composition, a cosmetic composition, or a pharmaceutical composition.

12. The composition of claim 11,
wherein the composition is a food composition and the nanodroplets, the continuous matrix, or both, comprise a cargo selected from the group consisting of vitamins, oils, lipids, plant-derived compounds, and synthetic compounds, and combinations thereof, or
wherein the composition is a pharmaceutical composition and the nanodroplets, the continuous matrix, or both comprise a therapeutic agent, diagnostic agent, nutraceutical, or imaging agent.

13. The composition of claim 12, wherein the composition is a food composition and the cargo is selected from the group consisting of polyunsaturated fatty acids and their esters, lipids, plant oils, and polyphenols, and combinations thereof.

14. The composition of claim 10, wherein the composition is an industrial composition, a fertilizer, or a paint.

15. A method of making the composition of claim 10, comprising:
(i) dispersing a first oil phase into a continuous aqueous phase using high-energy forces and forming a first nanoemulsion; and
(ii) dispersing the first nanoemulsion in a second oil phase using high-energy forces and forming a second nanoemulsion,
wherein the continuous aqueous phase comprises a first surfactant and a polymerizable monomer or macromer, and
wherein the second oil phase comprises a second surfactant that is the same or different than the first surfactant.

16. The method of claim 15, wherein the polymerizable monomer or macromer in the continuous aqueous phase is present at a volume fraction of between 0.1 and 0.6.

17. The method of claim 15, further comprising providing a polymerization initiator, subjecting the second nanoemulsion to a light source for a period of time to polymerize the polymerizable monomer or macromer, and/or removing the second oil phase.

18. The method of claim 15, wherein encapsulation efficiency of oil in the first nanoemulsion is between 0.2 and 1, as determined by NMR.

19. The method of claim 17, wherein the step of removing the second oil phase comprises washing or solvent exchange.

20. The method of claim 15, wherein the first oil phase comprises a lipophilic cargo and/or wherein the continuous aqueous phase comprises a hydrophilic cargo.

21. The nanoparticle of claim 1, wherein the continuous matrix comprises a cargo, and wherein the cargo comprises an RNA.

22. The nanoparticle of claim 2, wherein the hydrophilic polymer is selected from the group consisting of cellulose, alginate, chitosan, hyaluronic acid, glucosaminoglycan, dimethylaminoethyl cellulose, and dimethylaminoehtyl dextran.

\* \* \* \* \*

UNITED STATES PATENT AND TRADEMARK OFFICE
CERTIFICATE OF CORRECTION

PATENT NO. : 11,254,773 B2
APPLICATION NO. : 16/612982
DATED : February 22, 2022
INVENTOR(S) : Matthew E. Helgeson et al.

It is certified that error appears in the above-identified patent and that said Letters Patent is hereby corrected as shown below:

In the Claims

Claim 22, Column 55, Lines 24-25, replace "dimethylaminoehtyl dextran" with --dimethylaminoethyl dextran--.

Signed and Sealed this
Twenty-eighth Day of February, 2023

Katherine Kelly Vidal
Director of the United States Patent and Trademark Office